(12) United States Patent
Tallarico et al.

(10) Patent No.: US 12,478,884 B2
(45) Date of Patent: Nov. 25, 2025

(54) GAMING CONTROLLER WITH DISC WHEEL AND DISPLAY SCREEN

(71) Applicant: Intellivision Entertainment LLC, Mission Viejo, CA (US)

(72) Inventors: Tommy Tallarico, San Juan Capistrano, CA (US); Juan M. Alvarado, Tustin, CA (US); André LaMothe, Austin, TX (US); Todd Linthicum, Aliso Viejo, CA (US); Nicholas P. Richards, Mission Viejo, CA (US); David Slade Simpson, Aliso Viejo, CA (US)

(*) Notice: Subject to any disclaimer, the term of this patent is extended or adjusted under 35 U.S.C. 154(b) by 0 days.

(21) Appl. No.: 18/487,051

(22) Filed: Oct. 14, 2023

(65) Prior Publication Data

US 2024/0066412 A1 Feb. 29, 2024

Related U.S. Application Data

(63) Continuation of application No. 15/931,353, filed on May 13, 2020, now Pat. No. 11,883,750.

(60) Provisional application No. 62/856,576, filed on Jun. 3, 2019, provisional application No. 62/847,774, filed on May 14, 2019.

(51) Int. Cl.
| | |
|---|---|
| *A63F 13/798* | (2014.01) |
| *A63F 13/211* | (2014.01) |
| *A63F 13/77* | (2014.01) |
| *A63F 13/90* | (2014.01) |

(52) U.S. Cl.
CPC .......... *A63F 13/798* (2014.09); *A63F 13/211* (2014.09); *A63F 13/77* (2014.09); *A63F 13/90* (2014.09)

(58) Field of Classification Search
None
See application file for complete search history.

(56) References Cited

U.S. PATENT DOCUMENTS

| | | | | |
|---|---|---|---|---|
| 6,325,719 | B1* | 12/2001 | Fukawa | A63F 13/285 |
| | | | | 463/37 |
| 7,811,174 | B2* | 10/2010 | Whitten | A63F 13/10 |
| | | | | 463/31 |
| 10,031,999 | B2* | 7/2018 | Tamura | G16B 99/00 |
| 10,904,248 | B2* | 1/2021 | Dannemiller | H04L 63/083 |
| 10,912,991 | B2* | 2/2021 | Buhr | A63F 13/23 |
| 10,921,913 | B1* | 2/2021 | Fong | G06F 3/04162 |
| 11,106,291 | B2* | 8/2021 | Takaoka | G06F 3/044 |
| 2006/0164403 | A1* | 7/2006 | Volckers | G06F 3/0236 |
| | | | | 345/184 |

(Continued)

*Primary Examiner* — Seng H Lim
(74) *Attorney, Agent, or Firm* — Johnny Lam

(57) ABSTRACT

Embodiments of the systems and methods disclosed herein provide a gaming console and gaming controllers, including hardware and software features included on the hardware. For example, a game balancing system is described that can monitor and track performance data from one or more players of the gaming console. With the performance data, artificial intelligence and machine learning can be used to create one or more models that are applied to determine adjustments to games being played on the gaming console. The adjustments to the games can be implemented specifically to each game, player, or set of players to achieve more balanced gameplay as measured by game outcomes and other factors.

20 Claims, 42 Drawing Sheets

(56) References Cited

U.S. PATENT DOCUMENTS

| | | | |
|---|---|---|---|
| 2007/0010328 A1* | 1/2007 | Yokota | A63F 13/73 463/42 |
| 2007/0010334 A1* | 1/2007 | Multerer | A63F 13/12 463/43 |
| 2007/0093294 A1* | 4/2007 | Serafat | A63F 13/327 463/42 |
| 2007/0242057 A1* | 10/2007 | Zadesky | G06F 3/03547 345/173 |
| 2009/0203444 A1* | 8/2009 | Kim | A63F 13/92 463/37 |
| 2010/0026532 A1* | 2/2010 | Shimizu | G06F 3/0202 341/35 |
| 2012/0092330 A1* | 4/2012 | Chen | G06F 3/04847 345/157 |
| 2014/0213349 A1* | 7/2014 | Lin | G06F 21/31 463/29 |
| 2015/0273337 A1* | 10/2015 | Crowley | A63F 13/79 463/29 |
| 2016/0057140 A1* | 2/2016 | Heeter | H04W 12/08 726/4 |
| 2017/0316901 A1* | 11/2017 | Sawada | H01H 19/02 |
| 2019/0321732 A1* | 10/2019 | Zimring | A63F 13/235 |
| 2020/0278761 A1* | 9/2020 | Takaoka | G06F 3/044 |
| 2020/0306625 A1* | 10/2020 | Palmer | H04W 76/00 |
| 2021/0180994 A1* | 6/2021 | Spevak | G01D 5/2415 |

* cited by examiner

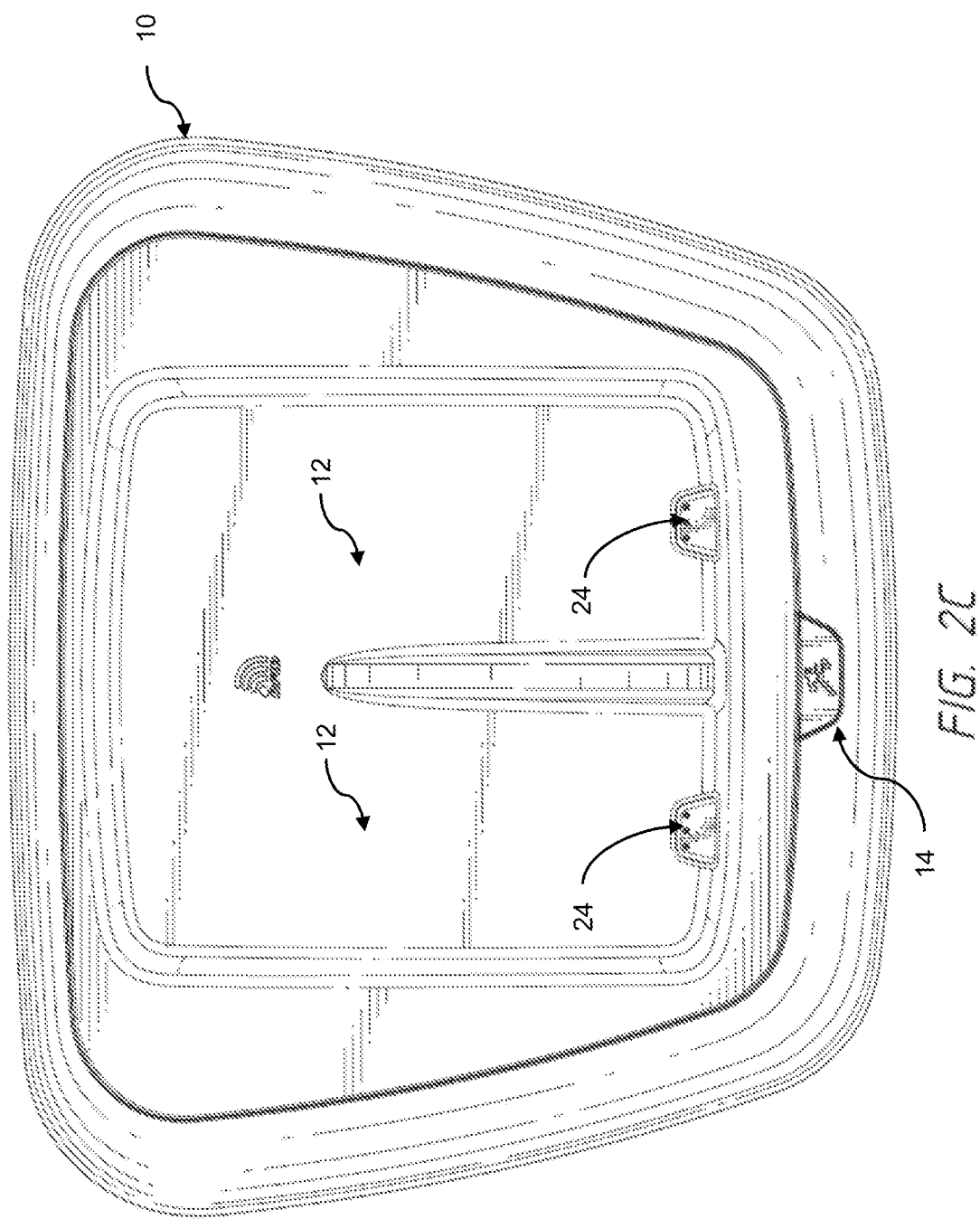

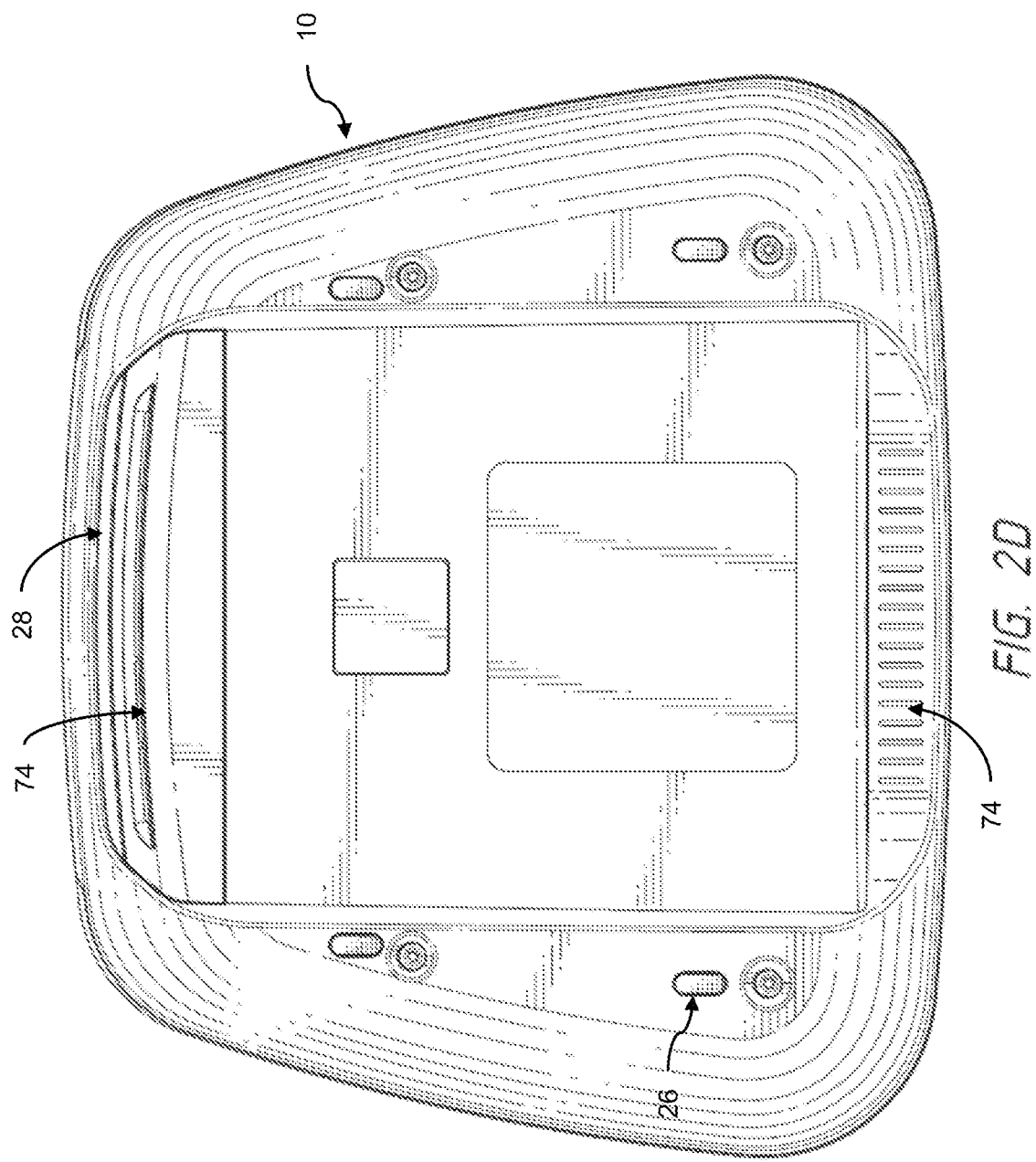

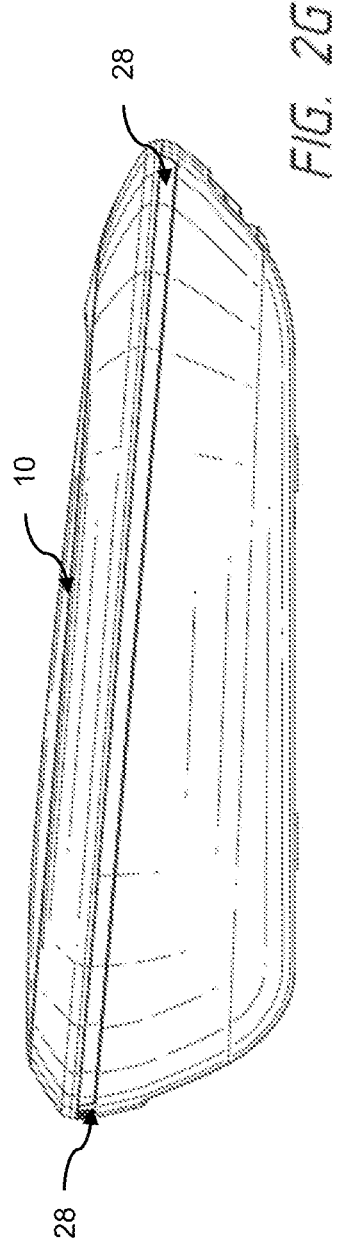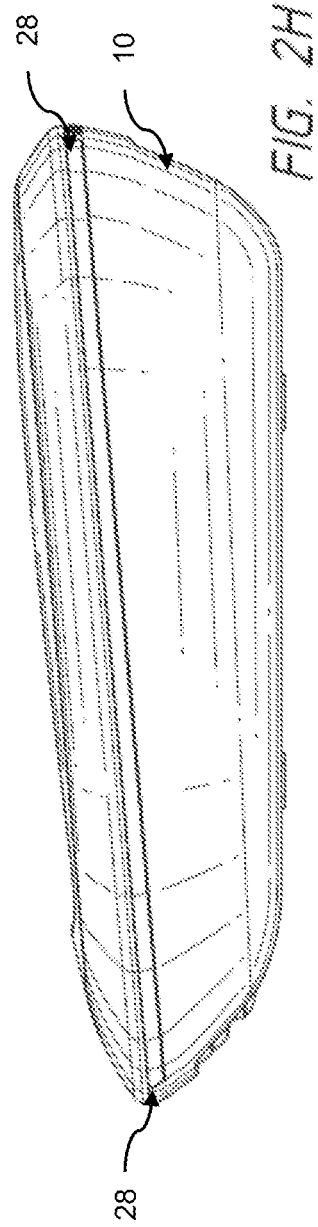

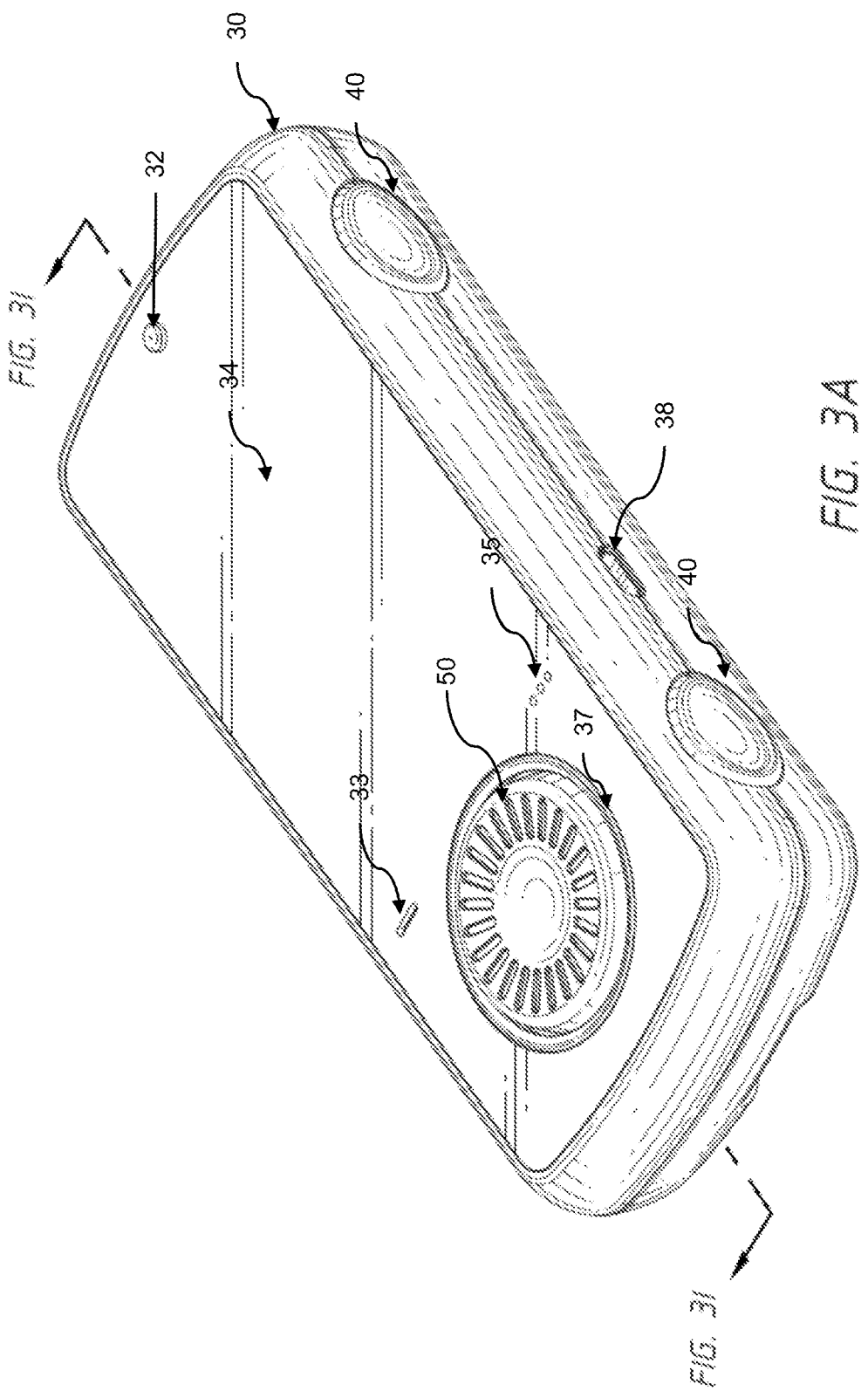

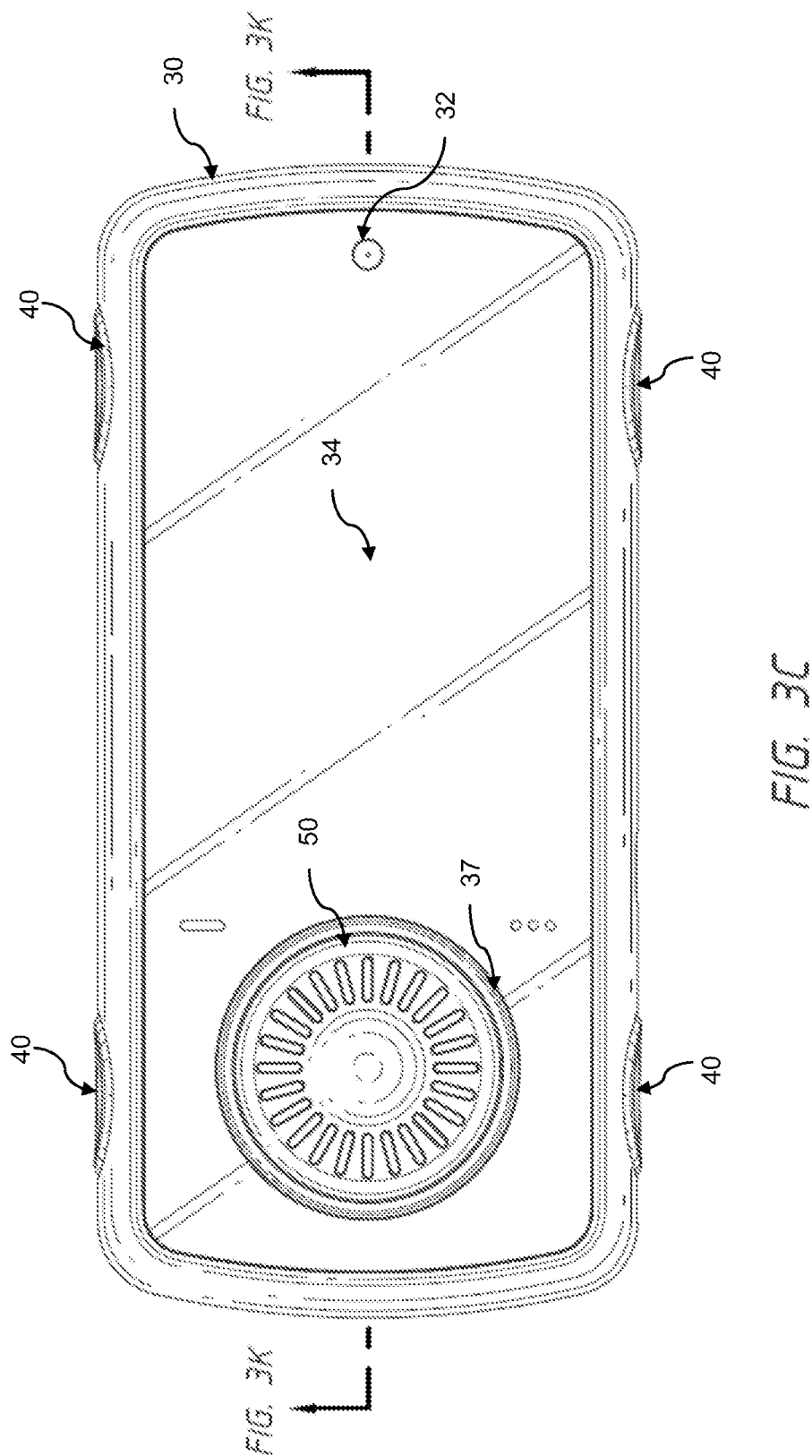

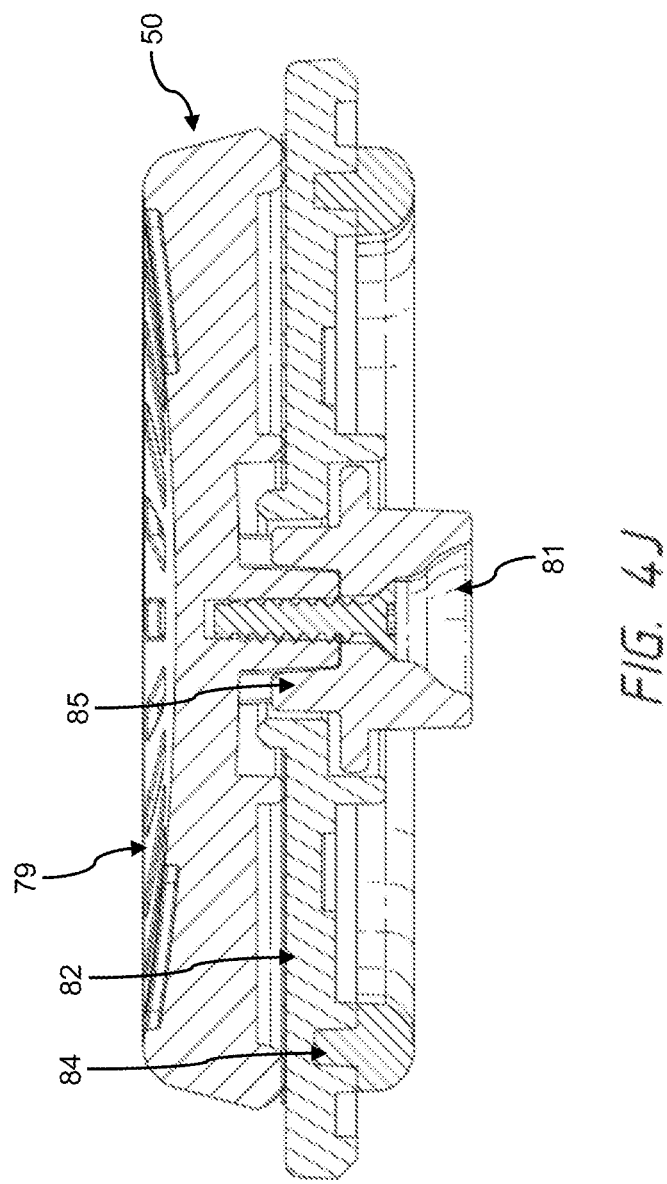

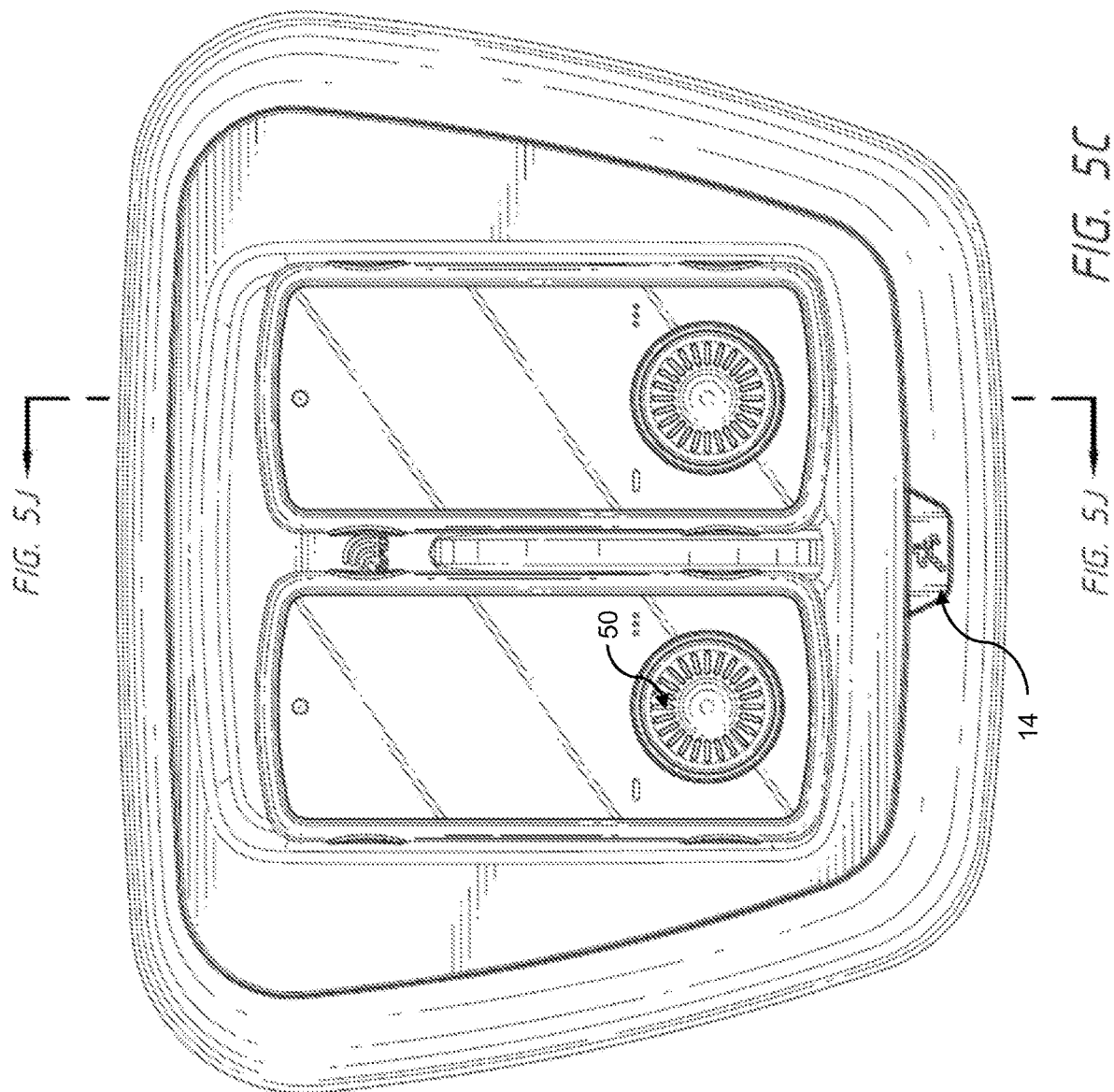

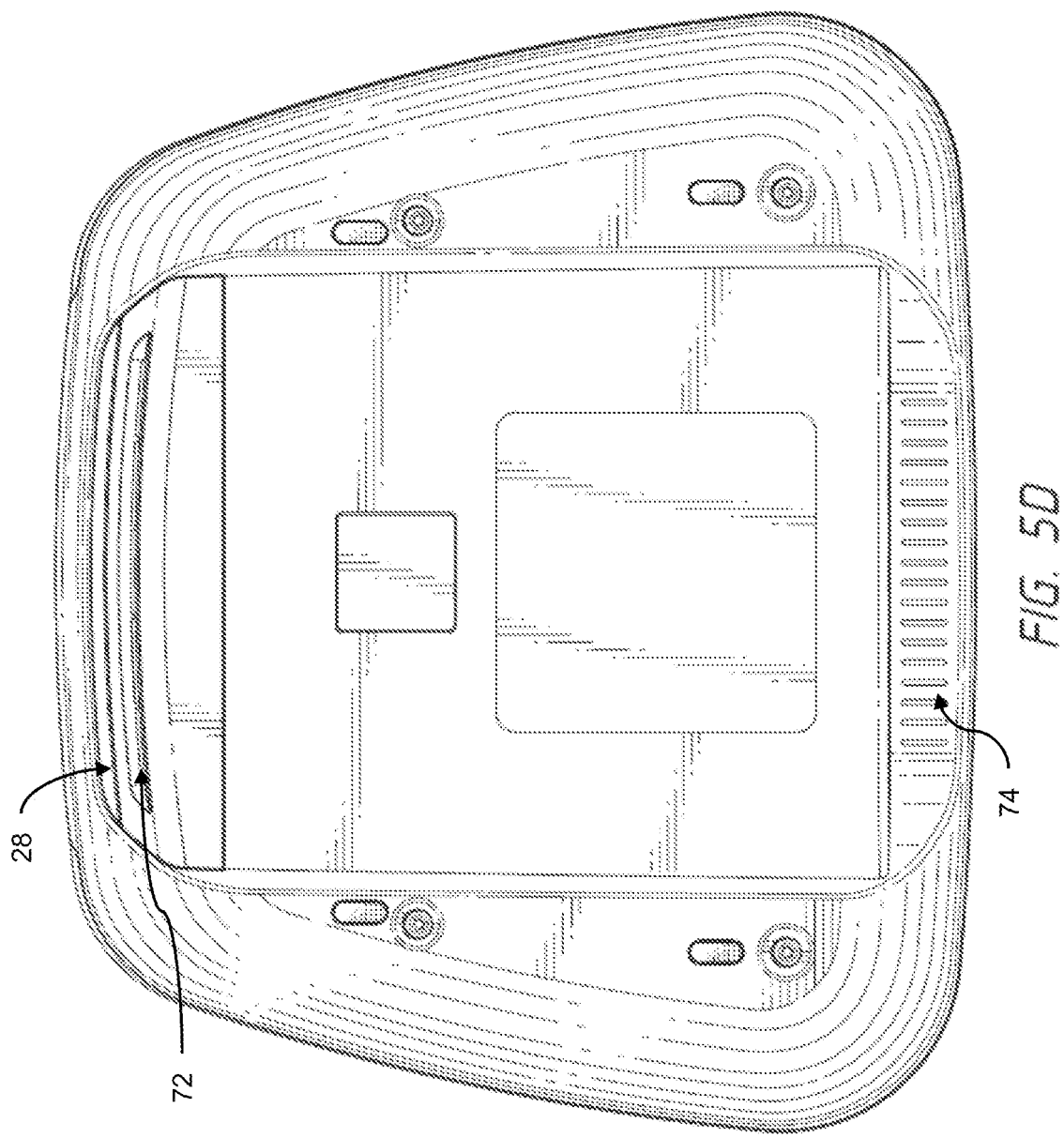

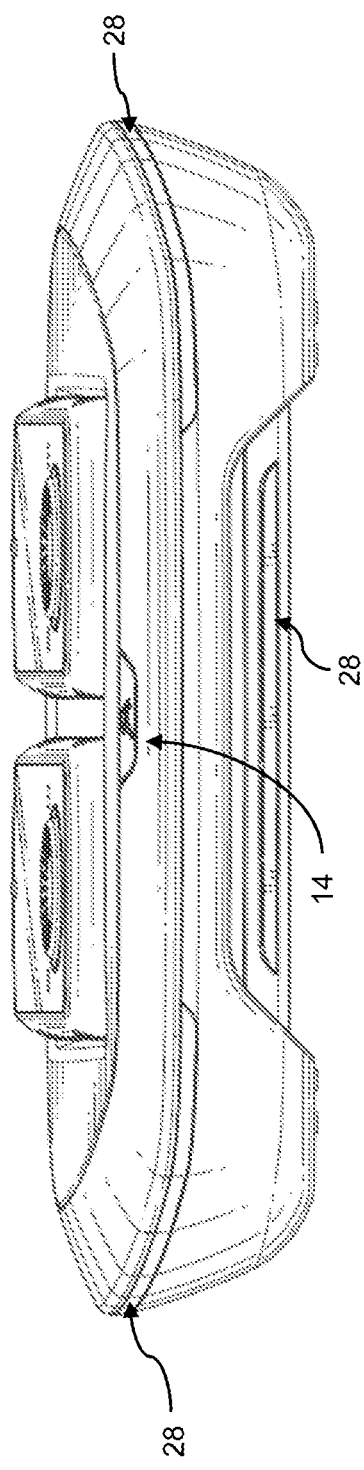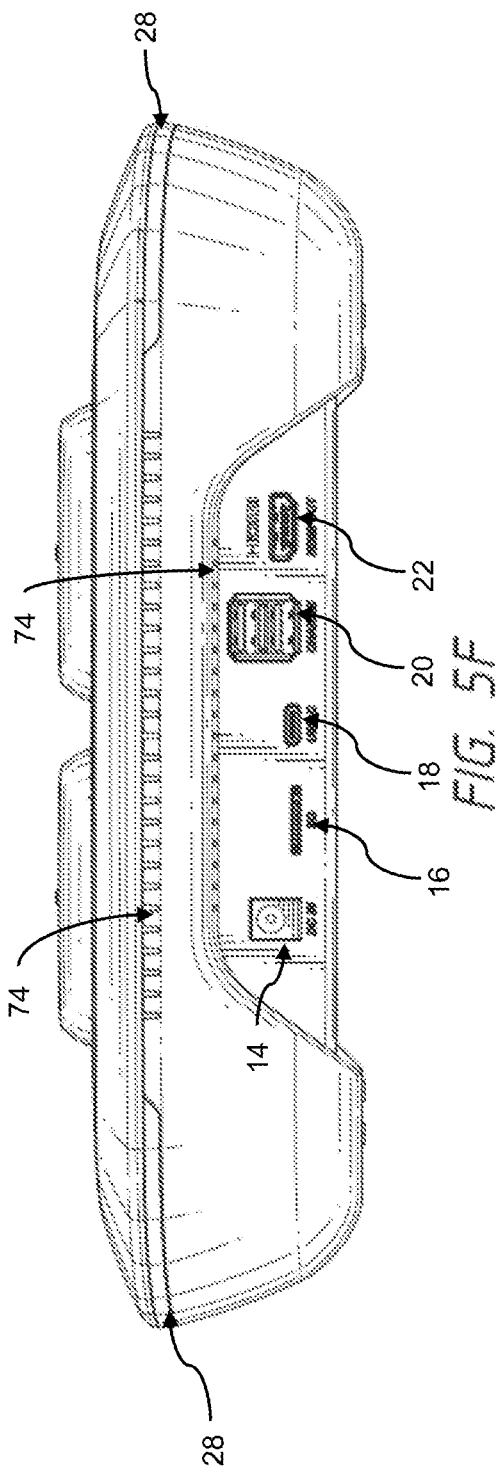

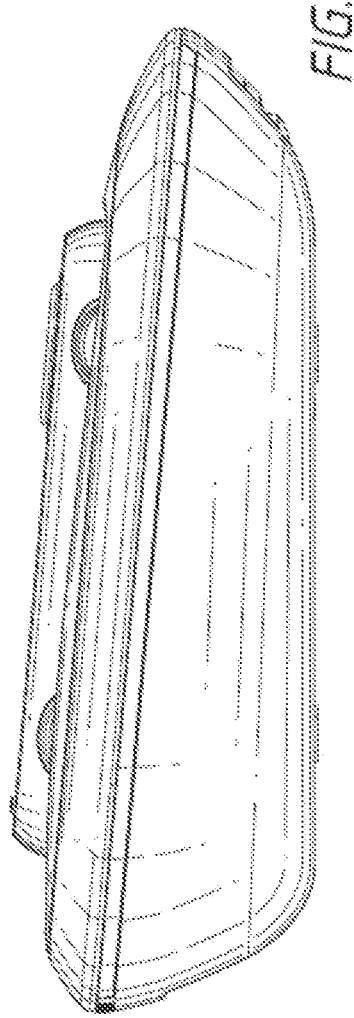

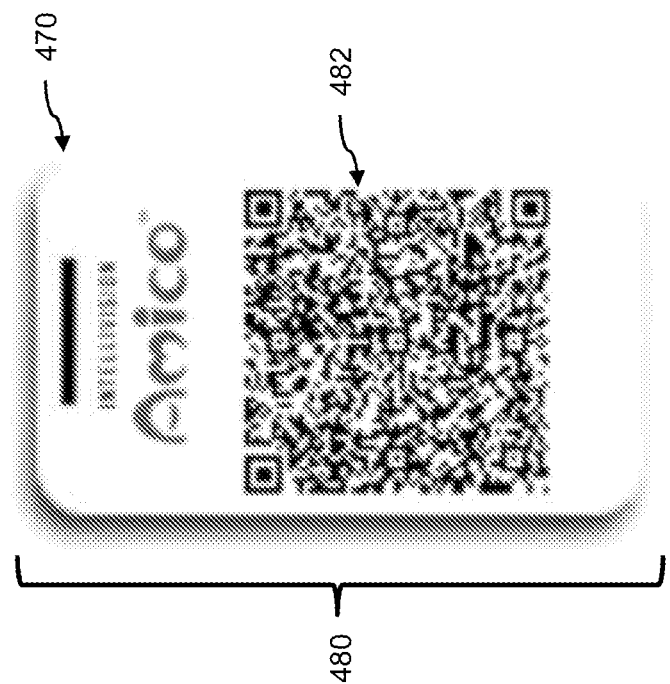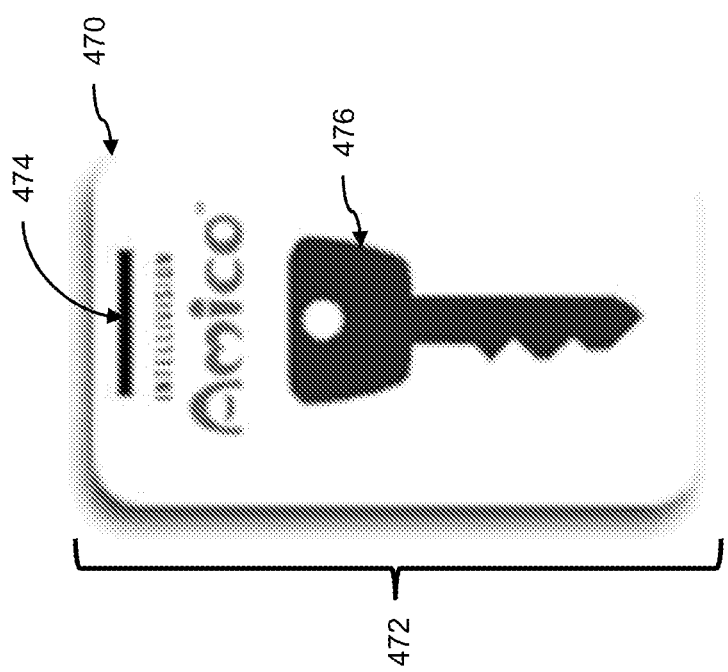
FIG. 9B

GAMING CONTROLLER WITH DISC WHEEL AND DISPLAY SCREEN

INCORPORATION BY REFERENCE TO ANY PRIORITY APPLICATIONS

This application is a continuing application of U.S. Patent Non-Provisional application Ser. No. 15/931,353, filed May 13, 2020, which claims the benefit of U.S. Patent Provisional Application No. 62/847,774, filed May 14, 2019, and U.S. Patent Provisional Application No. 62/856,576, filed Jun. 3, 2019. The entire contents of the aforementioned applications are hereby expressly incorporated by reference herein in their entirety and for all purposes. In addition, any and all applications for which a domestic priority claim is identified in the application data sheet as filed with the present application are also hereby incorporated by reference under 37 CFR 1.57.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

BACKGROUND

Intellivision provided one of the very first console and controller commercial products to consumers, similar to that shown in FIG. 1. There have been many advances since then. Additionally, many games have become PC-based or mobile phone compatible, as opposed to console-based. Many games being made for the home consoles these days are created with the hardcore gamer in mind. However, gamers or players may be interested in playing certain types of games at home and with friends. This may not be possible because the barrier to entry is nearly impossible for a non-gamer (e.g., non-hardcore gamer) due to the complexity of the controllers, intricacy of gameplay, expense of the hardware and software, and steep learning curve. Additionally, there is often an unbalanced fun factor between a more accomplished gamer for a particular game and console/controller combination, and a less accomplished friend that may not be as used to a particular game and console/controller combination.

SUMMARY OF THE EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

One embodiment discloses a gaming console comprising: one or more data stores configured to store performance data for one or more players, wherein the performance data is associated with data collected during gameplay for each of the one or more players, wherein the performance data is indicative of play style or skill level of the one or more players; a network interface configured to communicate with one or more gaming servers and one or more gaming controllers; and one or more physical computer processors in communication with the one or more data stores, wherein the computer-executable instructions, when executed, configure the one or more physical computer processors to: receive a request to play a first game, wherein the request includes information indicating the first game, a first player, and a second player; based on the request, access player profile data for the first player and the second player, wherein the player profile data for each player includes information related to performance data for each respective player; based on the player profile data, determine a first skill level for the first player and a second skill level for the second player; compare the first skill level to the second skill level to determine that the first skill level and second sill level are different; generate rendering instructions for the first game that include game adjustments that balance the gameplay of the game for the first player and the second player, wherein the game adjustments are based on a difference in skill level between the first player and the second player.

Various embodiments of the gaming console may include one, all, or any combination of the following features. In some embodiments, the game adjustments include changes to features of the first game corresponding to portions of the game associated with the first player, the second player, or both the first player and the second player. In some embodiments, the performance data includes data associated with one or more of the following: player game data, player controller data, or game match data. In some embodiments, player game data includes information on how a monitored player plays one or more games, or the monitored player's gaming style, and any changes associated with the monitored player's gaming style over time and an associated rate of change. In some embodiments, player controller data includes data associated with how a monitored player uses a controller for one or more games, wherein the player controller data includes one or more of data associated with: what controller is being used by the monitored player, how the monitored player holds the controller during gameplay, how the monitored player moves the controller during gameplay, when the monitored presses controller buttons during gameplay. In some embodiments, game match data includes data associated with one or more of: what games are being played a monitored player, what players are playing the games that include the monitored player, outcomes of the games, score or progress of the games for each player including the monitored player as it is being played. In some embodiments, the gaming console further comprises a controller that includes an inertial measurement unit (IMU) sensor, wherein the IMU sensor includes one or more of: an accelerometer, a gyroscope, or a magnetometer. In some embodiments, the one or more physical computer processors are further configured to generate instructions for displaying a parental controls interface.

Another embodiment discloses a second gaming console, the gaming console comprising: one or more data stores configured to store performance data for one or more players, wherein the performance data is associated with data collected during gameplay for each of the one or more players, wherein the performance data is indicative of play style or skill level of the one or more players; a network interface configured to communicate with one or more gaming servers and one or more gaming controllers; and one or more physical computer processors in communication with the one or more data stores, wherein the computer-executable instructions, when executed, configure the one or more physical computer processors to: monitor gameplay between a first player and a second player while the first player and second player are playing a first game; collect gameplay data associated with the gameplay, wherein the gameplay data includes information associated with outcomes of the gameplay; transmit the gameplay information to a game balancing system; access results of analysis from the game balancing system, wherein the results indicate that gameplay between the first player and the second player is not balanced within a predetermined threshold while playing the first game; access game adjustments that include changes to features of the first game corresponding to portions of the game corresponding to the first player, the second player, or both the first player and the second player; and generate rendering instructions for the first game that include the game adjustments that balance the gameplay of the game for the first player and the second player while playing the first game.

Various embodiments of the second gaming console may include one, all, or any combination of the following features. In some embodiments, the game balancing system is located on the gaming console. In some embodiments, the game balancing system is located on a gaming server remote from the gaming console. In some embodiments, the game adjustments include changes to features of the first game corresponding to portions of the game associated with the first player, the second player, or both the first player and the second player. In some embodiments, the performance data includes data associated with one or more of the following: player game data, player controller data, or game match data. In some embodiments, player game data includes information on how a monitored player plays one or more games, or the monitored player's gaming style, and any changes associated with the monitored player's gaming style overtime and an associated rate of change. In some embodiments, player controller data includes data associated with how a monitored player uses a controller for one or more games, wherein the player controller data includes one or more of data associated with: what controller is being used by the monitored player, how the monitored player holds the controller during gameplay, how the monitored player moves the controller during gameplay, when the monitored presses controller buttons during gameplay. In some embodiments, game match data includes data associated with one or more of: what games are being played a monitored player, what players are playing the games that include the monitored player, outcomes of the games, score or progress of the games for each player including the monitored player as it is being played. In some embodiments, the gaming console further comprises a controller that includes an inertial measurement unit (IMU) sensor, wherein the IMU sensor includes one or more of: an accelerometer, a gyroscope, or a magnetometer. In some embodiments, the one or more physical computer processors are further configured to generate instructions for displaying a parental controls interface.

Another embodiment discloses a gaming controller comprising: a housing formed from plastic or acrylic that houses electronics; an LED control engine configured to control one or more LED lights; a display screen; a network interface configured to communicate with one or more gaming servers or one or more gaming consoles; buttons configured to receive a physical press that actuates a sensor comprised within the housing; and a circuit board comprising a plurality of electrical contacts; a disc wheel configured to be pressed and rotated around a central axis comprising: a first side configured to receive pressure; and a second side that is coupled to a compressible and conductive ring such that when the first side received the pressure, the ring contacts one or more of the plurality of electrical contacts; and a processor configured to detect contact received by the plurality of electrical contacts to transcode the signals into a plurality of instructions that are configured to affect a graphical user interface of game.

Various embodiments of the gaming controller may include one, all, or any combination of the following features. In some embodiments, the gaming controller is configured to detect a magnitude of force associated with a pressing of the wheel.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIGS. 2A-2H illustrate an embodiment of a gaming console.

FIGS. 3A-3L illustrate an embodiment of a gaming controller to be used with the gaming console illustrated in FIGS. 2A-2H.

FIGS. 4A-4K illustrate an embodiment of a disc wheel to be used as a component in the gaming controller illustrated in FIGS. 3A-3L.

FIGS. 5A-5K illustrate an embodiment of the gaming console illustrated in FIGS. 2A-2H with gaming controllers illustrated in FIGS. 3A-3L.

FIG. 9B illustrates an embodiment of a key card.

DETAILED DESCRIPTION OF EMBODIMENTS

Introduction

Figure 1A:
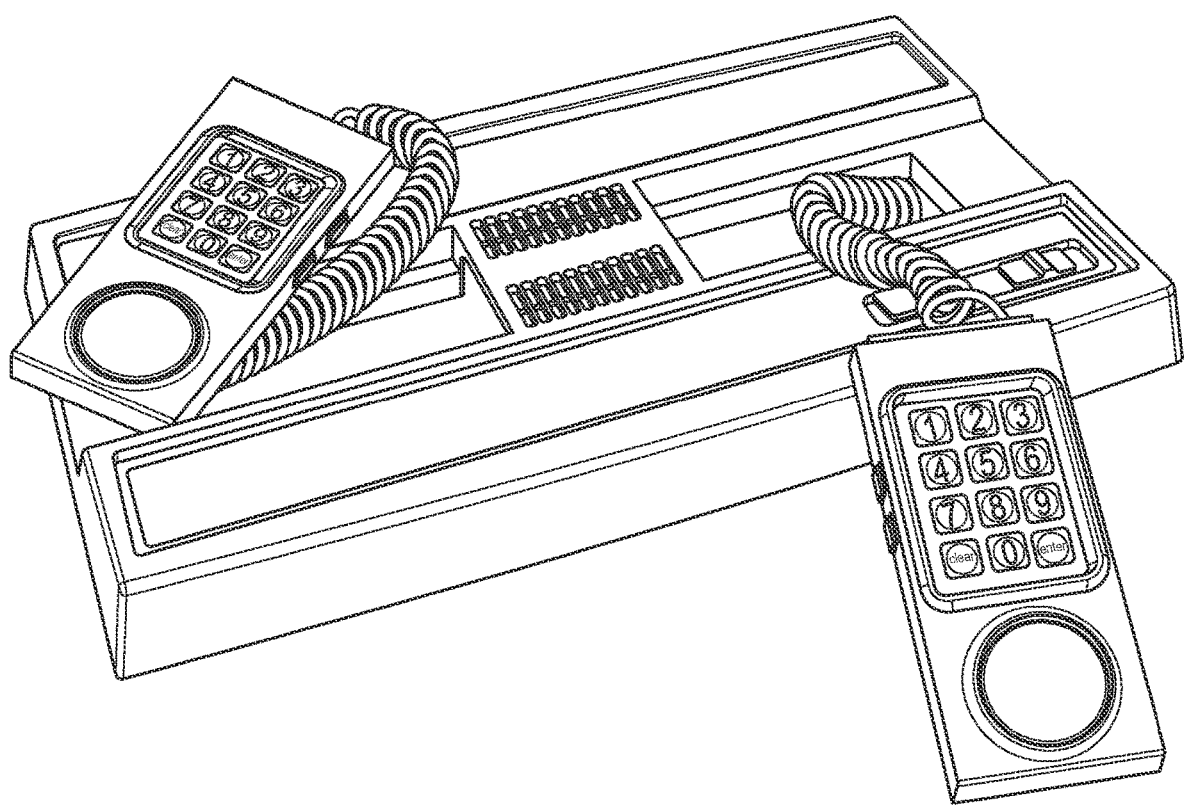
FIGS. 1A-1E illustrate an embodiment of a console and controller design used in prior systems.
Figure 1D:
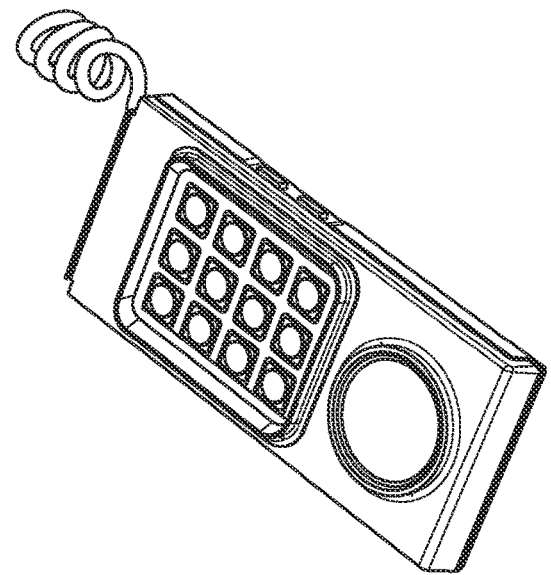
Figure 1B:
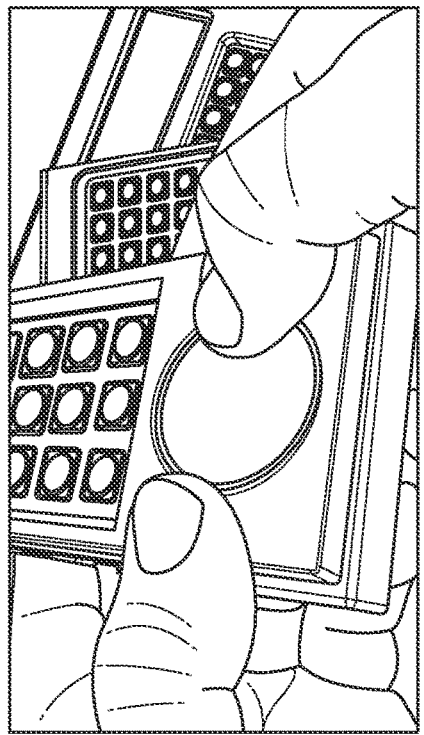
Figure 1C:
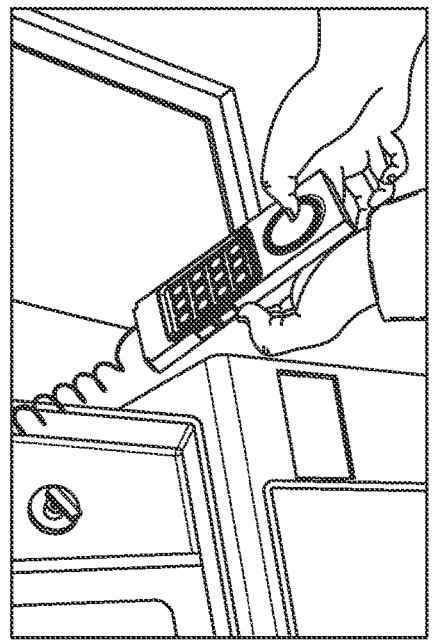
Figure 1E:
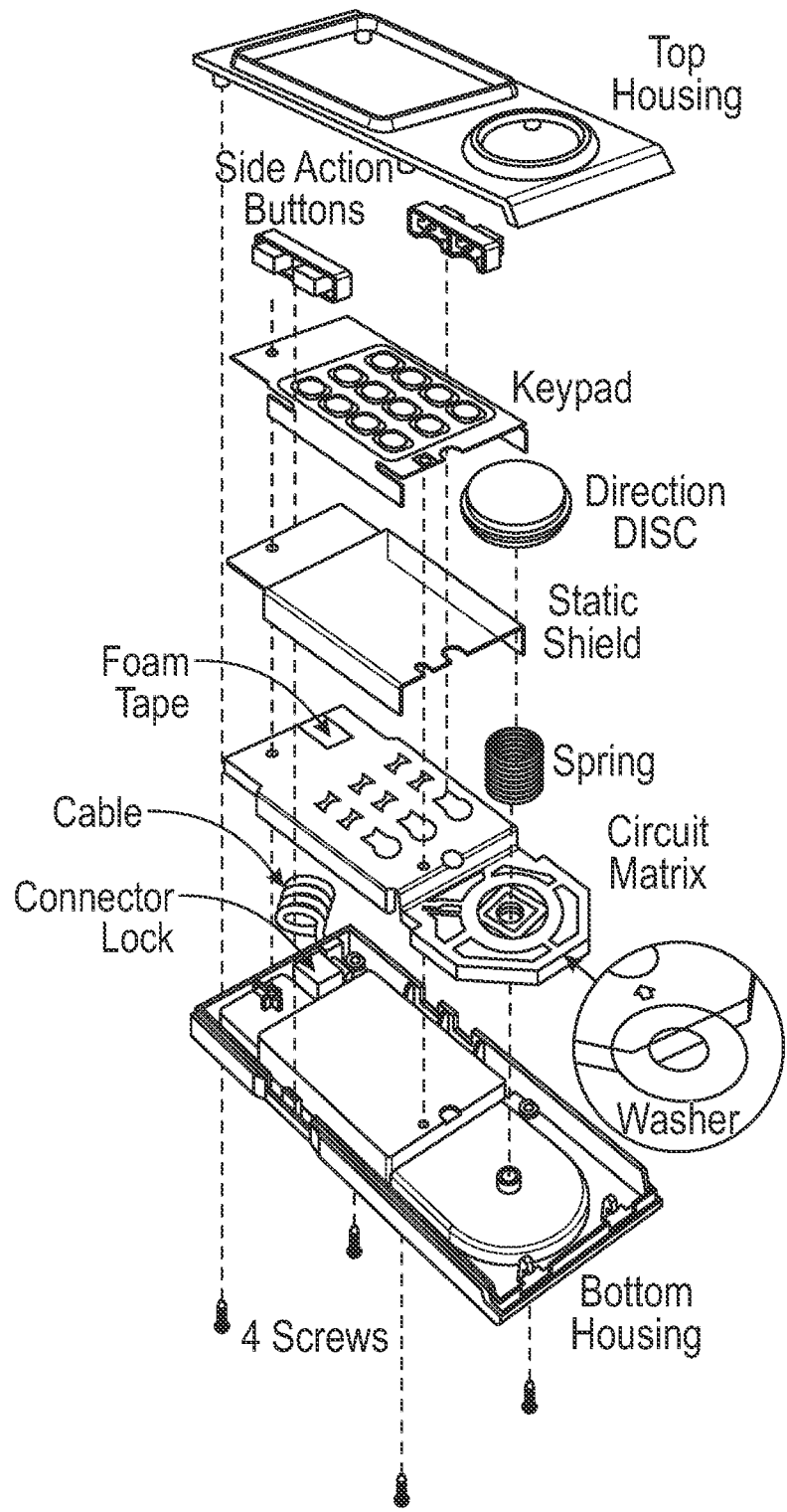
Figure 2A:
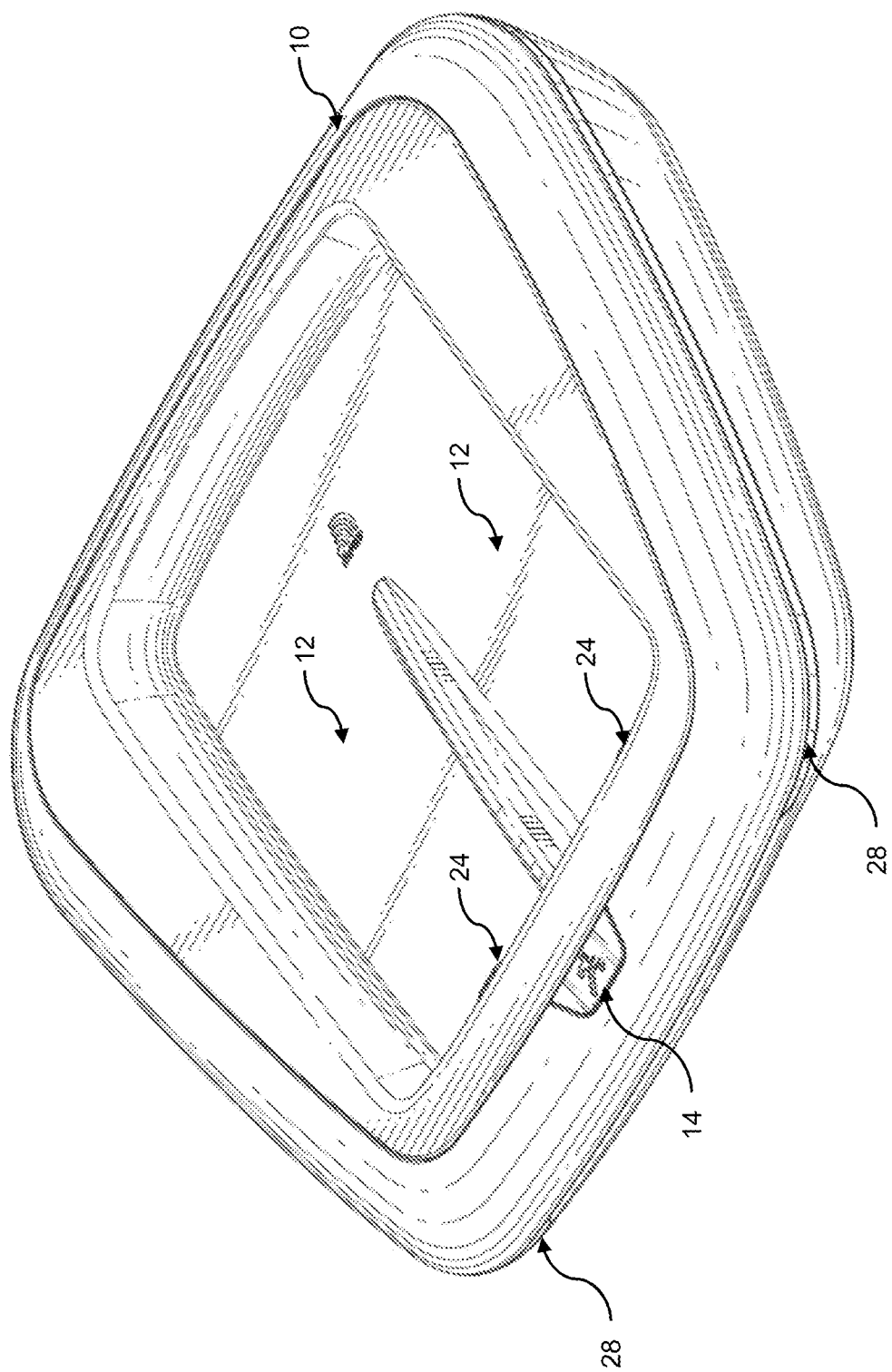
Figure 2B:
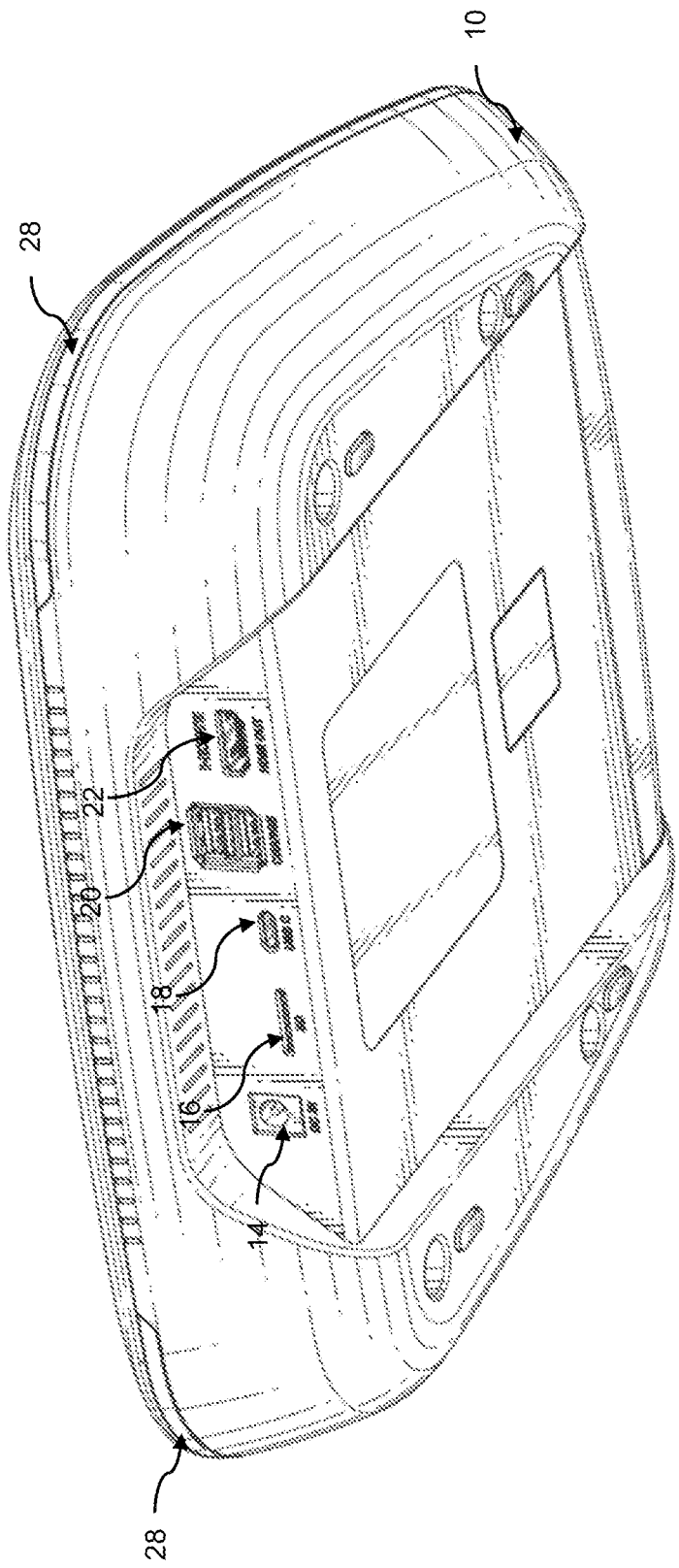
Figure 2E:
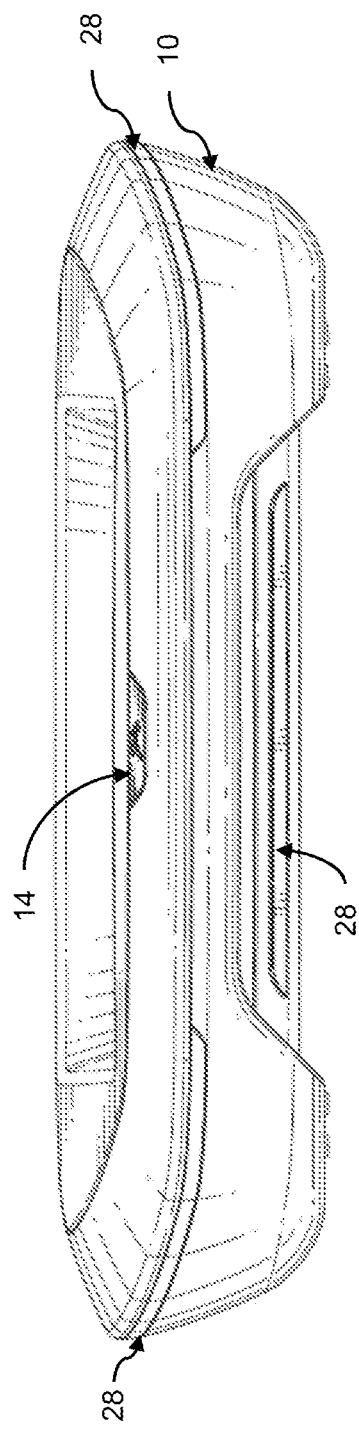
Figure 2F:
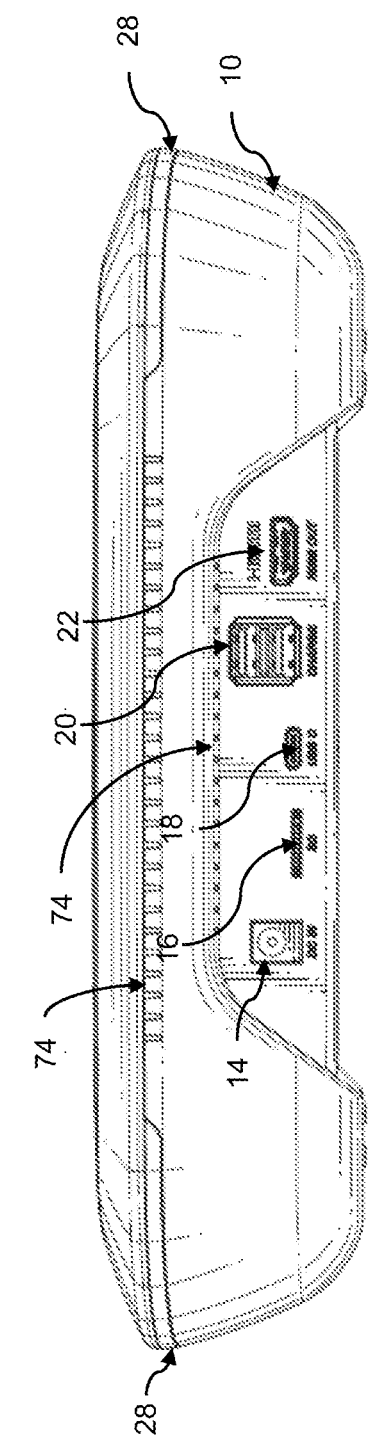
Figure 3B:
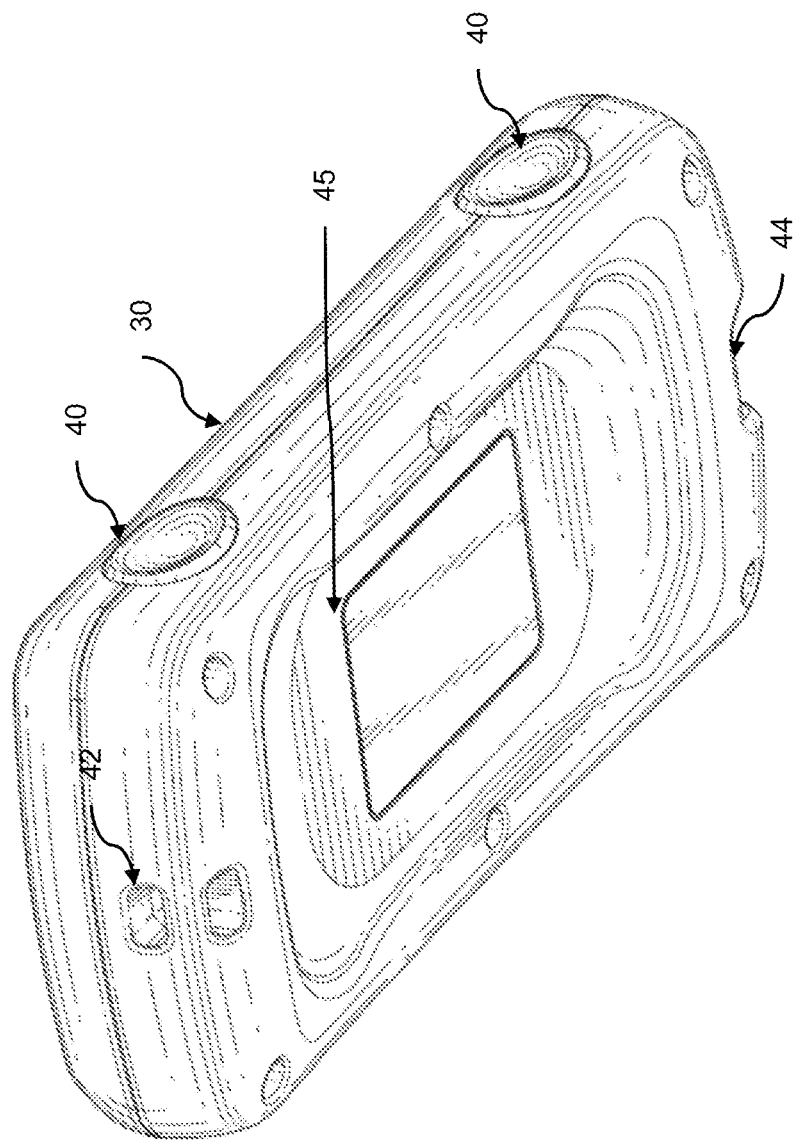
Figure 3D:
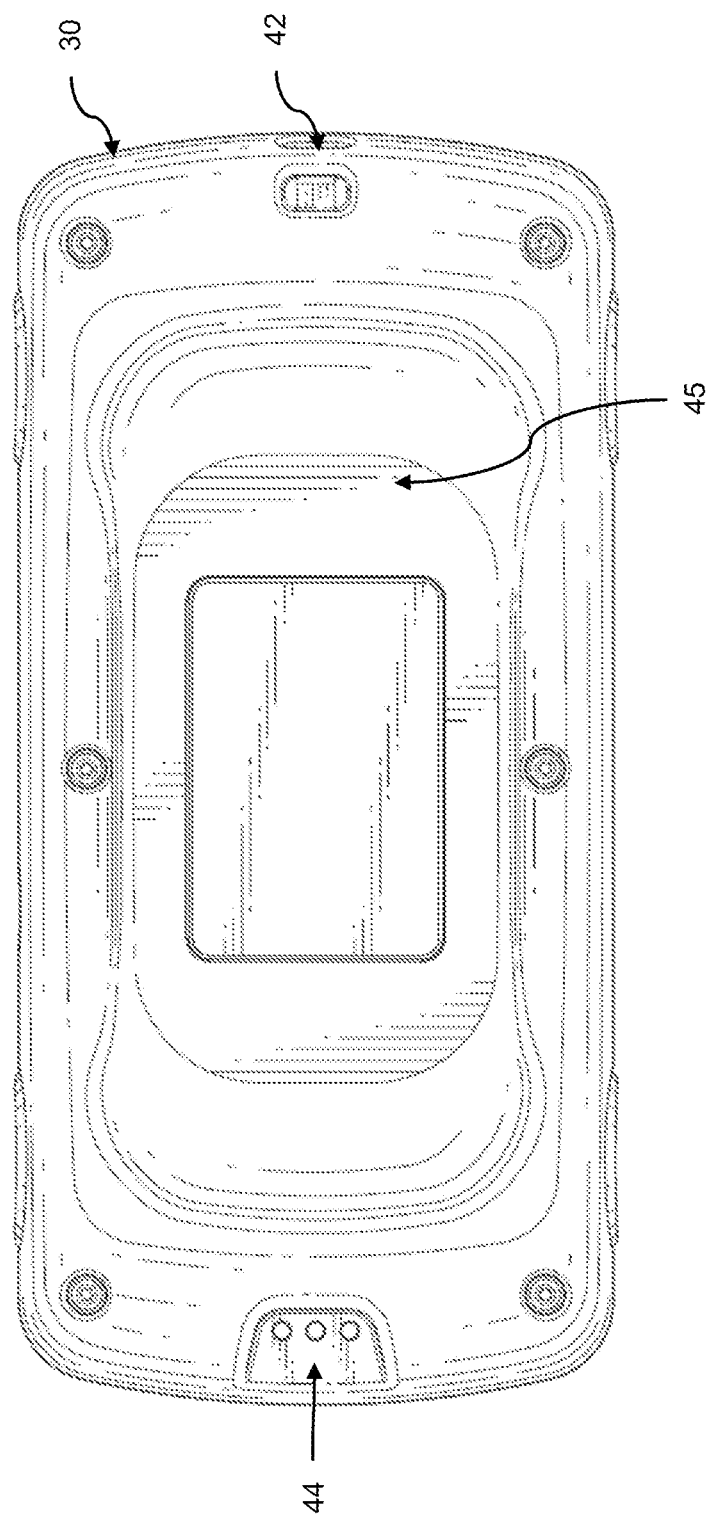
Figure 3F:
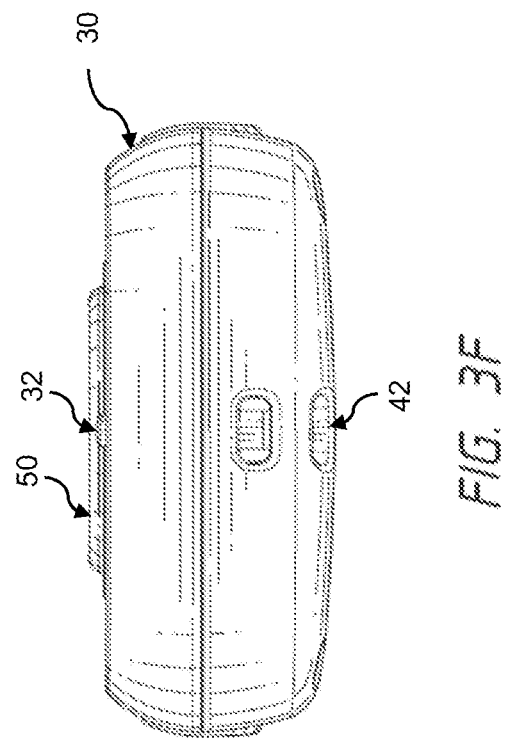
Figure 3E:
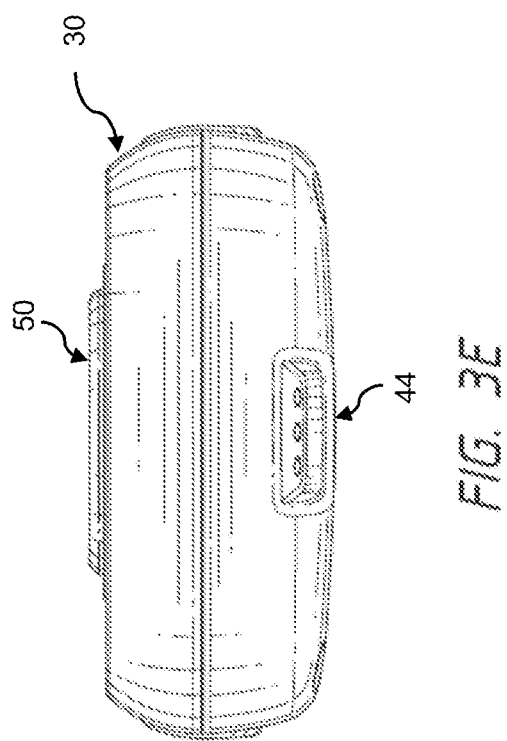
Figure 3G:
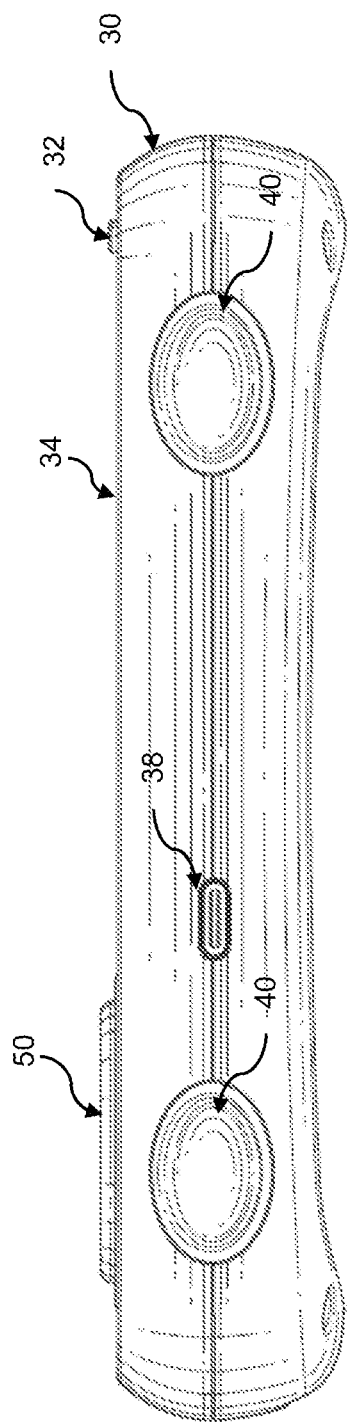
Figure 3H:
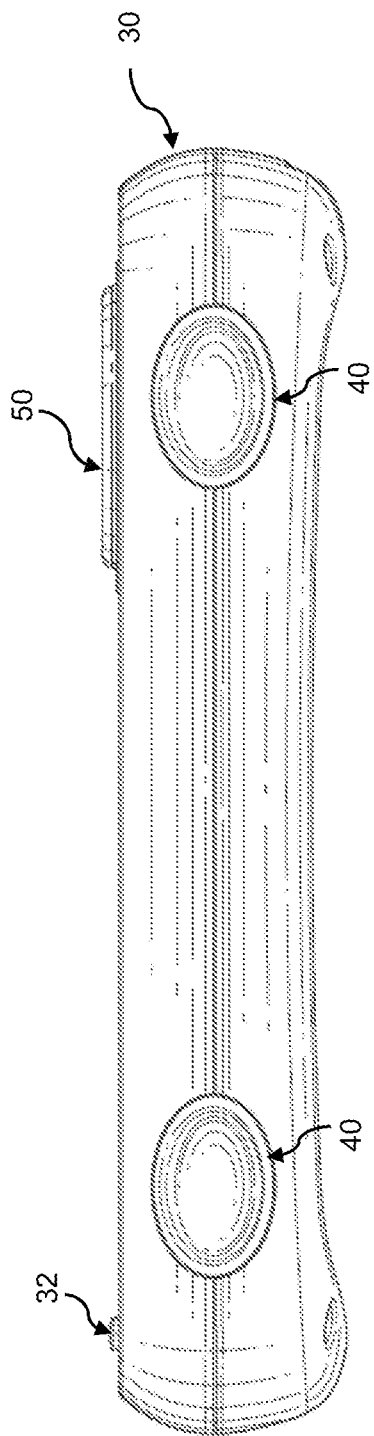
Figure 31:
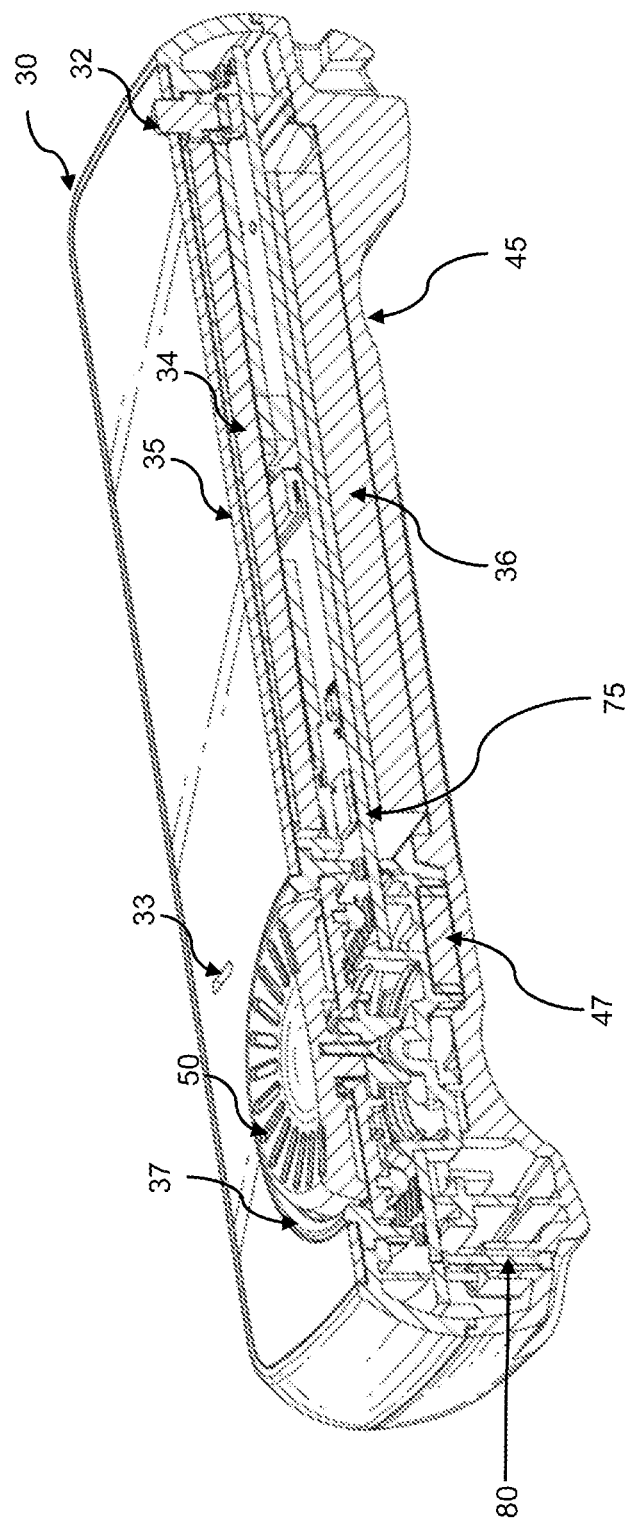
Figure 3J:
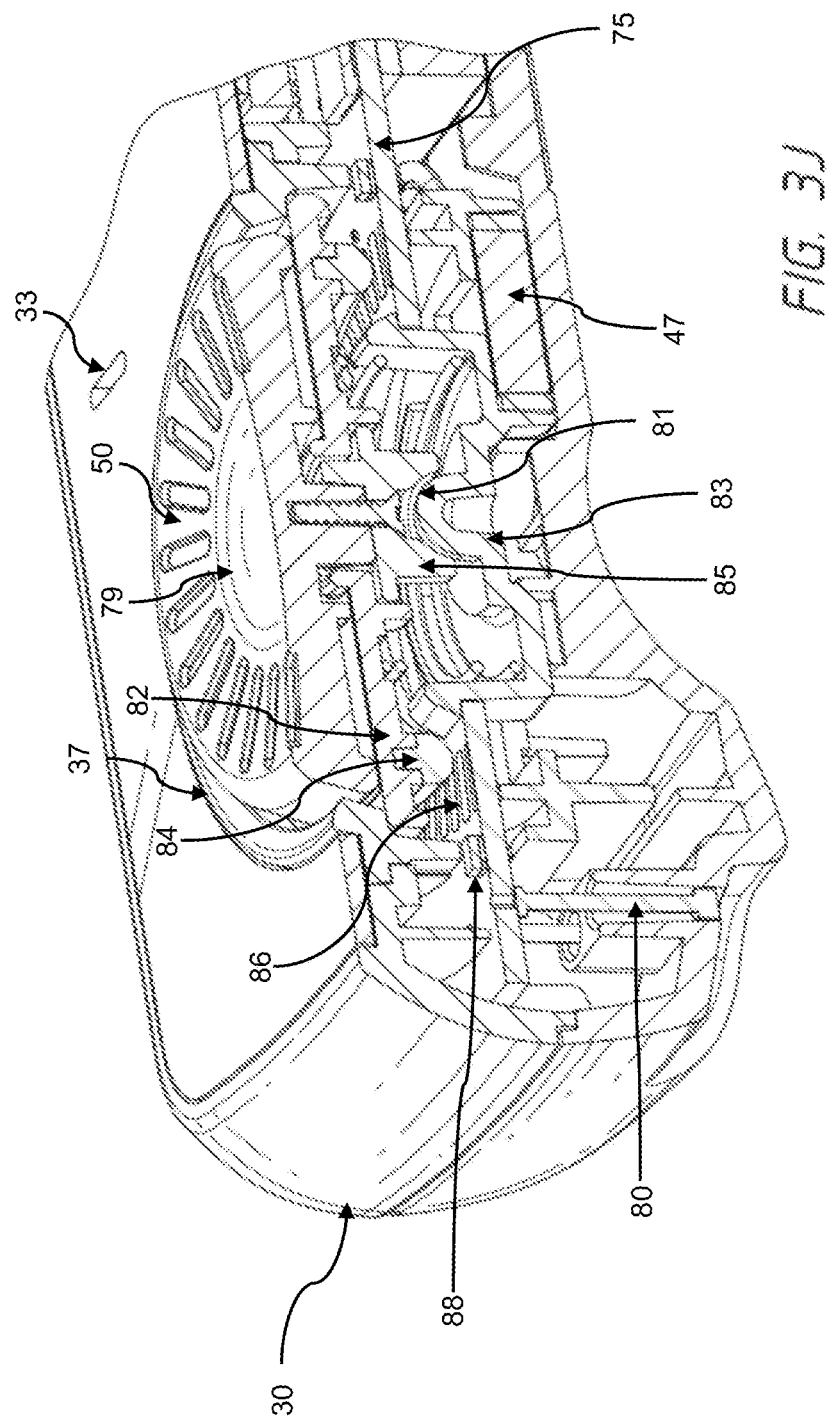
Figure 3K:
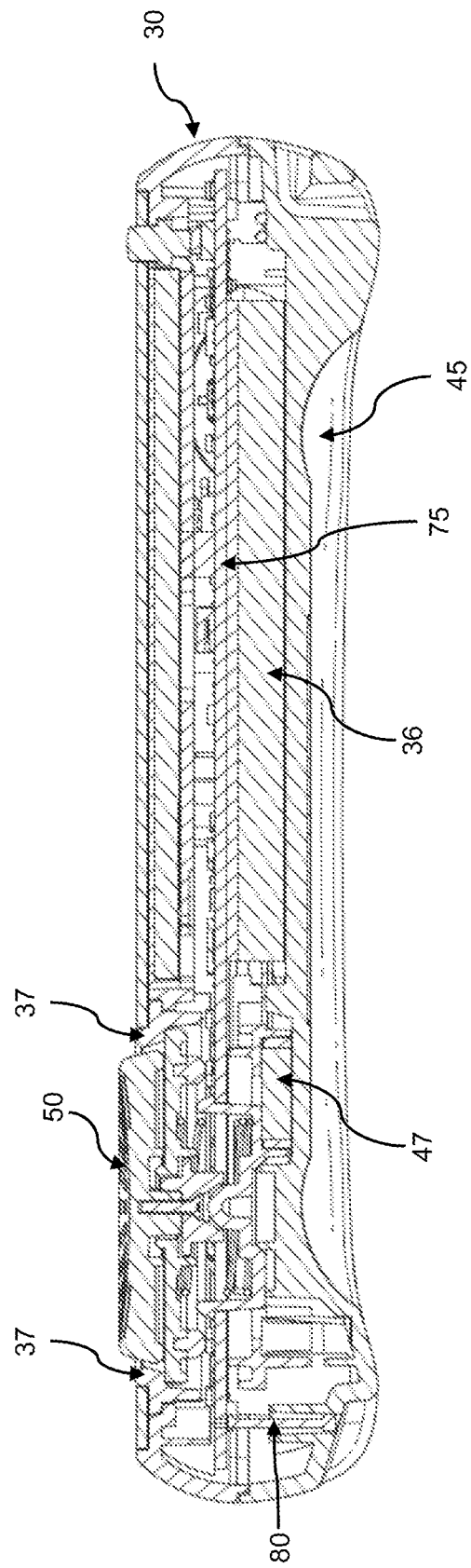
Figure 3L:
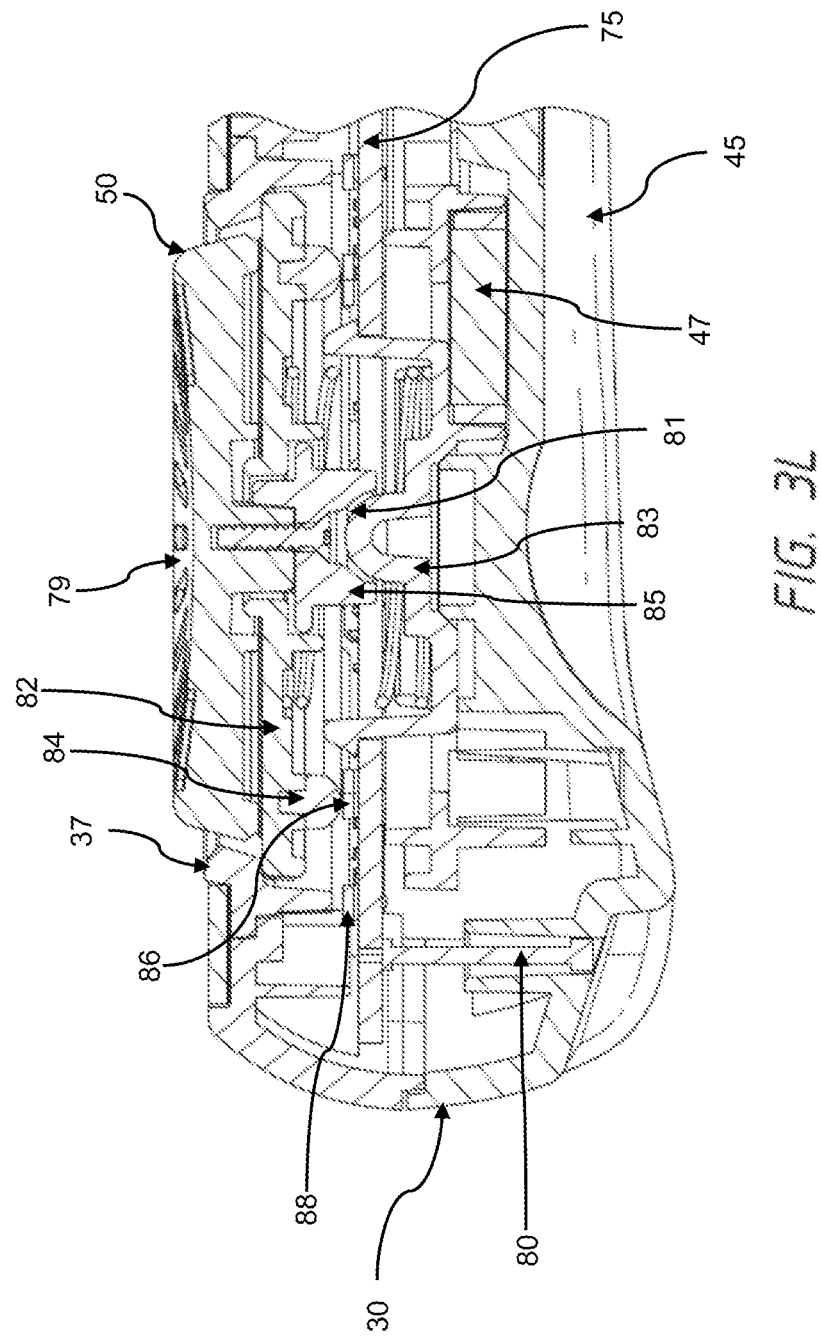
Figure 4B:
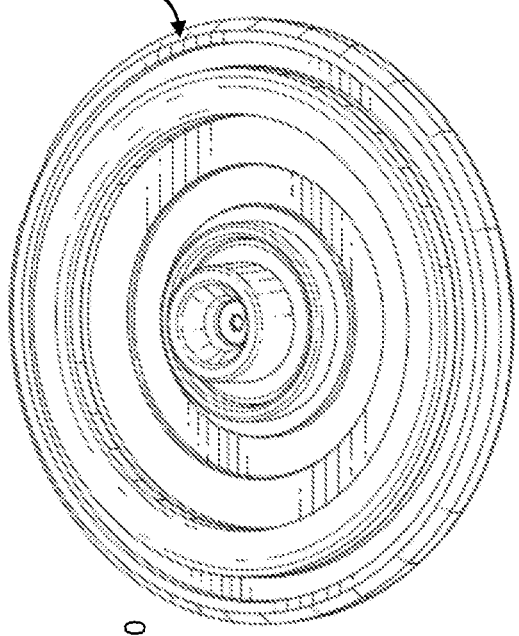
Figure 4A:
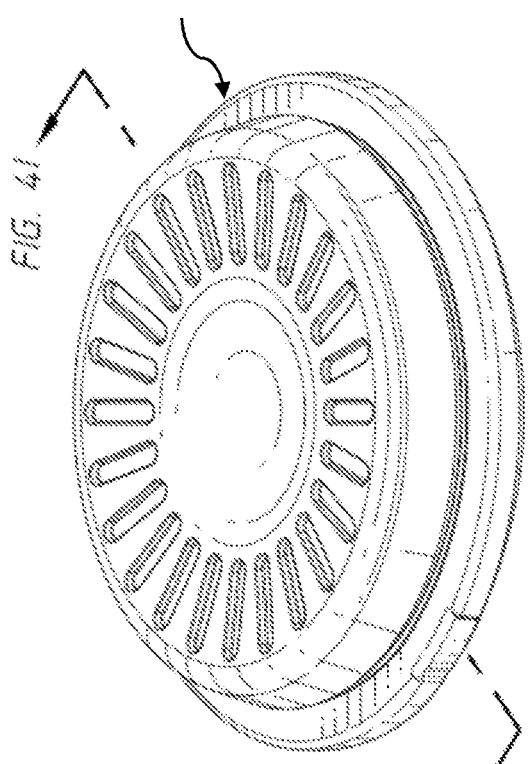
Figure 4D:
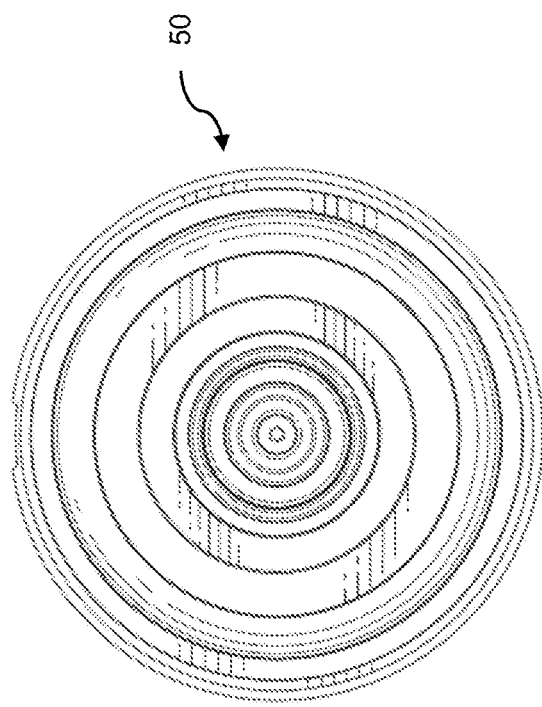
Figure 4C:
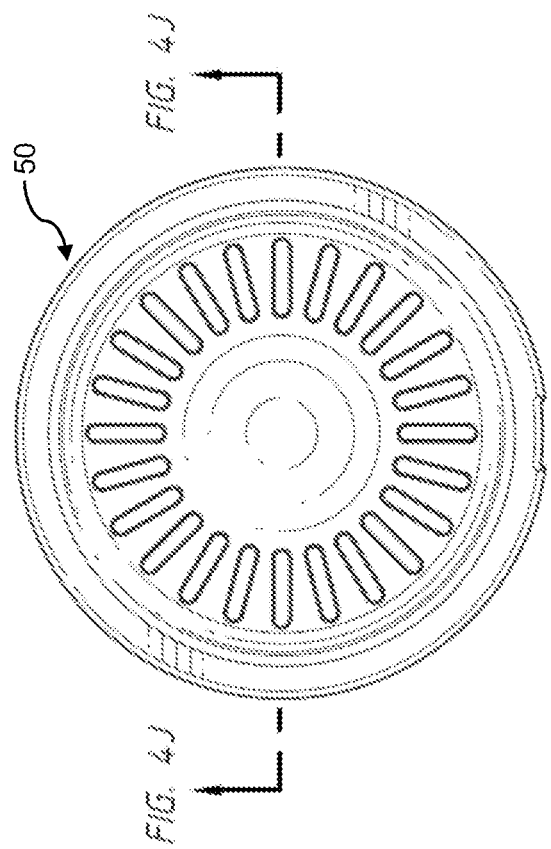
Figure 4F:
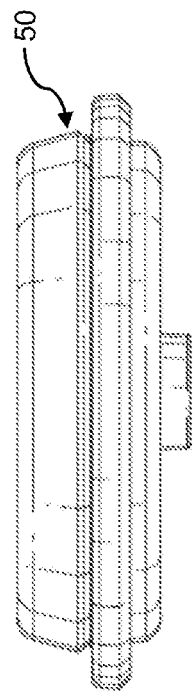
Figure 4E:
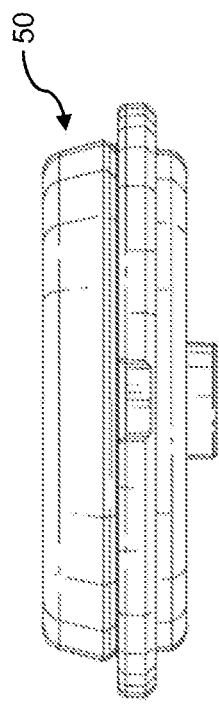
Figure 4H:
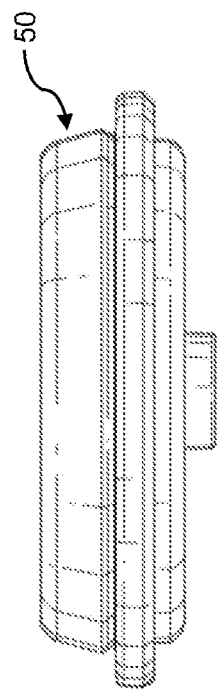
Figure 4G:
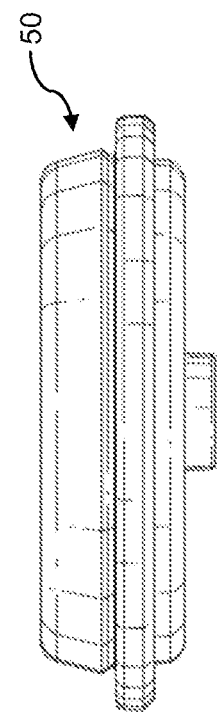
Figure 41:
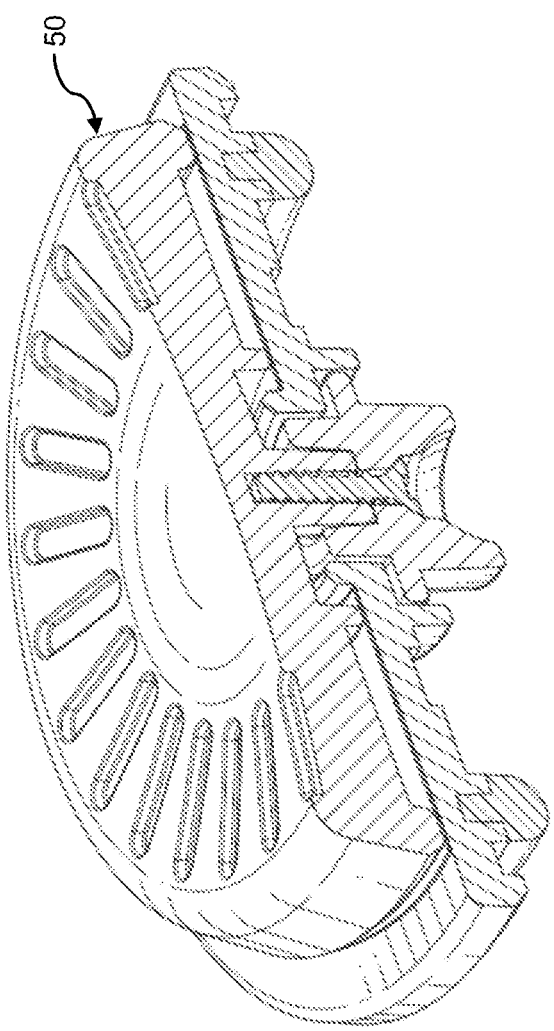
Figure 4K:
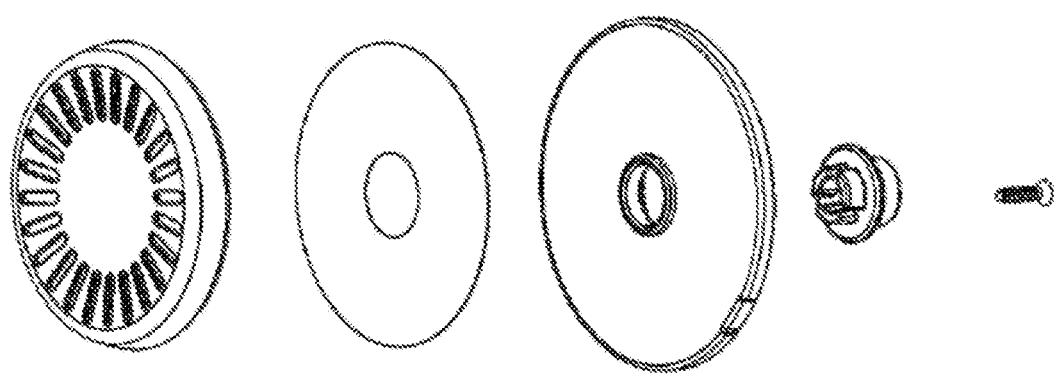
Figure 51:
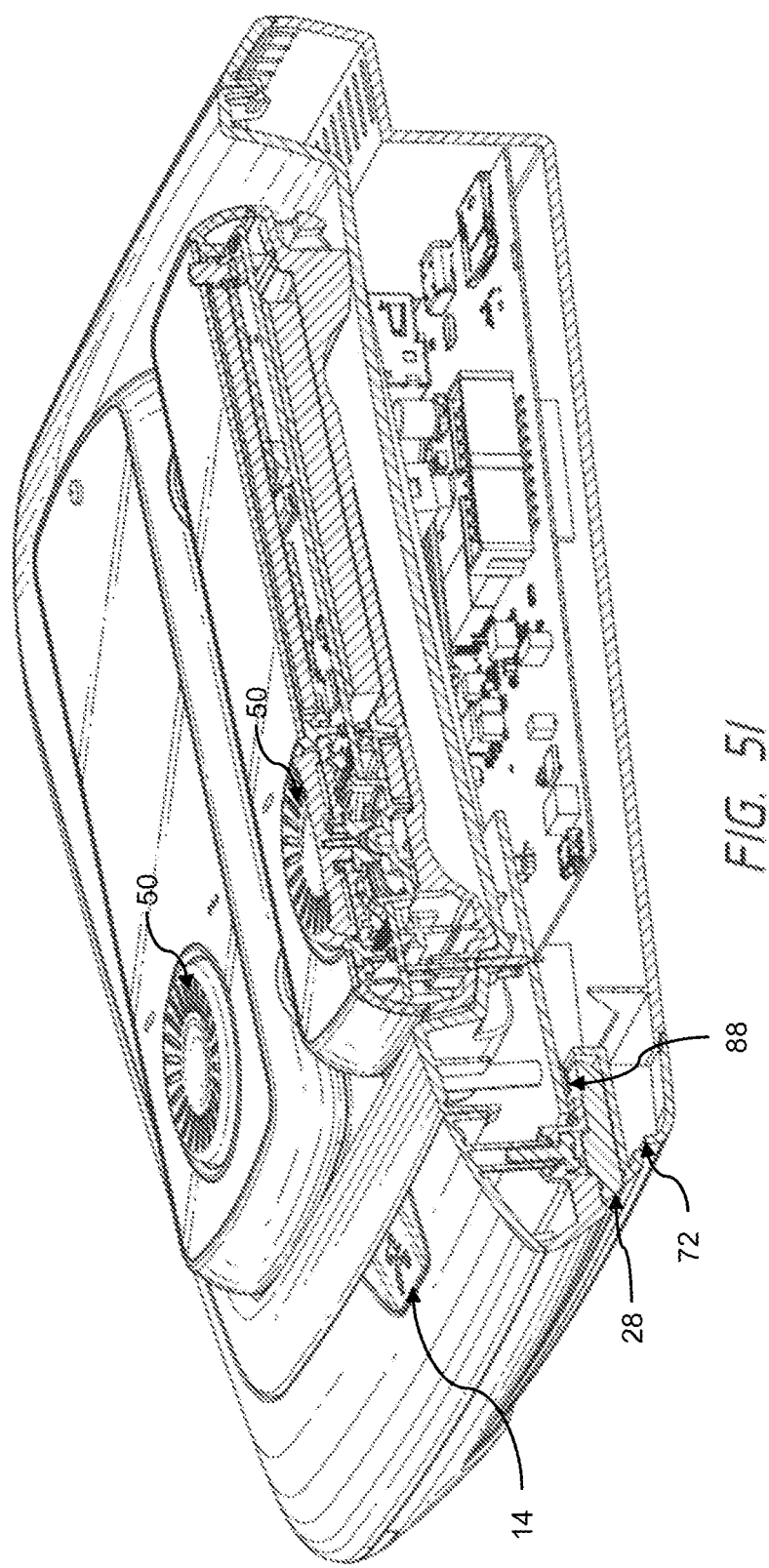

There are a number of gaming platforms available to consumers. For example, consumers can play on mobile devices (e.g., cell phones, tablets, Nintendo Switch, etc.), consoles (e.g., PlayStation, Xbox, Nintendo Switch, etc.), and computers (e.g., PCs or the like). Games designed for consoles are designed for experienced players. For instance, many games require a certain level of skill to play in order to beat the game. With respect to multiplayer games, an inexperienced player may have a hard time improving or winning if they play experienced players and the inexperienced player may quickly stop playing.

The embodiments described in this application for patent seek to provide a console and gaming platform that is easy to play and control, for example by balancing game experience between player or gainers and non-gamers (e.g., inexperienced players) to improve gameplay when gainers and non-gamers play a game together. For example, in some embodiments, the hardware devices described herein can provide one or more players an opportunity to play games with each other at a balanced level. A game balancing system can be included locally or remotely, or both, that adjusts portions of games as the games are being played so that players playing the game can experience balanced gameplay. For instance, if a first player is very experienced at a particular game, with a particular controller, and/or with similar games, and a second player is not experienced, then the game balancing system can adjust features of a game being played by both the first player and second player so that the gameplay and/or the outcome of the game appears to be more even. For example, the first player may lose or have reduced abilities or benefits in the game, the second player may gain or have enhanced abilities or benefits in the game, or both. The effect would be that the gameplay and/or the outcome (e.g., win/loss ratio) would be even between the players.

In some embodiments, the game balancing system can adjust features of the game on-the-fly during the game, or in between each game or set of games. It is advantageous that any adjustments to the game made by the game balancing system are effective, but also do not limit the functionality of the game. In some embodiments, adjustments to the game made by the game balancing system are implemented at a time and rate that does not interfere with gameplay in a significant way. For example, adjustments can be implemented starting from a base and adjusting slowly away from the base to a target value. In another example, adjustments can be made instantaneously at the target value.

In some embodiments, the features that can be adjusted by the game balancing system can vary between each game based on the particularities of the game. For example, a first person shooting game may allow for adjustments of speed, level of weaponry or armor, environmental variables (e.g., wind, rain, visibility such as brightness or fog), size of targets, size of bullets, bullet damage, shooting rate, snap-lock for targeting (e.g., if a player is within a certain number of pixels of a target the target can be locked on with a snap for a period of time), or the like. In another example such as pong, the paddles can be adjusted. Some games may include one element or feature that can be adjusted, and other games may have multiple elements or features that can be adjusted. In some embodiments, the game balancing system can use artificial intelligence or machine learning to automatically implement adjustments to particular features in a game. The game balancing system can decide which features to adjust and by how much to adjust the features. In some embodiments, a set of adjustable features can be provided to the game balancing system and the game balancing system can adjust some or all of the provided features.

In some embodiments, a gaming console can include a parental control settings menu via a graphical user interface. In some embodiments, the graphical user interface can be accessible via system menus, via a physical device, via a mobile platform, or in any combination. For example, having the parental control setting menu accessible with a physical key would limit unauthorized access (e.g., by a child) and also be a convenient way of accessing such settings without remembering a password, or navigating a complex menu. For example, the physical device can include a microchip (e.g., RFID, NFC, or the like) that can interact with the gaming console or gaming controllers to open and access the parental control settings menu.

Embodiments presented herein use machine learning algorithms in various implementations. Systems presented herein can use a parameter function or a prediction model to predict or estimate ways to balance a particular game by adjusting features or elements of the game so that players playing the game experience more balanced play, for example. In some embodiments, player control data, player game data, game match data, balancing data, and/or player data for each player playing a selected game together is fed into a machine learning system to generate a prediction model that determines what features of the selected game to adjust and by how much to adjust the features.

Example Gaming Console

FIGS. 2A-2H illustrate an embodiment 10 of a gaming console (e.g., gaming console 101 as described in more detail herein) to be used with one or more gaming controllers (e.g., gaming controllers 140 and/or gaming controller as illustrated FIGS. 3A-3L). In some embodiments, the gaming console is configured to connect to multiple gaming controllers (e.g., 2, 4, 8, 16, or more gaming controllers), mobile phones, tablets, or other portable electronic device. For example, a downloadable application can be installed on a mobile phone so that the mobile phone can be used as an additional controller. In some embodiments, gaming controllers can be placed on the gaming console at locations 12 to charge and/or connect to the gaming console (e.g., with RFID or the like). For example, a gaming controller can pair with the gaming console 10 with RFID by being placed on location 12. In some embodiments, electrical connections 24 can be used for connecting to the gaming controllers (e.g., via connections 44 in FIG. 3D), Also, in some embodiments, there can be a button or indicator 14 that can be used to turn the gaming console on/off, connect or pair the console to one or more gaming controllers or other devices, indicate the gaming console is turned on/off, indicate other information (e.g., data transfer, connection status, boot up status, etc.), restart the system, reset the system, restore to factory default settings, a combination of features, or other settings. In addition, the button or indicator 14 can include a backlight LED (e.g., by using an LED that is a singular color or a multi-color, and optionally with a light pipe combination). In some embodiments, the shape of the controller can be designed to be ergonomic so that a player can hold the device comfortably in a vertical or horizontal configuration. For example, rear surface 45 includes features that enhance gripping and ergonomic utility of the gaming controller.

In some embodiments, the gaming console includes image processing and graphics capabilities. In some embodiments, the gaming console includes an onboard interactive lighting technology (e.g., by using an LED control engine similar to 110 and one or more LED lights). For example, gaming console lighting (e.g., lighting 28, button 14, or other LED lighting included on the gaming console) may enhance gameplay and/or provide room ambiance. The lighting may flash, flicker, change color, and the like to set a mood, increase or decrease tension during gameplay, soothe after gameplay or any of the like. Also, for example, the LED lights may be included on a circuit board (e.g., 75, 76, or the like) and a corresponding light pipes can be used that disperse one or more LED lights. For example, lighting 28 on the gaming console 10 can be one or more light pipes with corresponding LED lights used to light up the light pipes 28. In addition, on the gaming controller, the light ring 37 can be a light pipe with one or more corresponding LED lights 88 used to light up the light ring 37. In some embodiments, LED lights can be used on the gaming controllers to indicate which buttons should be pressed to result in a certain on-screen action, which can provide a guided gameplay experience. For example, an LED light (or LED light and light pipe combination) can be located in close proximity (or within) a button that can light up when the button should be pressed. In some embodiments, and as described in more detail herein, the gaming controllers may also include lighting or otherwise be incorporated into the lighting display. In some embodiments, multiple LED lights 88 can be used for each light pipe. For example, the lighting 28 can use a number of LED lights (e.g., 1, 2, 5, 10, 15, or more) so that the light pipe shows a relatively uniform brightness around the gaming console. In some embodiments, the LED lights 88 are electronically coupled to a circuit board that receives power to power the LED lights 88.

In some embodiments, the gaming console can include WiFi, Bluetooth, Ethernet, and/or any other form of wired or wireless connectivity. In some embodiments, the gaming console can include video output 22 (e.g., HDMI or the like). In some embodiments, the gaming console can include one or more USB ports 18, 20 (e.g., USB 2.0, USB 3.0, USB 3.1, USB C, or the like). In some embodiments, the gaming console can include one or more power ports 14 and/or 18 (e.g., USB port, power port, or the like) for powering the gaming console or charging the gaming console and/or gaming controllers (e.g., if an internal power source such as a battery is used). In some embodiments, the gaming console can include a memory slot 16 (e.g., for SD cards, mini SD cards, micro SD cards, or the like). In some embodiments, the gaming console can include mounting elements so that the gaming console can be mounted on a surface or wall. In some embodiments, the gaming console can include paddings 26 to be set on a surface.

Figure 5A:
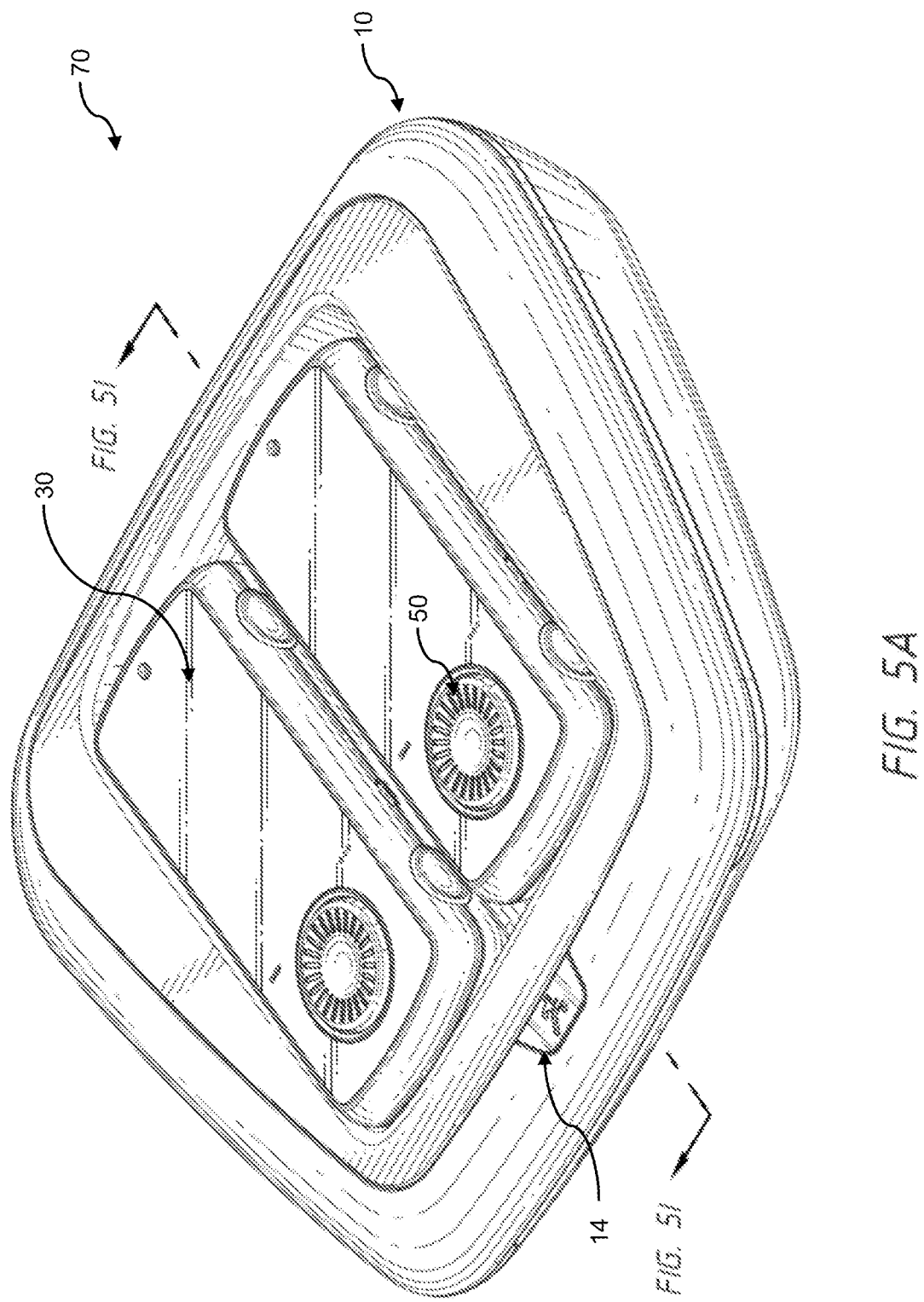
Figure 5B:
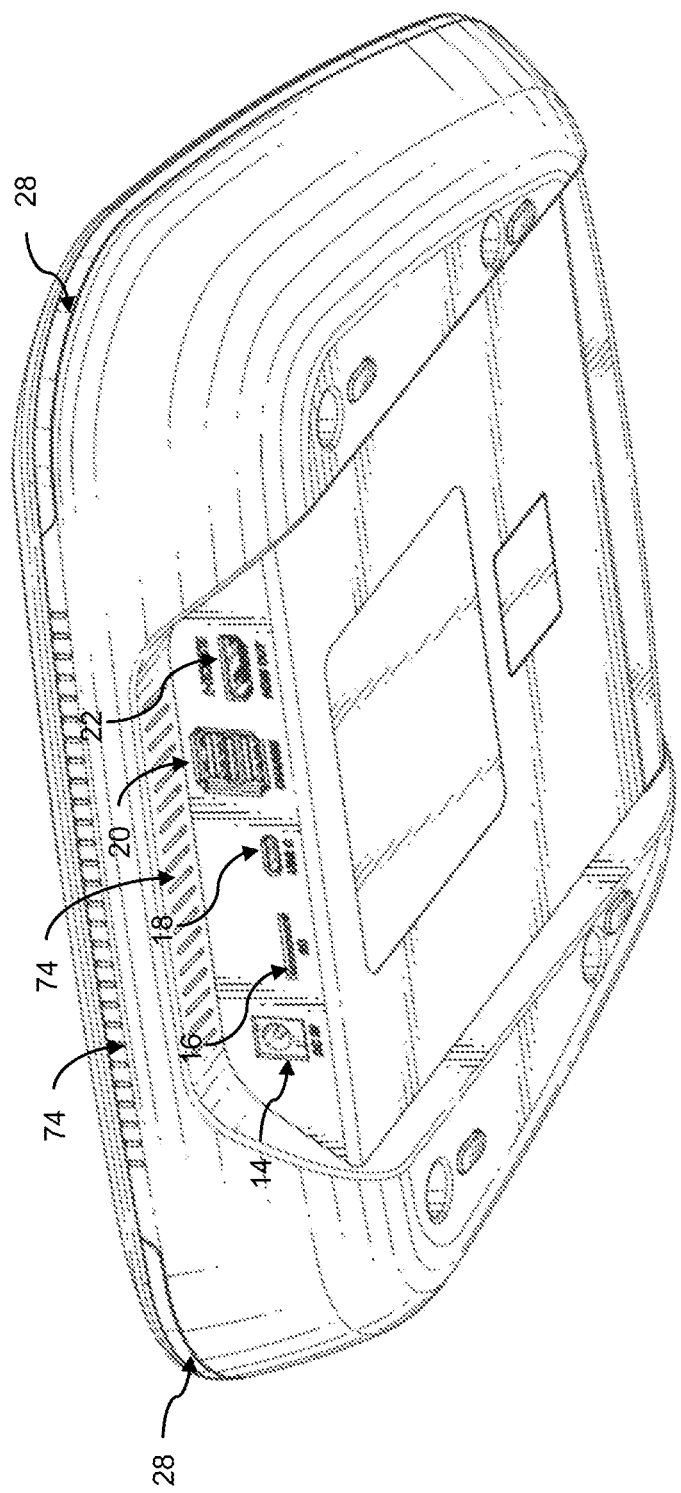
Figure 5J:
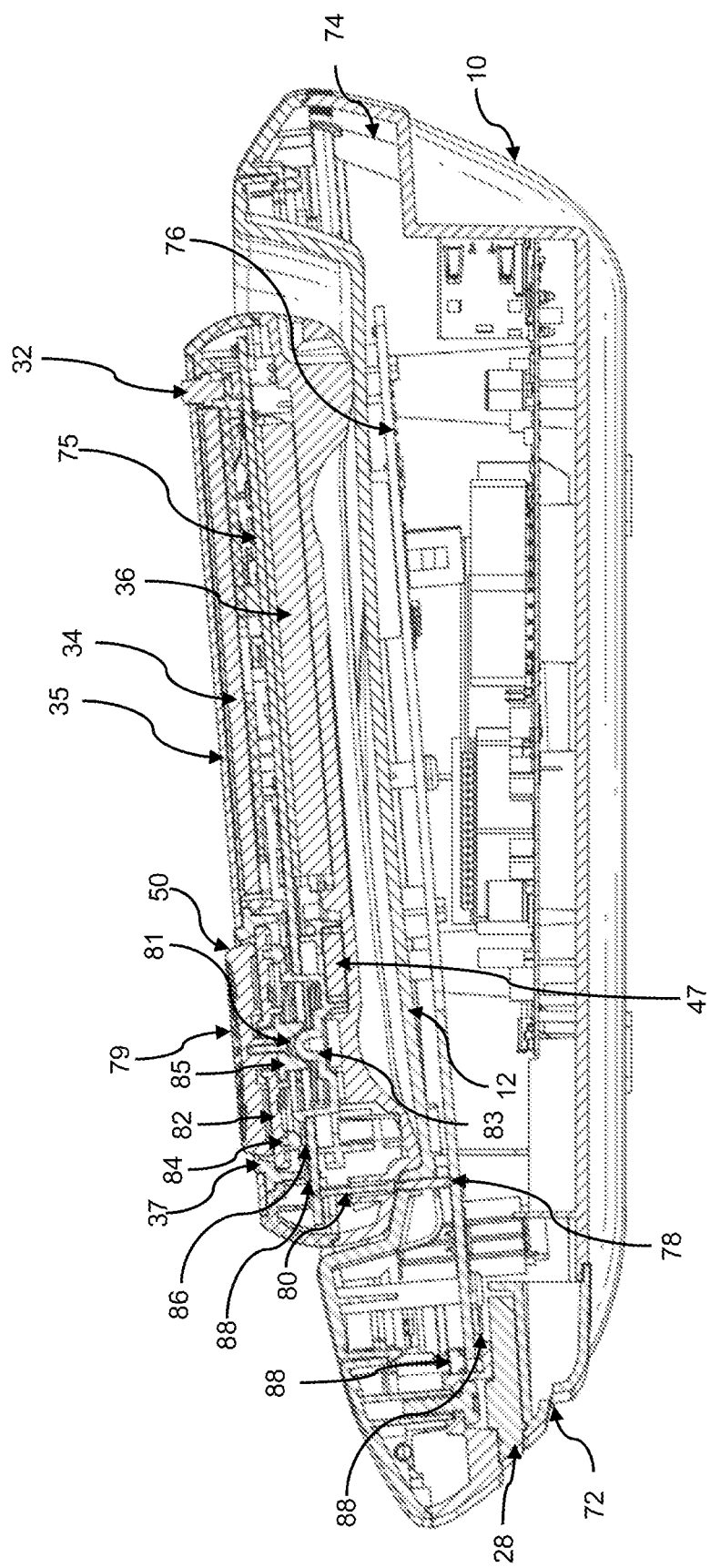

In some embodiments, the gaming console can include a passive or active cooling technology. For example, an active cooling system could include one or more fans or liquid cooling components to cool the internal electronics. Also, a passive cooling system can be used as well. For example, the gaming console, as shown in FIG. 5J, can include a partially slanted configuration that can be used to allow cooler air to passively or actively enter the system at a lower intake vent 72, pass over the electronics while absorbing the heat, and exhaust out of the higher outlet vent 74. In some embodiments, a slant in circuit board 76 (e.g., PCB or the like) in the gaming console can also help to enhance cooling. For example, the air can move across the slanted circuit board 76 from intake vent 72 to outlet vent 74. Moreover, the slanted configuration of the circuit board 76 and the components above circuit board 76 can be configured so that the gaming controller 30, when set on the surface 12 of the gaming console 10, can slide into place so that the pins 78 (e.g., pogo pin or spring-loaded pin or the like) of the gaming console 10 are in electrical contact with connection 80 in the gaming controller 30. In some embodiments, the gaming console 10 can include one or more circuit boards (e.g., PCBs or the like) that are used to connect to various electrical components housed within the gaming console.

In some embodiments, the gaming console can include a system expansion interface. For example, the gaming console can include one or more expansion ports for connecting accessories to the gaming console. In some embodiments, the one or more expansion ports can be hidden within the housing of the gaming console. For example, electrical interfaces associated with the expansion port can include a port, digital input/output, and power so that a small robot, small remote controlled car, or other device can be connected. In some embodiments, additional functionality or processing power can be added by connecting hardware to the expansion ports. In some embodiments, the one or more expansion ports may be used to interface to other peripherals that the gaming console plugs into or connects to.

Example Gaming Controller

FIGS. 3A-3L illustrate an embodiment 30 of a gaming controller to be used with the gaming console (e.g., gaming console 10 or 101) illustrated in FIGS. 2A-2H. In some embodiments, the controller is reminiscent of the basic geometry of the 1970/80's Intellivision controllers. As shown in FIG. 1A-E, the controllers had a numeric keypad, a "dpad" type disk and four buttons. The controller allowed "cards" or "overlays" to be slid into place over the keypad, so games could be customized with graphic icons representing various game actions.

In some embodiments, the gaming controller (e.g., gaming controller 140 described herein) can include a housing with internal components and electronics. For example, the gaming controller can include one or more of the following: a touchscreen or display screen 34 (e.g., a 2-5 inch (2:3 aspect ratio) display screen with a touch sensor); a tilting positional disc or disc wheel 50; a surrounding interactive light ring 37 around the disc wheel; one or more RFID tags and/or readers; controller buttons (e.g., arcade-style buttons 40, button 32, etc.); force feedback on based on gameplay, buttons 32 and 40 presses, and/or interactions with the display screen 34; an inertial measurement unit (IMU) sensor (e.g., 147 describe herein) that includes one or more of: an accelerometer to measure translation and rate of translation, a gyroscope to measure rotation and rate of rotation, and/or a magnetometer to measure orientation relative to magnetic north; wireless charging area 44 (e.g., using the Qi wireless standard); one or more speakers (e.g., 33); one or more cameras; one or more microphones (e.g., 35); internal power source or battery 36; memory; processor; electrical connection port 46 for connecting to the gaming console (e.g., via connections 24); one or more memory storage slots for upgrading memory; a wireless communication device (e.g., WiFi and/or Bluetooth); an arm strap or lanyard connection 42; and the like. In some embodiments, using the components, the gaming controller can be used horizontally or vertically including dominant left or right hand usage to play games. For example, a WiFi/Bluetooth module or chip can be included in the gaming controller. Also, at least some of the internal components and electronics can be connected to a circuit board 75 (e.g., PCB or the like). In some embodiments, button 32 can be programmed to turn the gaming controller on/off, turn the screen of the gaming controller on/off, put the gaming controller to sleep, custom programming, or the like.

In some embodiments, the WiFi/Bluetooth chip can be used to enable support for multiple players on a gaming console, for example, 8 or 16 or more players. In some embodiments, a mobile phone app can be used to allows a mobile device (e.g., a phone or tablet using the IOS or Android operating systems) to emulate a game controller. This is particularly useful for large games that might have many players like trivia or even sports games.

In some embodiments, one or more RFID tags and/or readers can be included in the gaming controller and/or the gaming console. For example, the RFID chips can be integrated into gaming consoles and gaming controllers so that each gaming controller can connect to one or more gaming consoles with the ability to download digital games/products stored on a gaming console, or stored remotely on another gaming console that is not connected with the RFID, or stored on a gaming server (e.g., gaming server 120 described in FIG. 6 and herein). For example, the gaming controller can be configured to store a digital key for a game or product that can be used to verify the download. In some embodiments, the gaming controllers and/or gaming console can also be configured to store digital software product keys via RFID onto one or more physical items that also include an RFID tag, so that the one or more physical items includes the digital download key for the game/software as received from the gaming controller. In some embodiments, the gaming console includes an active RFID reader. In some embodiments, the gaming controllers include passive RFID tags. In some embodiments, the RFID technology can be used to handshake the devices and transfer data (e.g., game content or the like) between the devices (e.g., with WiFi, Bluetooth, or the like).

In some embodiments, a touchscreen or a display screen 34 can be included in the gaming controller. For example, a high resolution IPS LCD/OLED screen that can used that can also be configured to include a virtual "numeric pad" and/or other input configurations on the screen. For example, the LCD/OLED can support touch (e.g., capacitive touch for tapping, pinching, and swiping motions). Also, for example, the screen can be on the order of 3" diagonally, a rectangular aspect ratio with a resolution of 240×160 RGB pixels or more. However, other sizes, resolution, and pixel density can be implemented. In some embodiments, the controller could actually play games on the controller display. In some embodiments, the display screen 34 can be covered by a protective cover 35. For example, the protective cover 35 can be made from acrylic (e.g., PMMA Acrylic or the like), plastic, glass, a composite, or the like. In some embodiments, the display screen 34 can be bonded to the protective cover 35. In some embodiments, no protective cover 35 would be needed and the display screen 34 can be used without a protective cover 35. For example, the display screen 34 may include its own protective layer. In some embodiments, the WiFi/Bluetooth chip and computing power native to the gaming controller can be powerful enough to execute gameplay on the touchscreen or a display screen 34. In some embodiments, private information can be displayed on the display screen 34 that corresponds to a gaming being played on an associated gaming console. For example, multiple players can be playing a trivia game on a gaming console and each player can interact with the gaming controller (e.g., by touching the display screen to select an answer, or using a button or disc wheel, or other input) to provide an answer. In another example, a first player can receive a prompt on the first player's gaming controller via the display screen containing a word that the first player must act out, and other players must enter their guesses on their own gaming controllers.

In some embodiments, the gaming controller can include force feedback motor(s) 47 inside. For example, the gaming controller can include 1-3 force feedback motors, or more motors, to simulate force on the right, left, and center mass. In some embodiments, a Linear Resonant Actuator (LRA), rotating mass type (ERM), or the like can be used. For example, a small motor with an eccentric weight can be spun at varying RPMs and this creates a vibration to help "sell" explosions and virtual vibrations in the game. For example, the force feedback can be used to enhance button presses as well as providing force feedback when touching the touchscreen 34.

In some embodiments, the gaming controller can include wireless and/or contact-less (e.g., no electrical connection being made) charging. Any wireless charging standard can be used and implemented. For example, a Qi inductive charging system pronounced "CHEE" from the Chinese word "qi" meaning "energy flow" can be used. The controller can be laid on top of a gaming console or a charge pad to charge wireless. In some embodiments, the controller can also include a wired connection for charging, such as USB C (e.g., port 38 in FIG. 3G). The Qi charging protocol uses two antennas, one on the charger and one on the device being charged. Energy is transformer-coupled from the charger to the device being charged. Qi considers safety as well as allows bi-directional data exchange over the charging antennas as the device is charging.

In some embodiments, the gaming controllers can include an internal power source (e.g., batteries like lithium-ion, or the like) inside. In some embodiments, the internal power source can be charged and recharged. In some embodiments, the internal power source can be replaceable with or without tools. For example, a user or player can slide open the housing of the gaming controller or remove a single screw and change the power pack very easily. In some embodiments, the internal power source can have a JST connector cable that can be used to plug into a port in the controller.

In some embodiments, there can be electromechanical input system (e.g., a disc wheel, any shaped component, or the like) included with the gaming controllers that allows a player to apply rotational and/or directional inputs to be executed in a game environment. For example, a disc can be connected to the gaming controller and be configured to be "free-wheeled," or rotated without input to allow for a more ergonomic and fluid gameplay experience. Also, for example, inputs can be provided when a player presses down on the disc with sufficient force and a decoupled conductive ring makes contact with discrete electrical contacts on a PCB such that direction and rotation can be inferred by which contacts are touched and when. Pressure can also be sensed by calculating the number of contacts being touched at a single instance, which is made possible by a low-durometer, compressible conductive ring on the disc assembly, for example. In some embodiments, a ball and socket joint is used to ensure the disc assembly is appropriately centered when pressed and a pivoting action is used in the rolling and directional pad configurations. In some embodiments, the disc is spring-loaded such that it returns to a home position when not in use.

Figure 5K:
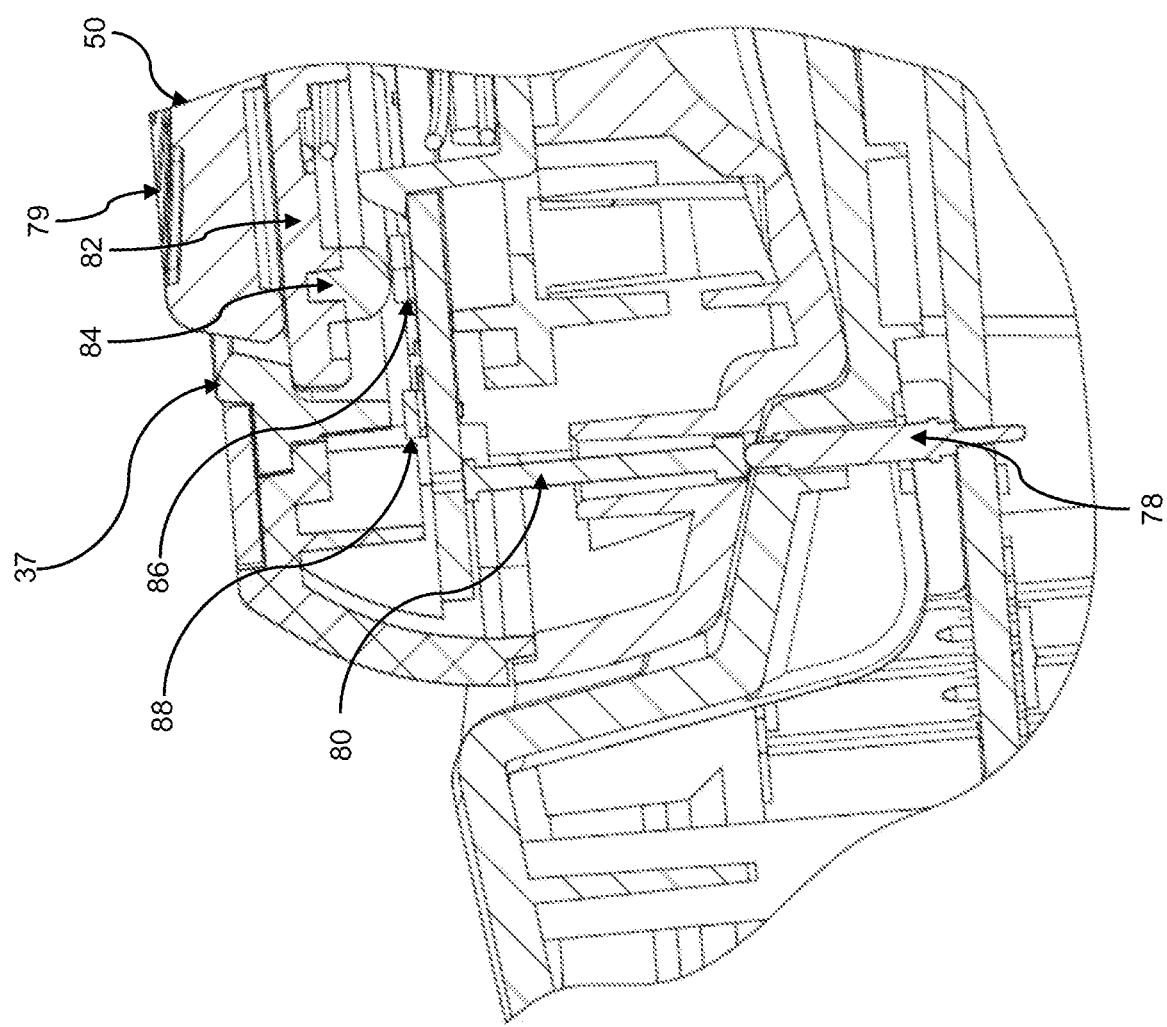

Further, in some embodiments, the gaming controllers can include a circular disk, disc, or disc wheel, as disclosed herein. For example, the disc wheel is an integral part of the gaming controller's look and feel, and the disc wheel enables many types of games and input dynamics that are not possible with joysticks, touchscreens, or D-pads. For example, the disc wheel can be mechanical with haptic feedback, and includes improvements to its aesthetics, and a better overall physical feel (e.g., so the disc wheel does not feel like a sponge on a spring when manipulated by a player). For example, by using discrete electrical contacts on a PCB and a compressible, conductive ring on the disc wheel assembly, input dynamics are unique to the gaming controller. In some embodiments, a player can spin the disc wheel. In some embodiments, the spinning of the disc wheel can provide input signals to a gaming console (e.g., to play a game or navigate a graphical user interface). In some embodiments, a player can spin the disc wheel, but no input is registered unless the disc wheel is pressed down by a player and then the player spins the wheel. For example, the hardware components facilitate a configuration that allows a player to push the wheel to facilitate contact with electrodes that provide a signal. In some embodiments, the disc assembly can also act as a directional pad. For example, a player can press down in any single direction on the disc wheel to provide game inputs. If a player presses directly right on the disc without rolling/rotating the disc, the system can register a true-right input and execute the respective action in the game. In some configurations, there can be a spring that includes a biased force upward pressing the decoupling mechanism 82 against the light ring 37 forming a seal that can also prevent water and dust from entering the gaming controller 10. Also, for example, the spring can also provide a force to return the disc to a central home position each time the disc is released by player. Also, for example, in FIGS. 5J and 5K, a player can press down on surface 79 so that contact ring 84 is in contact with electrical sensors 86. While a player presses the disc wheel 50 down and spins the disc wheel, a contact ring 84 can come into contact with electrical sensors 86 which can be used to detect whether the disc wheel 50 is spinning clockwise or counter-clockwise, and for how many revolutions. For example, a revolution can be measured by timing how long the disc wheel was spun and the speed of the spinning so that a determination can be made as to how many revolutions of the disc wheel occurred with the player's movement and in the appropriate direction. In some embodiments, each revolution of the disc wheel 50 can correspond to a number of steps (e.g., 16-64 positions, more than 64 positions, or the like) so that a partial revolution can correspond to an input. For example, $\frac{1}{64}^{th}$ of a revolution can correspond to one step, where each step can be registered as one degree of motion in a game or graphical user interface. In some embodiments, the disc wheel 50, when pressed down, can mechanically couple to a decoupling mechanism 82, which is connected (e.g., molded with or adhered to) to the contract ring 84. For example, while the disc wheel 50 is not pressed down, the wheel would not be mechanically coupled to the decoupling mechanism 82 so that the disc wheel can move freely without any movement being registered by the gaming controller or gaming console. In some embodiments, component 85 can be adhered to or coupled to the disc wheel 79. For example, when the disc wheel is pressed down, the component 85 can come into contact with ball component 83 so that the component 85 can rotate around the ball component 83 while the disc wheel 50 is spun. In some embodiments, the disc wheel can use a PCB printing method on a resistive ring and or a capacitive touch ring with haptic/mechanical feedback, with a number of unique positions (e.g., 16-64 positions, more than 64 positions, or the like), depending on how much fine-grained control is desired. In some embodiments, the contact ring 84 can be made from a material that is deformable (e.g., silicon, rubber, TPE, or the like) so that the disc wheel 50 can be compressed with a variable force, thereby compressing the contact ring. The electrical sensors 86 can detect the variance in compression of the contact ring 84 and provide a measurement of compression to the gaming controller and/or console. In some embodiments, software can be programmed to calculate, measure, and/or estimate inputs detected by the electrical sensors 86. For example, the software can calculate, measure, and/or estimate a magnitude of compressive pressure applied to the disc wheel 50, the speed of rotation of the disc wheel, and/or the direction of rotation of the disc wheel. The three calculations, measurements, and/or estimates can be used as inputs to control aspects of a gaming controller and/or gaming console, for example.

In some embodiments, the gaming controllers can include controller buttons 40 (e.g., 2 on each side of the controller).

In some embodiments, the controller buttons are mechanical with stroke, and clean click engage and release feedback. In some embodiments, the controller buttons 40 can include a hinge design that attaches the button 40 with a hinge to the housing of the gaming controller. The hinge can provide a sturdiness to the button 40 so that pressure applied to the button 40 at any place on the button 40 will be detected by the sensor. Without the hinge design, a player pressing on a first edge of the button 40 may have the first edge of the button 40 compress and an opposing end of the button 40 depress and a sensor associated with the button 40 may not actuate, for example. The hinge design can provide functionality so that when the button 40 is pressed anywhere, the corresponding sensor will detect the button 40 press (e.g., the button 40 actuates). Moreover, a hinge design can also allow for a smaller sensor, and a sensor that is spaced farther away from the button 40. In some embodiments, providing a distance between the sensor and the button 40 can allow for additional design considerations (e.g., placement of an LED light next to the button on the top surface of the gaming controller near the display screen, or in the button 40 itself). For example, the gaming controller can use LEDs to indicate which button is to be pressed to perform a certain action. The LED indicators can be used for game tutorials, but also in gameplay. Moreover, in some configurations, the special hinge design assists in making the LED pass-through possible by allowing placement of an internal button actuator farther from the button itself thereby providing additional space to include an LED light and/or LED lighting components.

In some embodiments, the gaming controllers can include one or more speakers in the controller. For example, the one or more speakers can be used to make sounds, feedback, and/or create a local sound field along with the TV set. In some embodiment, the one or more speakers can be 16-25 mm in diameter and capable of 0.5-1 W of power. In some embodiments, the one or more speakers can be less than 16 mm or more than 25 mm in diameter. In some embodiments, the one or more speakers can be capable of less than 0.5 W or more than 1 W of power.

In some embodiments, the gaming controllers can include one or more microelectronic mechanical systems (MEMS) microphone, so a player can talk at the gaming controller without a headset. The MEMS microphones can pick sounds up of a whisper, and with digital signal processing (DSP) on the gaming console, any noise detected can be processed by either the gaming controller, gaming console, or both. Additionally, in some embodiments, a wired headset jack can be added to the controller, so that a player can plug in any off the shelf headset with microphone and headphones. In some embodiments, the gaming controller can include a USB C, or similar data transfer and charging port that can be used for a headset as well. In some embodiments, the gaming controller can connect to a headset wirelessly (e.g., with Bluetooth, WiFi, or the like).

In some embodiments, the gaming controllers can include one or more expansion ports for connecting accessories to the controller. In some embodiments, the one or more expansion ports can be hidden within the housing. For example, electrical interfaces associated with the expansion ports can include a port, digital input/output, and power so that a small robot, small remote controlled car, or other device can be connected. In some embodiments, additional functionality or processing power can be added by connecting hardware to the expansion ports. In some embodiments, the design impact of adding in one or more expansion ports can be minimal. For example, adding in such expansion ports can be done by routing signals on the circuit board 75 (e.g., PCB or the like) that are already there and bringing the signals to a micro connector under a plastic cover. Moreover, in some embodiments, the one or more expansion ports may be used to interface to other peripherals that the controller plugs into or is plugged into. In other words, and in some embodiments, the controller may be used as a computer platform for other input devices (e.g., a guitar), so that the controller simply slides into other peripherals.

In some embodiments, the gaming controllers can include one or more memory slots. For example, a micro SD port can be included inside the gaming controller's housing (e.g., accessible on the edge of the housing or behind a plastic cover) to expand storage capabilities of the gaming controller to store games, data, or media content, for example. In some embodiments, the gaming controller can include a micro SD card pre-loaded with assets, firmware, games, or other data, so the gaming controller can be used as a stand-alone gaming system, and/or the gaming controller can store player information, if so desired.

In some embodiments, the IMU sensor 147 (e.g., a MEMS 3D IMU or the like) can be included in the gaming controller 140 that may include one or more of: an accelerometer to measure translation and rate of translation, a gyroscope to measure rotation and rate of rotation, and/or a magnetometer to measure orientation relative to magnetic north. The sensor can collect data that can be used to determine physical movements and an orientation of the controller. In some embodiments, data collected from the IMU sensor 147 can also be used as inputs for gameplay, similar to the input sensors 146. For example, with the IMU sensor 146, support can be provided for games that can use motion control, games that can be played in a horizontal position (e.g., in any direction), or vertical. The IMU sensor 147 can also keep track of the orientation of the controller and facilitate updating a screen connected to the gaming controller 140 based on the orientation. For example, the IMU sensor 147 can be used for games such as driving (e.g., where the controller can be held and used similar to a steering wheel), darts (e.g., the controller can be held and thrown similar to a dart—with a strap connected to the players wrist prior to throwing), bowling (e.g., the controller can be held and thrown similar to a bowling ball—with a strap connected to the players wrist prior to throwing), and other similar games.

In some embodiments, the gaming controllers can include one or more RFID tags and/or readers embedded into the controller with READ/WRITE ability and/or the ability for the main processor to READ/WRITE as well via a serial link.

In some embodiments, the gaming controllers can include features for indoor localization. For example, such features can be based on ultra-wide band technologies, dead reckoning, ultra-sonics, and other solutions. In addition, there are now low cost electronics and methods to track the gaming controller within a few centimeters of movement, and there are games that can take advantage of this fine movement detection to affect a virtual world.

In some embodiments, the gaming controllers can include one or more cameras. In some embodiments, the cameras can be used for various game play mechanics, face recognition (e.g., for player recognition and security), for leisure, or the like. Additionally, in some embodiments, the ability of the gaming controller to recognize a player can allow automatic and high speed profile downloading and configurations, as well as interactive AI applications and facial analysis for emotional exchanges with the gaming controller or gaming console.

In some embodiments, the gaming controllers can include one or more optical sensors (e.g., HR/SPO2, ambient light sensors). For example, the optical sensors can be used for gaming and fitness applications, including capturing a player's heart rate. Some games could include a "try to stay calm" and not get excited feature. Being able to read optically HR/SPO2/Hydration, etc. signals is useful for gaming/fitness applications. Also, for example, ambient light sensors can be added to the gaming console and/or gaming controllers for brightness adjustment (e.g., automated brightness adjustment, or other automatic functions based on detected light).

In some embodiments, the gaming controllers can include one or more devices and software implementations to track 3D hands free gestures. For example, the "swipes" and motions in the air can be tracked, such as for example, 5-30 cm above the device. In some embodiments, the ability to track this information is useful for simple commands such as swipe right, left, up, down, as well as wake, sleep, or to interact with games or the gaming console, or the like.

In some embodiments, the gaming controllers can be used as a stand-alone gaming device, for example, without the gaming console being connected. For example, the gaming controller is a hand held computer much like a smartphone with similar hardware and many of the same features. In some embodiments, there are games and applications that run right on the gaming controller and players can take the gaming controller anywhere as they would any hand held device.

In some embodiments, the gaming controllers can include functionality for modifications, such as with active skins. In some embodiments, the gaming controllers allow players to "skin" them with color replacements, knobs, or full removal of housings and new altered/3rd party skins added to make the gaming controllers look and/or feel better. For example, housing and mechanical additions for color changes, geometry changes, larger, smaller buttons, etc. can be added. Also, instead of being passive plastic parts and clamshells, the gaming controllers can have added electronic features that enhance the controllers in both an aesthetic and functional manner. For example, a game builder or developer could come out with a children's game that has animated planes or helicopters that can talk, and the game developer can create a "helicopter" controller add on that might be a physical piece that replaces part of the gaming controller's housing that adds a little propeller that turns (e.g., to control portions of the game or for aesthetic purposes). In some embodiments, an accessibility enhancement can be added for people with disabilities, where the skin includes different buttons (e.g., larger, different colors, different material/feel, or the like) than the ones originally on the gaming controller, added gripping surface, and the addition of numerous vibration elements or lighting elements to help people locate controls.

In some embodiments, the gaming controllers can include functionality for tactile display surface skins. One problem with using a display screen (e.g., LCD, OLED, variations thereof, or the like) for a game controller surface is that the glass is smooth, thus as a player presses the virtual buttons on the display screen surface, the player's fingers slowly drift out of position since there is no tactile feedback. In some embodiments, a set of transparent overlays can be implemented to slide into the display screen adding tactile patterns to help the player locate his/her finger in relation to the virtual buttons. In some embodiments, the gaming controllers can include functionality for a topological morphing tactile touch surface. It is now possible to manufacturer plastic and piezo electric films that can be placed over a surface. In some embodiments, these piezo electric films can have an array of actuators that can be addressed to form new shapes used tactile feedback. In some embodiments, the surface of a transparent coating on the display screen may be configured to deform with approximately 0.1 mm+ surface detail in real-time. For example, a deformable plastic sheet that covers the display screen could allow real-time tactile feedback to guide the player. This would allow the display screen to be used as a Braille output device and support visually impaired players as well. Also, in some embodiments, the display screen can use the display screen as a light source (e.g., setting the screen to full brightness and a white background). In some embodiments, at least a portion of the LEDs on the gaming controller can be set to turn on at the same time as the display screen to create a bright flashlight effect that enhances the display screen's light power.

In some embodiments, the gaming controllers can include an IR TV transceiver. Nearly all TVs are compatible with IR signals to control the TV, similar to most entertainment equipment. In some embodiments, an IR transceiver can be included in the gaming controller to allow the gaming controller to be used as a universal remote to control TV and/or entertainment system.

In some embodiments, the gaming controllers can include compatibility for LowFi Wireless. A household is often flooded with signals, and the signal integrity of Bluetooth and/or WiFi can get to be less desirable. To that end, another technique is to use lower/older frequency bands like 2700 MHz and 900 MHz. These bands are less directional, work better indoors, and typically have no other competing devices. That said, when supporting multiple controllers in a badly congested signal scenario, the gaming controllers may back down to a custom wireless transceiver "radio" configuration with a custom protocol. In some embodiments, for example, thousands of bytes can be sent per second with a LowFi wireless configuration, as opposed than millions, but for the needs of the controller in certain situations that is acceptable.

In some embodiments, the gaming controllers can be used as a virtual reality (VR) Headset. In some embodiments, the gaming controller can be used as the display screen and tracking/computer hardware for a passive (semi passive) VR headset, where the gaming controller can be configured to slide into the VR headset and then players can experience VR with the gaming controller. In some embodiments, other peripherals can be connected to the gaming controller and/or gaming console to enhance a VR experience. For example, additional wrist/ankle/abdominal straps and/or sensors could track additional movement/actions in games. Also, for example, there could also be proximity sensors that are placed in a movement area (e.g., a living room or play area) to enhance approximations of player movements and positions in the given movement area.

In some embodiments, the gaming controllers can be used with a robotics platform. For example, the gaming controller could slide into robotics hardware and be used as the brains of the system. For example, implementations on www.robotshop.com, and other similar products, can be used with the gaming controller.

In some embodiments, the gaming controllers can include the capability of generating digital scents to enhance a movie, game, or other entertainment venue digitally and quickly (e.g., generating the smell of smoke, then the smell of a rain forest, and having the player notice this change in smell at the right times). In some embodiments, this digital scent capability in the gaming controller can be used to provide a more immersive gaming and entertainment experience by providing an opportunity to provide the players a chance to suspend disbelief. In some embodiments, there could be a number of available smells (e.g., 1, 5, 10, 15, 20, or more smells). In some embodiments, the gaming controller can execute using piezo vaporization to generate scents in games. In some embodiments, smells can also be generating from the gaming console.

Example Disc Wheel for Gaming Controller

FIGS. 4A-4K illustrate an embodiment of a disc wheel 50 to be used as a component in the gaming controller (e.g., gaming controller 140, or gaming controller as shown in FIGS. 2A-2H) illustrated in FIGS. 3A-3L. In some embodiments, the disc wheel 50 can be configured to be a multi-directional tiltable disc that can be used by a player on a gaming controller as an input to control movement on a TV screen, for example.

Example Gaming Console with Gaming Controller

FIGS. 5A-5K illustrate an embodiment of the gaming console illustrated in FIGS. 2A-2H with gaming controllers illustrated in FIGS. 3A-3L. The configuration in FIGS. 5A-5K show how the gaming controllers can be placed on and connect with a gaming console. For example, the slanted configuration of the circuit board 76 and the components above circuit board 76 can be configured so that the gaming controller 30, when set on the surface 12 of the gaming console 10, can slide into place so that the pins 78 (e.g., pogo pin or spring-loaded pin or the like) of the gaming console 10 are in electrical contact with connection 80 in the gaming controller 30. Such a connection between pins 78 and connection 80 can be used to charge the gaming controller, transfer data, pair the gaming controller to the gaming console, or for other similar features, for example.

Gaming Server, Gaming Console, and Gaming Controller

Figure 6:
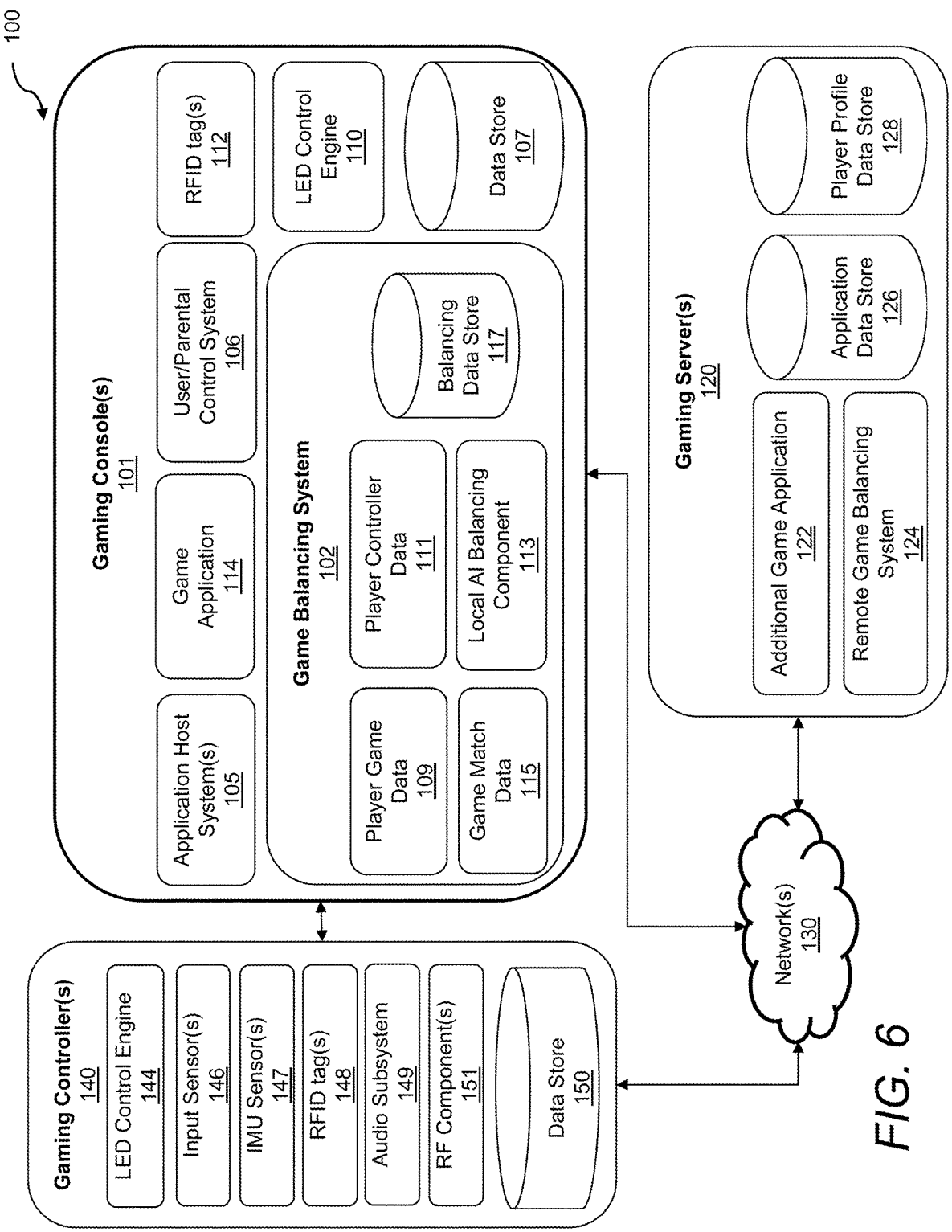
FIG. 6 illustrates an embodiment of a networked computing environment including a gaming console, gaming controllers, and gaming servers.

FIG. 6 illustrates an embodiment of a networked computing environment including a gaming console, gaming controllers, and gaming servers. The networked computing environment may include a gaming console 101 for implementing a game balancing system 102 and other various systems. The networked computing environment 100 can include one or more gaming controllers 140 and one or more gaming servers 120. The gaming console 101 may communicate via a network 130 with the gaming server(s) 120. Although only one network 130 is illustrated, multiple networks may exist. The components described herein are not meant to be exhaustive but only a sample of what components may be implemented. Some components may be combined and others may be removed or substituted with similar components.

A. Gaming Console(s)

The gaming console 101 may include a processor, an internal power source, a game balancing system 102, a display generation engine 103, application host systems 105, a user/parental control system 106, a token engine 108, a LED control engine 110, RFID tag(s) 112, and a data store 107. The gaming console 101 may communicate with gaming server(s) 120 over a network 130. The gaming console 101 may communicate with gaming controller(s) over a network 130, and also directly with a wired or wireless connection. In some embodiments, the data store 107 can store player game data 109, player controller data 111, player match data 115, parental control settings, player token status, or the like. In some embodiments, the gaming console 101 can comprise multiple systems connected via a local area network or via the Internet. Also, in some embodiments the gaming console 101, or portions thereof, can be located on the gaming controller(s) 140 and/or the gaming server(s) 120.

In some embodiments, the gaming console 101 can include one or more application host systems 105 and a game application 114. Further, the gaming console 101 may include one or more application host systems 105 enabling players to access a portion of the game application 114. In some embodiments, the application host systems 105 can be configured to execute at least a portion of a game application 105 executing on a gaming console 101. In some embodiments, an application host system 105 can host and maintain a data store 107 configured to store information associated with the application host systems 105 and the gaming console 101. The data store 107 can include gameplay videos associated with a plurality of game applications 114. In some embodiments, gaming server(s) 120 can include the game application 114 or an additional game application 122 that can be hosted by the application host systems 105 on the gaming console 101.

In some embodiments, the gaming console 101 can include additional features and software that is configured to provide additional functionality to players or users of the gaming console 101. For example, the gaming console 101 can include software that allows a player to enter specific calendar dates (e.g., birthdays, graduations, anniversaries, etc.) to allow the gaming console 101 to recognize those dates and interact with the player (e.g., through the gaming console 101, gaming controller 140, a television, etc.) when the dates are reached. Also, in some embodiments, the gaming console 101 can include leaderboards (e.g., online leaderboards) which can include a high score leaderboard system based around a combination of different locations throughout the world and different times. The leaderboards can allow players to compare their game scores against other players globally, in their country, regionally, on their console, and finally amongst a private set of participants defined by the player. These domains can be viewed through a time filter of year, month, or week. For example, locations can include information related to where the score was reached, for example: City/Town, State/Province, County, Continent, World; and time can include information related to when the score was reached, for example: Daily, Weekly, Monthly, Yearly, All-time. In some embodiments, digital leaderboard trophies and certificates can be provided directly to players or end users via, for example, an e-mail, text, messaging, and/or the like which can be printed out for display. For example, when a player has achieved the top of a leaderboard in any of the domains at the end of any of the time periods, and the player can be notified (e.g., pop-up or prompt in a gaming controller, gaming console, letter, email, text, or the like) of their accomplishment, as well as offer the player a certificate to download for printing. For example, the certificate memorializes the details of their accomplishment and includes a QR code that links to a webpage that verifies their accomplishment on a leaderboard web page. In some embodiments, a player can be monitored based on an IP address associated with the player's gaming console/controllers or based on the player's account settings. In some embodiments, a player can create a private leaderboard with friends and family. In some embodiments, a leaderboard can be based on a unique id, which consists of the game's unique ID and a unique name per leaderboard belonging to the game. A game may define multiple leaderboards, such as overall score, score per specific level (i.e. a leaderboard per level), time to complete the game, time to complete each level. The UI on the console for viewing leaderboards views one game's leaderboards at a time. In some embodiments, in addition to the listing of players and scores, a histogram of any leaderboard can be generated to highlight where on the histogram the player's top score lies. For example, the histogram can be generated by taking the difference between the highest and lowest score on the leaderboard, dividing that by a constant of how many bars we want to show (e.g., 5, 10, 25, 50, or more) to find a score range per bar, and then calculates the height of a bar by counting how many leaderboard scores fall in the range of the bar.

In some embodiments, functionality for product sharing and a bonus program can be implemented. For example, the ability to use a gaming controller 140 and security keys to download purchased products onto another faming console 101 at a different location to play can be implemented. For example, once a first controller with a game is disconnected from a gaming console 101, the game downloaded from the first controller to the gaming console 101 becomes locked/deactivated and the gaming console 101 is offered the game at a discount and/or a store credit is given to the person who brought the first controller and shared the game. In some embodiments, the game is accessible on the gaming console 101 for a limited amount of time before being locked.

1. Application Host System(s)

In some embodiments, the gaming console 101 can include an application host system 105 that may be configured to execute a portion of a game application 114 or additional game application 122 operating on the gaming console 101. The application host systems 105 may execute another application instead of or in addition to executing a portion of the game application 114 and/or a host application, which may complement and/or interact with the game application 114 during execution of a gameplay session of the game application 114.

In some embodiments, the gaming console 101 may enable multiple players, gaming controllers 140, or gaming consoles 101 to access a portion of the game application 114, additional game application 122, and/or a host application. In some embodiments, the portion of the game application 114 executed by application host systems 105 of the gaming console 101 may create a persistent virtual world. This persistent virtual world or virtual environment may enable one or more players to interact with the virtual world and with each other in a synchronous and/or asynchronous manner. In some cases, multiple instances of the persistent virtual world may be created or hosted by the gaming console 101. A set of player may be assigned to or may access one instance of the persistent virtual world while another set of player may be assigned to or may access another instance of the persistent virtual world.

In some embodiments, the application host systems 105 may execute a hosting system for executing various aspects of a game environment. For example, in one embodiment, the game application 114 may be a competitive game, such as a first person shooter or sports game, and the application host systems 105 can provide a dedicated hosting service for hosting multiplayer game instances or facilitate the creation of game instances. In some embodiments, the application host systems 105 can provide a lobby or other environment for player to virtually interact with one another, change settings of a game, or to select a game to play. In some embodiments, the virtual environments may be populated with one or more virtual characters, objects, features generated by a game balancing system 102, as well as one or more characters, objects, and/or features designed by a game developer.

2. Data Store

In some embodiments, the gaming console 101 can include a data store 107 that comprises data related to players that use the gaming console 101 and the games that are played. For example, data can be stored in a player profile that is stored locally in the data store 107 and/or remotely in the player profile data store 128 in one or more gaming servers 120. The data can include information associated with each player, how the player plays one or more games, how the player uses a gaming controller 140, how the player plays against other players (e.g., in particular games or generally), or any other information associated with the player that the gaming console 101, gaming controller 140, or gaming server 120 can track and use for potential game balancing.

3. Game Application

In some embodiments, the gaming console 101 is capable of executing one or more game applications 114 (which, hereinafter may include the additional game applications 122, if applicable), which may be stored and/or executed locally and/or in a distributed environment. In a locally executed game application 114, generally, the game does not rely or utilize an external computing system to execute the game application 114. In some instances, a locally executable game can communicate with an external server (e.g., a gaming server 120) to retrieve additional game application 122 information associated with the game, such as game patches, game authentication, clouds saves, custom virtual character data, user account data, or other features. In distributed game applications, the player system(s) 102 may execute a portion of a game and the gaming console 101, or an application host system 132 may execute another portion of the game. For instance, the game may be a game that includes a client portion executed by the gaming console 101 and a server portion executed by one or more application host systems 105. The game application 114 may be any type of game, including multiplayer games (such as, for example, multiplayer first person shooters (FPS), mobile online battle arenas (MOBA), racings games, sports games, shooting games, pong, and other multiplayer games) and single player games (such as for example, role playing games (RPG), adventure games, puzzle games, and other single player games).

The gaming console 101 can execute a game application 114 based on software code stored at least in part in the data store 107. The game application 114 may also be referred to as a videogame, a game, game code, and/or a game program. A game application 114 should be understood to include software code that a gaming console 101 can use to provide a game for a user or player to play. A game application 114 may comprise software code that informs a gaming console 101 of processor instructions to execute, but may also include data used in the playing of the game, such as data relating to constants, images, and other data structures. In the illustrated embodiment, the game application 114 can include a game engine, game data, and game state information.

The game application 114 can be configured to incorporate adjustments to features in the game based on output from the game balancing system 102. The output from the game balancing system 102 may include instructions identifying portions or features of a game that should be changed or adjusted and details regarding the extent of the change or adjustments for each particular portion or feature of the game. In some embodiments, output from the game balancing system 102 can be stored and accessed from a data store 134. The game application 114 may request output from the game balancing system 102 to incorporate in the game. In some embodiments, the game balancing system 102 can provide instructions to the game application 114 to include changes or adjustments for particular portions or features of the game during the display of the game application during a gameplay session.

A game engine can be configured to execute aspects of the operation of the game application 114 within the gaming console 101. Execution of aspects of gameplay within a game application 114 can be based, at least in part, on the player input received, game data associated with the game, and any game state information. The game engine can execute gameplay within the game according to any game rules. Examples of game rules can include rules for scoring, possible inputs, actions/events, movement in response to inputs, and the like. Other components can control what inputs are accepted and how the game progresses, and other aspects of gameplay. The game engine can receive the player inputs and determine in-game events, such as actions, jumps, runs, throws, attacks, and other events appropriate for the game application 114. During runtime operation, the game engine can read in game data and game state information to determine the appropriate in-game events.

The game data can include game rules, environmental settings, environmental objects, constraints, skeleton models, tutorial information, route information, and/or other game application information. At least a portion of the game data can be stored in the data store 107 or application data store 126. In some embodiments, a portion of the game data may be received and/or stored remotely, such as in a remote application data store 126. In such embodiments, game data may be received during runtime of the game application 114.

During runtime, for example, the game application 114 can store game state information, which can include a game state, character states, environment states, scene object storage, route information and/or other information associated with a runtime state of the game application 114. For example, the game state information can identify the state of the game application 114 at a specific point in time, such as a character position, character orientation, character action, game level attributes, and other information contributing to a state of the game application. The game state information can include dynamic state information that changes during a gameplay session, such as character movement positions, and static state information that is constant during a gameplay session. In some embodiments, at least a portion of the game state information can be updated on a periodic basis, such as multiple times per second. In some embodiments, the game state information can be updated on an event-based basis. Furthermore, in some embodiments, the game state information can include game balancing adjustments or changes that are included in the game based on output from the game balancing system 102.

In some embodiments, game applications can include updated versions of games played on prior systems. In some embodiments, the updated versions of games can include reimagined Intellivision classics and other reimagined industry classics. In some embodiments, the games can come pre-installed on a gaming console 101. In an example, updated versions of games can include: updated graphics, modernized audio, additional levels, multi-player modes (local and online), tournament modes, or other features that may affect gameplay experience. Some titles of game include, but are not limited to: Astrosmash™ Shark! Shark!™, Baseball, Night Stalker™, Skiing, Math Fun™, SNAFU™, Utopia™, Frog Bog™, Boxing, Bowling, Triple Action™, Tron Deadly Discs™, Cloudy Mountain: Crown of Kings, Star Strike™, Horse Racing, Auto Racing, B-17 Bomber™, Pong™, Asteroids™ Centipede™, Tempest™, Adventure™, Missile Command™, Yar's Revenge™, Breakout™ Lunar Lander™, Night Driver™, Sky Diver™, Warlords™, Microsurgeon™, Atlantis™ Demon Attack™, Dracula™, Beauty and the Beast™, Ice Trek™, Swords & SerpentS™ Dragonfire™, Truckin'™, Miner 2049er™, Super Burgertime™, Bad Dudes™, Caveman Ninja™, Moon Patrol™, R-Type™, 10 Yard Fight™, Lode Runner™, Spelunker™, Kung-Fu Master™, MotoRace USA™, Tropical Angel™, Archon™, and ToeJam & Earl™. Also, the listed games and other games can be developed to be family friendly and rated "E for Everyone" or "E10+". In some embodiments, a developed game may be exclusive to the system. In some embodiments, games can be tested to pass a strict quality control program. In some embodiments, balanced gameplay and design for Equal Opportunity Gaming™ for all can be implemented. In some embodiments, games are downloadable by a gaming console 101 from one or more gaming server(s) 120, gaming controller(s) 140, or other gaming consoles. In some embodiments, there is little to no costly DLC (Downloadable Content) add-on's or "In-App Purchases". In some embodiments, DLC may be provided for free.

4. User/Parental Control System

In some embodiments, the gaming console 101 can include a user/parental control system 106 that can include a graphical user interface configured to receive instructions associated with adjusting gameplay and system settings associated with the gaming console 101 and/or games played on the gaming console 101. Current implementations of parental controls leave much to be desired in ease of use-requiring account setup and registration and passwords, and difficulty in finding the parental control menu in the haystack of console menus. These hurdles cause many parents to forego setting up parental controls, resorting instead to simply telling their kids when to get off the console, which creates conflict that turns the game console into a parent's adversary. Here, the user/parental controls are straightforward and implement features that turn the gaming console 101 into an effective tool that parents can use to incentivize and reward good behavior.

Figure 9A:
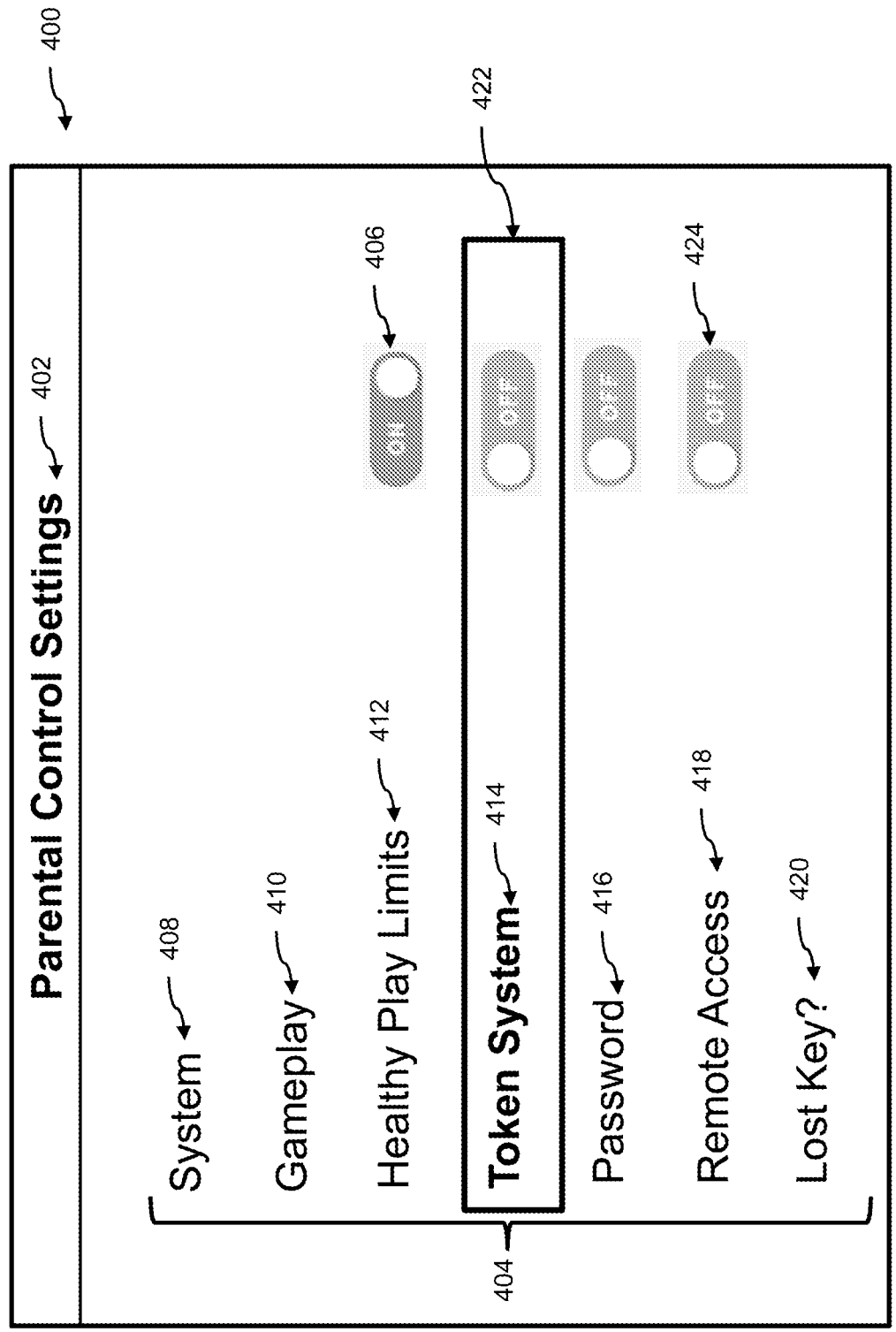
FIG. 9A illustrates an embodiment of a graphical user interface depicting parental control settings.

In some embodiments, the gaming console 101 gives parents access to parental controls (e.g., via a graphical user interface, such as the one shown and described with respect to FIG. 9A) with a physical card that ships with the game console, such as those shown and described with respect to FIG. 9B. For example, the "parent key" can be advertised as a feature, and in some embodiments, they key can be included inside a sealed envelope marked "FOR PARENTS ONLY." In some embodiments, the key can be a credit-card-sized card with a picture of a key on one side and a QR code on the other side. In some embodiments, the parent key can have a cut-out slot near one end for attaching to a keyring or lanyard. A note in the envelope instructs the parent to tap the key on the gaming console's RFID reader to invoke the parental controls menu on the TV, which they can then navigate with a gaming controller. This straightforward, intuitive physical device removes many if not all the hurdles mentioned above to accessing parental controls.

In some embodiments, embedded computer accessible information in a RFID, magnetic strip, or the like can be included in the parent key and can be part of a distinct set of parent key IDs that is recognizable by the gaming console 101, for example by one or more RFID tag(s) 112. In some embodiments, upon first use on the gaming console 101, the parent key becomes paired to the gaming console 101 (e.g., pairing information can be stored in the data store 107), and thereafter the parent key can access user/parental controls for that gaming console 101. In some embodiments, it is possible to replace the key if lost or damaged. In an embodiment, a gaming console 101 receives instruction from a gaming server 120 to pair to a new key (which is issued when a replacement key is, for example, mailed out).

In some embodiments, parents may also administer user/parental controls from their mobile phone by using the QR code on the parent key (e.g., using a browser, with a mobile application, or the like). In some embodiments, mobile phones having NFC capability can also read an RFID tag in the parent key as an alternative to scanning the QR code, for example. In some embodiments, provided the gaming console 101 is connected to the internet, changes to user/parental controls can be accessed by the gaming console 101 and then applied by the gaming console 101. Also, in some embodiments, provided the gaming console 101 is connected to the internet, changes to user/parental controls can be pushed to the gaming console 101. Having online control can be advantageous so that parents can manage the settings from any location and conveniently while the gaming console 101 is being used, for example. In some embodiments, the parent may also setup a login credential with an email and a password that will allow them to access their parental controls panel from any web browser, so they can administer settings from a PC, mobile phone (e.g., browser, application, or the like), gaming controller 140, or gaming console 101, without the parent key.

In some embodiments, there is no menu item for accessing parental controls in the gaming console's settings menu. This may have the effect of hiding such controls from children playing the gaming console 101 and may limit or prevent the children from trying to hack into the user/parental control settings. In some embodiments, a parent may set a password, from within the user/parental control menu (e.g. the graphical user interface in FIG. 9A), for additional security. In some embodiments, as shown in FIG. 9B, a parent key may include a QR code, embedded computer accessible information such as RFID, magnetic strip, combinations of the same or the like.

In some embodiments, the gaming console can include default settings that establish default healthy time limits or time-of-day limits. For example, these limitations can include having different limits on different days of the week (e.g. school days vs weekends). For example, incorporating default settings may remove stress from parents, because even if they do not get to it right away, they know that healthy limits are already in place, which they can modify at their leisure. Moreover, parents or caregivers can blame the console instead of having to say they personally required the limited play. Similarly, in some embodiments, the gaming console may not include default settings but can include templates for default settings that establish default healthy time limits or time-of-day limits such that the templates can be enabled (e.g., with a single click or selection by a parent).

In some embodiments, virtual tokens may be available. Virtual tokens can be used to set a soft limit on gameplay that is duration based and provides a reasonable compromise between time limits and player experience. For example, each token is worth a fixed amount of play time. Tokens can be used as a reward system for doing real world activities such as chores, getting a good grade on a quiz, etc. Tokens can be used along with time-of-day limits or instead of time-of-day limits. They can be scheduled to be granted automatically at set intervals, and/or manually granted through parental controls (on the gaming console 101 via a graphical user interface, a mobile application, a browser, or the like).

With respect to video game arcades where a token, like a quarter or some custom device was worth a variable amount of play time, depending on the game, the duration ended at a natural pausing point (e.g., when you lost your last life). In some embodiments, a similar concept is implemented here with soft time-limits that will not cut a player off abruptly right in the middle of an encounter for example, but may come into effect at more natural pause point (e.g., at check points in a platformer game, or between levels). In some embodiments, the gaming console 101, via the user/parental control system 106, can track a time limit remaining associated with the tokens and determine when to stop the gameplay that is convenient for the player. In some embodiments, gameplay can stop before or after the allotted time based on the tokens. For example, if a player has 10 minutes of gameplay remaining and the player reaches a checkpoint or beats a level after 9 minutes, the user/parental control system 106 can determine based on the player's skill level or game being played (e.g., typical rounds may last more than the remaining time of 1 minute based on the player and/or generally for the game being played) that the gaming console 101 should enforce the time limitation and stop gameplay at the 9 minute mark. In some embodiments, any under-time (e.g., time playing the game remaining on the token, or the 1-minute remaining in the prior example) can advantageously be carried over to the next play session as a credit, or additional play time. In another example, if a player has 10 minutes of gameplay remaining and the player does not reach a checkpoint or beat a level until 12 minutes pass, the user/parental control system 106 can determine that the gaming console 101 should enforce the time limitation and stop gameplay at the 12-minute mark. In some embodiments, any over-time (e.g., time playing the game passed the expiration of the token, or the 2 minutes extra spent playing in the prior example) can advantageously be carried over to the next play session as a debit, or less play time.

In some embodiments, the graphical user interface displaying the user/parental controls menu (e.g., on the gaming console, a mobile application, browser, or FIG. 9A) allows a parents to change default "Healthy Play Limits" settings to reduce or add play time for the console or per player account, or set it to play only when unlocked by the tap of the parent key for a specific duration, or to various combinations of the above or to unlimited play.

In some embodiments, lost, broken or hacked parent keys can be replaced by a request. For example, a request can be sent through, mail or via a mobile application or browser. A request may include a serial number of the console and possibly some authentication of a parent or caregiver. Other solutions may include a login/password access method in addition to or separate from one or more of the other methods described. In some embodiments, once a request is processed, a replacement key can be mailed to an address associated with the request. In some embodiments, for example there may be a situation where a parent set up a mobile phone to access and control parental control settings of a gaming console, and the parent's child has the physical parent key and is accessing the parental control settings. In such a situation, the parent can send a request by any of the means disclosed herein, and also have the original parent key the child possesses deactivated without deactivating the mobile phone's access until a new parent key arrived in the mail.

In some embodiments, the parent key includes a RFID tag that is part of a distinct set of parent key IDs that is recognizable by the gaming console 101 (e.g., via the console's firmware). For example, upon first use of the parent key on the gaming console 101, the parent key RFID becomes paired to the gaming console 101 (internally recorded in the gaming console 101 in data store 107), and thereafter only that parent key can access user/parental controls. However, in some embodiments, it is possible to replace the key if lost or damaged, provided the gaming console 101 is connected to the internet to receive instruction from the server to pair to a new key (which is issued when a replacement key is mailed out). In some embodiments, a new key can be mailed out and configured to replace the existing key with a tap on the gaming console 101 without an internet connection.

5. Radio-Frequency Identification (RFID) Sensor(s)

In some embodiments, the gaming console 101 can include Radio-frequency identification (RFID) sensor(s) 112 that may include one or more RFID or NFC sensors. Such sensors use electromagnetic fields to automatically identify and track tags attached to objects, such as the gaming console 101, gaming controllers 140, and/or parent key (e.g., FIGS. 9A and 9B). In some embodiments, an RFID tag consists of a radio transponder (e.g., a radio receiver and transmitter). When triggered by an electromagnetic interrogation pulse from a nearby RFID reader device, the tag transmits digital data, usually an identifying inventory number, back to the reader. This number can be used to track information or data. Passive tags are powered by energy from the RFID reader's interrogating radio waves. Active tags are powered by an internal power source or battery and thus can be read at a greater range from the RFID reader; up to hundreds of meters. In some embodiments, the RFID tags 112 may be embedded in the gaming console 101. In some embodiments, the gaming console's RFID tags 112 may include a RFID reader and/or a RFID tag (e.g., active and/or passive). In some embodiments, the parent key described herein with respect to the user/parental control access (e.g., the card shown and described with respect to FIG. 9B) includes a passive RFID tag. In some embodiments, the RFID tag(s) 112 can communicate with the parent key's passive RFID tag.

6. LED Control Engine

Similar to the LED control engine 144 described herein, the LED control engine 110 is configured to control one or more light-emitting diodes (LEDs) which are semiconductor light sources that emit light when current flows through. In some embodiments, the gaming console 101 includes one or more LEDs that can be activated to turn on and, in some cases, turn on as a certain color, with the respective LED control engine 110. The LEDs in the gaming console 101 can synchronize with the LEDs in the gaming controller 140. Lights are used interactively during gameplay to signify game elements, players turn, provide environment ambience, positive or negative feedback, etc. The gaming console 101 can include buttons or indicators that include LEDs, or LEDs that are included nearby the buttons or indicators, that can light up when they are pressed, that can light up when they need to be pressed, or that can light up to indicate information (e.g., that WiFi is connected, or controllers are connected/disconnected, etc.). In some embodiments, a number of LED emitters (light pipes) can be designed into a gaming console 101 to create lighting FX around the gaming console 101. In some embodiments, LED lighting control can be used to create tension in a game. For example, if a player is losing or winning, the gaming controller's LED lights can be turned on or flash accordingly.

In some embodiments, an application-programming interface (API) can be implemented for the LED control engine 110. The API, a computing interface, can define interactions between multiple software intermediaries. For example, the API can define the kinds of calls or requests that can be made, how to make them, the data formats that should be used, the conventions to follow, etc. The API can also provide extension mechanisms so that users or developers can extend existing functionality in various ways and to varying degrees. The API can be entirely custom, specific to a component, or it can be designed based on an industry standard to ensure interoperability. In some embodiments, the API can be documented for develops to use. In some embodiments, the API can be designed so that it can be "interrogated" to determine supported functionality. The system that provides the API can change its internal details "behind" that API without affecting its users or developers. In some embodiments, developers can program games and features of games to send instructions to the LED control engine 110 directly or through the use of the associated API. In some embodiments, the API and/or LED control engine 110 can work in synchronicity with a corresponding API and/or LED control engine 144 associated with the gaming controller 140.

7. Game Balancing System

Creating fun and competitive head-to-head game play between participants with varying skill levels can be challenging for game designers and frustrating for those playing. Losing all the time can be frustrating and winning all the time can get boring resulting in a disappointing gaming experience.

Balanced competitive head-to-head game play stimulates the competitive spirit in gaming and increases cross-user experiences. In some embodiments, the game balancing system 102 uses performance data (e.g., player game data 109, player controller data 111, game match data 115, a combination thereof, or the like), for example, accuracy, reaction time, play patterns, controller coordination, combinations of the same or the like can be tracked for each participant and/or for each game, gaming genre or category, combinations of the same or the like. In an embodiment, as head-to-head game play transpires, the system monitors the game and can determine adjustments to gameplay dynamics to reduce perceived imbalance of one participant over the other. In some embodiments, the game may shrink or grow a paddle in a game like Pong. For example, were the game balancing system 102 to determine a left side Pong player was relatively more skilled than a right side Pong player, the left side paddle may decrease in vertical length from standard gameplay and the right side paddle may increase vertical length, effectively helping the right side player and hindering the left side player in a manner designed to equalize their respective playing abilities. In some embodiments, only the left side player paddle or the right side player paddle may be adjusted, and in some embodiments, both paddles may be adjusted to varying degrees or proportionally. Other embodiments include increasing or reducing the size of things that might require precise timing to be jumped, like rocks or ditches in Moon Patrol. Other examples may include limiting the speed or cornering ability of a vehicle in a racing game or even restricting the types of moves available or damage inflicted in a head-to-head fighting game. As the game balancing system 102 tracks performance data (e.g., player game data 109, player controller data 111, game match data 115, a combination thereof, or the like) for specific players, it may advantageously apply balance adjustments from the very beginning of game play between known players. In an embodiment, the game balancing system 102 may even recognize purposeful poor playing by a relatively new player trying to trick the game balancing system 102 into helping the player win against other players. In some embodiments, a controller is matched with a player profile and that player profile determines game balancing. In other embodiments, player or user identification and/or authentication information assign a player profile to a particular controller for a length of time the player is using the controller.

In some embodiments, the gaming console 101 can include a game balancing system 102. In some embodiments, the game balancing system 102 can be configured to include the functionality to allow the gaming console 101 to interactively track a player's ability or skill level and then determine adjustments to game software based on that input in real-time. In other words, an interactive on-the-fly handicapping system that sets a player's ability so that players of all skill levels can compete together on a playfield that has adjusted for player skill in real-time.

As shown in FIG. 6, the game balancing system 102 may comprise player game data 109, player controller data 111, game match data 115, local AI balancing component 113, and a balancing data store 117. The components of the game balancing system 102 can be communicated with directly (for example, through an API or other call) or through other components indirectly. For example, a call can be made to the game balancing system 102 that then pulls data stored on the balancing data store 117 and the data store 107 to be used in preparing requested display generation instructions. The game balancing system 102 can communicate with application data store 126 and/or with the application host systems 105 to acquire data associated with a game application 114 (e.g., in some embodiments also additional game application 122) and to provide custom game data for use in a game application 114. The game balancing system 102 can additionally or alternatively communicate with gaming controller(s) 140 and/or gaming server(s) 120 through the network 130.

The game balancing system 102 can be included locally (e.g., 102), remotely (e.g., 124), or both. The game balancing system 102 can adjust portions of games (e.g., as the games are being played, prior to a game, after a game, etc.) so that players playing the game can experience balanced gameplay. For instance, if a first player is very experienced at a particular game, with a particular controller, and/or with similar games, and a second player is not experienced, then the game balancing system can adjust features of a game being played by both the first player and second player so that the gameplay and/or the outcome of the game appears to be more even. For example, the first player may lose or have reduced abilities or benefits in the game, the second player may gain or have enhanced abilities or benefits in the game, or both. The effect would be that the gameplay and/or the outcome (e.g., win/loss ratio) would be even between the players.

In some embodiments, the game balancing system 102 can adjust features of the game on-the-fly during the game, or in between each game or set of games. It is advantageous that any adjustments to the game made by the game balancing system 102 are effective, but also do not limit the functionality of the game. For example, certain games require certain types of skills such as a fine motor control to position an object in a game, reaction timing to respond to updated game content, or any other skills that relate to improved gameplay by a player. For example, in some embodiments, the game balancing system 102 can implement adjustments to features of a game for an inexperienced player to enhance the inexperienced player's abilities in the game so that the player can play the game more easily (e.g., win against a more experienced player). However, in some embodiments, the game balancing system 102 can be limited to affect certain features within a range, as well as one or more features within a game. For instance, enhancing an ability for an inexperienced player can allow the inexperienced player to perform better in the game (e.g., against a more experienced player), but at a certain point, the enhancement may have a negligible or counter-productive effect. The enhancement may be so extreme as to limit the functionality of the game, or even make the game more difficult to play by the inexperienced player. The same can be true for reductions in abilities or features implements for experienced players. Thus, it is desirable in some embodiments, and in some games, to limit any adjustments to features or abilities in a game to be within a particular range. The possible ranges of adjustments for any of the features or abilities available to the game balancing system 102 to adjust can be determined by the game balancing system 102 itself, preprogrammed manually, or both.

In some embodiments, adjustments to the game made by the game balancing system 102 are implemented at a time and rate that does not interfere with gameplay in a significant way. For example, adjustments can be implemented starting from a base and adjusting slowly away from the base to a target value. In another example, adjustments can be made instantaneously at the target value. In addition, for example, a player may get frustrated or confused if the game mechanics (e.g., adjusted features in the game affecting the player) are adjusted during so that the player cannot have sufficient time to learn the mechanics. Also, for example, a player may get frustrated or confused if the rate of change (e.g., the speed or rate at which the adjusted features in the game are changed from a base point to a desired point determined by the game balancing system 102) is too quick and not at a rate that feels natural to a player.

In some embodiments, for example, there may be two or more players that are determined by the game balancing system 102 to be at a similar or same skill level (e.g., the two or more players may both be inexperienced, moderately experienced, very experienced, etc.). In such circumstances, the game balancing system 102 may not implement any adjustments to the game.

In some embodiments, there may be one or more players that are all inexperienced that play a game. In such circumstances, the game balancing system 102 may implement adjustments that enhance the abilities or features for all one or more players so that all players can achieve a certain level of accomplishment in the game at a particular rate. For example, if all inexperienced players cannot advance a selected game, or are predicted by the game balancing system 102 to have difficulty in advancing the selected game, then features or abilities of all players may be enhanced so that the inexperienced players can progress through the game based on a predetermined metric (e.g., within a specific time period defined manually or by the game balancing system 102).

In some embodiments, there may be one or more players that are all experienced that play a game. In such circumstances, the game balancing system 102 may implement adjustments that reduce the abilities or features for all one or more players so that all players can achieve a certain level of accomplishment in the game at a particular rate. For example, if all experienced players would advance a selected game too quickly, or are predicted by the game balancing system 102 to easily advancing the selected game, then features or abilities of all players may be reduced so that the experienced players can progress through the game based on a predetermined metric (e.g., within a specific time period defined manually or by the game balancing system 102).

In some embodiments, the features that can be adjusted by the game balancing system 102 can vary between each game based on the particularities of the game. For example, a first person shooting game may allow for adjustments of speed, level of weaponry or armor, environmental variables (e.g., wind, rain, visibility such as brightness or fog), size of targets, size of bullets, bullet damage, shooting rate, snap-lock for targeting (e.g., if a player is within a certain number of pixels of a target the target can be locked on with a snap for a period of time), or the like. In another example such as pong, the paddles can be adjusted. Some games may include one element or feature that can be adjusted, and other games may have multiple elements or features that can be adjusted. In some embodiments, the game balancing system 102 can use artificial intelligence or machine learning to automatically implement adjustments to particular features in a game. The game balancing system 102 can decide which features to adjust and by how much to adjust the features. In some embodiments, a set of adjustable features can be provided to the game balancing system 102 and the game balancing system 102 can adjust some or all of the provided features. For example, an administrator of the game balancing system 102, a game developer, a game publisher, or anyone with access to game source code can provide four features of a game that can be adjusted to the game balancing system. The game balancing system 102 can then determine, using artificial intelligence or machine learning for example, one, two, three, or four of the provided features to adjust. In some embodiments, the game balancing system 102 can adjust all four of the provided features. In some embodiments, the game balancing system 102 can adjust fewer than four of the provided features. In some embodiments, the game balancing system 102 can determine which features to adjust based on data (e.g., player game data, player controller data, game match data, balancing data store, player data store, tests run by the game balancing system, or the like). The game balancing system 102 may determine that of the four features provided, that adjustments to certain features may: affect game balancing more than adjustments to other features, have a meaningful effect on game balancing within a specific range of adjustments, negate adjustments to other features, that some features have no impact on balancing in certain situations or at all, and other learnings determined from an AI algorithm or machine learning, for example.

In some embodiments, there may be performance data associated with two players but the two players with be playing competitively in a new game that one or more players have never played. The game balancing system 102 can use a predicted adjustment based on clustered performance data (e.g., determined by the game balancing system 102, the remote game balancing system 124, or both) and then update the predictions and adjustments as the game is played and more performance data is collected. For example, the remote game balancing system 124 can create a general grouping or level for players and groupings can be associated with default adjustments to some or all available games so that each grouping/level is associated with its own set of default adjustments.

In some embodiments, the game balancing system can include, or be implemented in, a "virtual computing environment." As used herein, the term "virtual computing environment" should be construed broadly to include, for example, computer readable program instructions executed by one or more processors to implement one or more aspects of the modules, engines, and/or functionality described herein. Further, in this implementation, one or more modules or engines of the game balancing system 102 may be understood as comprising one or more rules engines of the virtual computing environment that, in response to inputs received by the virtual computing environment, execute rules and/or other program instructions to modify operation of the virtual computing environment. For example, a request received from a gaming controller 140 may be understood as modifying operation of the virtual computing environment to cause the local AI balancing component to determine adjustments or changes to a game selected by one or more players, to generate game application instructions based on the determined adjustments or changes, and render the selected game with the adjustments or changes, for example. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered from one or more data stores (e.g., balancing data store 117, data store 107, application data store 126, and/or player profile data store 128), or from the remote game balancing system 124. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the game balancing system 102 as a virtual computing environment may advantageously enable executing different aspects or modules of the system on different computing devices or processors, which may increase the scalability of the system (e.g., some portion of the system can be located in the gaming console 101 and another portion can be located on one or more gaming servers 120, for example as a remote game balancing system 124). Implementing one or more aspects of the game balancing system 102 as a virtual computing environment may further advantageously enable sandboxing various aspects, data, or modules of the system from one another, which may increase security of the system by preventing, e.g., malicious intrusion into the system from spreading. Implementing one or more aspects of the game balancing system 102 as a virtual computing environment may further advantageously enable parallel execution of various aspects or modules of the system, which may increase the scalability of the system. Implementing one or more aspects of the game balancing system 102 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, in some embodiments, data may be collected from thousands, hundreds of thousands, or even millions of players, and many megabytes, gigabytes, or terabytes (or more) of data may be transferred or processed by the system, and scalability of the system may enable such operation in an efficient and/or uninterrupted manner.

Also, in some embodiments, the game balancing system via the local AI balancing component can use one or more balancing models, generated using artificial intelligence (AI) or machine learning, to determine what features or aspects of a game to adjust or change, and how much to change the specific features or aspects of the game. Based on the balancing models, the gaming console 101 can render the game application 114 with the determined adjustments or changes.

In some embodiments, the game balancing system can be used to implement fixes to one or more games. For example, if a game developer or publisher decides that an aspect of a game should be adjusted, the game balancing system 102 can be used to affect such a change as a temporary or permanent fix for the system. Also, in some embodiments, data related to gameplay based on adjustments can be used for bug fixing and game changes provided for in game updates pushed to the gaming console 101.

Also, in some embodiments, quantification of balance adjustments also include a handicapping system. For example, Competitive eSports today are enjoyed by spectators or top-notch players. It is difficult to assess the skill level of a player, which in turn makes it difficult to pair players with somewhat equal skills in any type of head-to-head competition. With a lack of any type of rating system such as the USTA rating system for tennis or a handicapping system that you might see in a sport like golf or bowling, it makes it challenging to recreate similar competitions that you see as commonplace in recreational tennis and golf leagues.

In some embodiments, as data is monitored and collected for a particular player, machine learning clusters the player's performance in the context of the universe of all players (e.g., data associated with all players playing the gaming console 101 and/or data associated with players playing other gaming consoles 101 that is accessed from one or more gaming servers 120). In some embodiments, for example, logical groupings of performance are quantified into a performance rating or skill level that can range from 10 to 1, 1 being the highest level of performance (e.g., a very good/experienced player or the like) and 10 being the lowest level of performance (e.g., a bad/inexperienced player or the like). A player may have a quantified performance rating for a particular game, a particular genre of games, or holistically as a player, or some or all of the above or the like. By having an accurate rating of player performance, it is possible to facilitate tournaments that match players together based on their abilities—bringing participative competitive eSports to the masses rather than merely a spectator sport for professional gamers. In some embodiments, for example, using the rating scale of 10 to 1 as described in this section, two players may be playing a game with a differential in skill level. For example, a first player can be ranked or associated with a skill level of 2, and a second player can be ranked or associated with a skill level of 5. The second player may want to play a game with the first player but with an updated skill differential. For example, the second player may want to change his/her skill level from 5 to 4 temporarily to play a game with the first player. In some embodiments, skill level of the first player and/or second player, and/or the skill differential between the first player and second player can be used to determine the type or range of adjustments made to the game when the two players play with or against each other. So, if the second player changes his/her skill level to 4, then the adjustments made to one or both players would be updated and/or different than if the second player remained at a skill level of 5. For example, game elements associated with the second player may not be adjusted as much in order to enhance the second player's likelihood of winning. Also, for example, adjustments to game elements to the first player, second player, or both players would be determined based on the new skill level or difference in skill levels. In some embodiments, the second player changing his/her skill level would not change the system generated performance rating or skill level for the second player. In some embodiments, data generated based on gameplay with a customized skill level (e.g., when the second player set a skill level from 5 to 4) could be used by the gaming balancing system, or remote game balancing system, in the broader performance rating algorithms. For example, if the second player wins more than expected using the customized skill level of 4, the skill level associated with the second player may be adjusted from 5 to 4 permanently.

In some embodiments, the performance data clustering (e.g., through the use of AI and/or machine learning) can be done in whole or in part on the gaming console 101 or one or more gaming servers 120. In some embodiments, different versions of the performance data clustering can be performed on each system. For example, the one or more gaming servers 120 can include more performance data collected from numerous players using many gaming consoles 101, and the gaming console 101 can perform the same or similar calculations but with less performance data. In another example, the one or more gaming servers 120 can run more complex algorithms with respect to processing performance data for clustering, as compared to the gaming console 101. For instance, an optimized model can be generated by the gaming server 120 and transmitted to a gaming console 101 for implementation and/or minor adjustments. The gaming console 101 can download, receive, or access updates to the optimized model when available or based on a specific timing schedule. In some embodiments, the gaming console 101 can use a default optimized model, or an optimized model downloaded or accessed from a gaming server, while disconnected from the internet. In some embodiments, if the optimized model being applied results in one or more games that are not balanced within a specified threshold, the gaming console 101 can deactivate game balancing until a connection to a gaming server 120 is established for an updated model.

In some embodiments, tournaments can be setup online, or by connecting gaming consoles on a network (e.g., 130), by tournament directors. In some embodiments, invites can be sent to players that have opted in to participating in a specific geography and/or globally. In some embodiments, various tournament structures are provided such as single and double elimination brackets. In some embodiments, participation in a tournament starts with a qualifying round that seeds the players within the bracket. Based on the performance of the player in the qualifying round, a player may be bumped up or down in ranking for that particular tournament. In some embodiments, performance in a tournament can be weighted more heavily in the machine learning algorithms for determining rank for a particular player than performance outside of a tournament setting. In some embodiments, some games can be marked so that performance data is not collected or, if performance data is collected, the data is not used in determining skill level or game balancing changes. In some embodiments, past performance data (e.g., player game data 109, player controller data 111, game match data 115, a combination thereof, or the like) in prior tournaments can be used as a seeding mechanism. In still other embodiments, the game balancing system 102 may analyze a difference between a quantified ranking performance and current player performance to determine possible manipulation by players of the seeding system. In such cases, a re-ranking or disqualification could occur.

In some embodiments, there can be a sandbag detection with respect to tournament play. Sandbagging, sometimes formally referred to as "intentional underperformance," is the act of playing poorly on purpose, which may be considered cheating. Sandbagging can occur at any level of play, and even at top-level tournaments, players have sandbagged. For example, sandbagging is sometimes done in order to prevent spectators or opponents from learning the player's playstyle. In some embodiments, for example in a tournament, sandbagging is desired to be prevented, and in order to prevent sandbagging, the act of sandbagging can be detected. For example, pattern detection can be indicative of sandbagging. A playstyle pattern can be compared to historical playstyle patterns and if there is a difference (e.g., larger than a specified threshold) then sandbagging may be occurring. In some embodiments, sandbagging can be discouraged by matching the highest ranked or best players against the lowest ranked or worst players in the tournament. For example, a player would be discouraged from sandbagging because if the player does sandbag, they would be playing against tougher opponents earlier in the tournament. In some embodiments, a general grouping or skill level for each player can be used as a way to approximate the player's abilities. These groupings would be based on performance data collected over time and would be more difficult to manipulate because it would require a significant amount of time playing games while intentionally underperforming.

In some embodiments, the game balancing system 102 may also include the following functionality and features:
   Improving integrity of ranking system that look to rules in golf, drag racing or the like.
      AI can monitor people playing to establish a rating. It would take a lot of time and discipline for someone to create a player/user account and play for a period of time just to sandbag for a tournament.
      Results from tournaments can have a heavier impact on rating for a longer period of time, for example, a full year or more.
      AI can monitor play during the tournament and if play exceeds a certain threshold over the course of the tournament, some action could be taken such as disqualification.
      Prior to competition, players can be asked to play game against game AI as a seeding round to verify that their current rating is accurate. If they score above a certain threshold, some action can be taken. One possibility is that they are dropped to the lowest seed. If multiple players exceed the threshold, the one that exceeds it by the greater amount is dropped to the lowest seed and the other player is dropped to the second lowest seed.
   Rating could be a composite of multiple variables that are instrumented within a game.
   Ratings could only be valid across games within predefined game categories.

AI could constantly analyze game play and adjust ratings as it analyzes more people playing against each other.

With balanced play on, the system may adjust game play based on player rating. With balanced play turned off game play is equal.

With head-to-head play and balanced play turned off—beating a player with a better rating could be a trophy.

There may be many games where such balancing is not preferred, optional, adjustable by the players, or removable by turning off the feature.

a. Local AI Balancing Component

In some embodiments, the gaming controller 140 can include a local AI balancing component 113 that can be used to assist the game balancing system 102 in determining which features or aspects of a game to adjust or change and by how much so that gameplay can be improved (e.g., if only one player is playing) or balanced (e.g., if two or more players are playing). In some embodiments, for example, the local AI balancing component 113 can implement one or more machine-learning algorithms or AI to generate one or more balancing models or parameter functions that are executed by the game balancing system 102 to implement game adjustments. In some embodiments, the adjustments can define specific changes to portions of a game (e.g., length of a paddle in pong, firing rate or power per shot in a shooting game, or the like). The adjustments available are different for each game. For example, some games can include only one element that can be adjusted by the game balancing system 102, and other games can include two or more elements that can be adjusted by the game balancing system 102. More information regarding how elements or features can be adjusted or changed is included herein.

A number of different types of algorithms may be used by the local AI balancing component 113 to generate the models. For example, certain embodiments herein may use a logistical regression model, decision trees, random forests, convolutional neural networks, deep networks, or others. However, other models are possible, such as a linear regression model, a discrete choice model, or a generalized linear model. The machine learning algorithms can be configured to adaptively develop and update the models over time based on new input received by the local AI balancing component 113. For example, the models can be regenerated on a periodic basis as new data (e.g., player game data 109, player controller data 111, game match data 115, etc.) is available to help keep the predictions in the model more accurate as data is updated over time. Also, in some embodiments additional data can be provided by a remote game balancing system 124 that can provide access to additional modelling and/or data from other gaming consoles 101. Such additional data can be used to adjust any balancing models generated by the game balancing system.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, large amounts (such as terabytes or petabytes) of data may be analyzed to generate models.

a. Player Game Data

In some embodiments, the gaming controller 140 can include player game data 109 that can include data and information associated with players using the gaming console 101 to play games. For example, player game data 109 can include data related to how a player plays one or more games, or a player's gaming style. Over time, player game data 109 can be adjusted as a player improves or adjusts his/her gaming style. For example, in some embodiments, the system can track a player changing her gaming style over time and measure the rate of change. In some embodiments, the type of controller as stored as player controller data 111 can also be a factor in determining a player's gaming style.

In some embodiments, the gaming console 101 can monitor and store data that can be used to approximate a player's gaming style. For example, such data can include accuracy, reaction time (e.g., amount of time passing once an objective requiring a button press is visually available to a player), play patterns (e.g., movements and efficiency of movements as it relates to what is to be achieved in a particular game) can be tracked for each participant and/or for each game, gaming genre or category, combinations of the same or the like. For example, the system can track time acquisition, or the time is takes a player to lock on or hit a target. In another example, the system can track motor skills, or how quick the player takes to hit a target when the target is close (e.g., close to the player's avatar in a game and/or close to crosshairs or other targeting interface element). In another example, the system can track time to first hits, or how many shots or attempts it takes before a target is hit by a player. In a driving game, for example, a system can break a track into smaller pieces and monitor data associated with speed, location on the race/driving track, direction, etc. and store the metrics in a database. In Pong, for example, the system can track the vector of the ball, including speed of the ball, and also whether a player overshoots, undershoots, or oscillates at a place where the player perceives the ball may contact the paddle. With respect to play patterns, in PacMan for example, the system can track player movements with respect to movement efficiency in collecting points without losing a life.

b. Player Controller Data

In some embodiments, the gaming controller 140 can include player controller data 111 that can include data and information associated with game controllers 140 used by players. For example, player game data can include data related to how a player uses a controller (e.g., how the controller is held, what buttons are pressed and when), what type of controller is used by the player, or the like. In some embodiments, an inertial measurement unit (IMU) sensor 147 (e.g., a MEMS 3D IMU or the like) can be included in the gaming controller 140 that may include one or more of: an accelerometer to measure translation and rate of translation, a gyroscope to measure rotation and rate of rotation, and/or a magnetometer to measure orientation relative to magnetic north. In some embodiments, certain buttons on the controller may be easier or more intuitive for a player to press, data associated with when each button is pressed based on what is happening during gameplay of a game can be monitored and stored. For example, data regarding what input (e.g., tracked via the input sensors 146 corresponding to each form of input) is being used can be stored. Such data can include whether a player is using the disc wheel, touchpad, and/or buttons to play a game, including when and to what proportion the player is using each input. In some embodiments, a gaming controller 140 can be associated with one or more players, and such data can be stored in the player controller data 111. For example, some players may have changes to the controller button functionality (e.g., a left-handed player may want to invert some controls as compared to a right-handed player) that may be stored in the player controller data 111.

c. Game Match Data

In some embodiments, the gaming controller 140 can include game match data 115 can include data and information associated with games that are played, the players that play the games, and win/loss outcomes of the games. For example, game match data 115 can include information that indicates what game is being played, how many players are playing the game, who wins/loses the game and by how much, the score or progress of the game for each player as it is being played from start to finish, and other aspects of gameplay.

d. Balancing Data Store

In some embodiments, the gaming controller 140 can include a balancing data store 117 that can store information outputs from the local AI balancing component 113 and/or the remote game balancing system 124. For example, the balancing data store can store models, algorithms, strategies that may help guide the game balancing system 102 in determining what feature of a game to adjust and by how much based on any data available to the system.

B. Gaming Controller(s)

The gaming controller(s) 140 may include a processor, internal power source, LED control engine 144, input sensors 146, IMU sensors 147, RFID tag(s) 148, audio subsystems 149, RF components 151, and a data store 150. The gaming controller 140 may communicate with gaming server(s) 120 over a network 130. The gaming console 101 may communicate with gaming controller(s) 140 over a network 130, and also directly with a wired or wireless connection. In some embodiments, the data store 150 can store player game data 109, player controller data 111, player match data 115, parental control settings, player token status, or the like. In some embodiments, the gaming controller 140 can comprise multiple systems connected via a local area network or via the Internet. Also, in some embodiments the gaming controller 140, or portions thereof, can be located on the gaming console 101 and/or the gaming server(s) 120.

In some embodiments, the gamine controller 140 can execute at least a portion of a game application (e.g., 114 and/or 122) locally. For example, the gaming controller 140 can include a display screen that can display content from the game application and a player can play the game with the controller.

1. LED Control Engine

In some embodiments, the gaming controller 140 can include a LED control engine 144. Similar to the LED control engine 110, the LED control engine 144 is configured to control one or more light-emitting diodes (LEDs) which are semiconductor light sources that emit light when current flows through. In some embodiments, the gaming controllers 140 include one or more LEDs that can be activated to turn on and, in some cases, turn on as a certain color, with the respective LED control engine 144. For example, interactive LED lights can be included on the video game controller (e.g., in a tiltable disc or in or near controller buttons). Lights are used interactively during gameplay to signify game elements, players turn, provide environment ambience, positive or negative feedback, etc. Also, the LEDs in the gaming controller 140 can synchronize with the LEDs in the gaming console 101. The gaming controller 140 can include controller buttons that include LEDs, or LEDs that are included nearby the controller buttons, that can light up when they are pressed or that can light up when they need to be pressed (e.g., a graphical user interface can indicate that a "red" button should be pressed and the gaming controller 140 can light up a button's corresponding LED to the color red). Creating input buttons with the ability to light up different colors at different times enables more simple and deeper gameplay than the prior art. For example, if a player needs to hit a button to advance, lighting the button up, or lighting the button up a certain color, can indicate the player which button to press and can potentially achieve a faster response time. In some embodiments, LED lighting control can be used to create tension in a game. For example, if a player is losing or winning, the gaming controller's LED lights can be turned on or flash accordingly.

In some embodiments, a number of LED emitters (light pipes) can be designed into a gaming controller 140 to create lighting FX around the gaming controller (e.g., to mark the controller a certain color and convey various information). For example, lighting a ring around the controller's disc wheel (e.g., the disc wheel shown in FIGS. 4A-4K) can be done with a translucent ring and LEDs piped to the ring equally spaced (e.g., 4-8 LEDs, or the like). This adds not only functional possibilities, but aesthetic ones as well. Additionally, the side buttons may be lit as well, changing colors to represent different action options, as well as Home/Reset button(s).

Similar to the LED control engine 110, in some embodiments, an application-programming interface (API) can be implemented for the LED control engine 144. The API, a computing interface, can define interactions between multiple software intermediaries. For example, the API can define the kinds of calls or requests that can be made, how to make them, the data formats that should be used, the conventions to follow, etc. The API can also provide extension mechanisms so that users or developers can extend existing functionality in various ways and to varying degrees. The API can be entirely custom, specific to a component, or it can be designed based on an industry standard to ensure interoperability. In some embodiments, the API can be documented for develops to use. In some embodiments, the API can be designed so that it can be "interrogated" to determine supported functionality. The system that provides the API can change its internal details "behind" that API without affecting its users or developers. In some embodiments, developers can program games and features of games to send instructions to the LED control engine 144 directly or through the use of the associated API. In some embodiments, the API and/or LED control engine 144 can work in synchronicity with a corresponding API and/or LED control engine 110 associated with the gaming console 101.

2. Radio-Frequency Identification (RFID) Sensor(s)

In some embodiments, the gaming controller 140 can include RFID tag(s) 148. Similar to the RFID tag(s) 112 described herein, the RFID tag(s) 148 may include one or more RFID or NFC sensors. Such sensors use electromagnetic fields to automatically identify and track tags attached to objects, such as the gaming console 101, gaming controllers 140, and/or parent key (e.g., FIGS. 9A and 9B). In some embodiments, an RFID tag consists of a radio transponder (e.g., a radio receiver and transmitter). When triggered by an electromagnetic interrogation pulse from a nearby RFID reader device, the tag transmits digital data, usually an identifying inventory number, back to the reader. This number can be used to track information or data. Passive tags are powered by energy from the RFID reader's interrogating radio waves. Active tags are powered by a battery and thus can be read at a greater range from the RFID reader; up to hundreds of meters. In some embodiments, the gaming controller's RFID tags 148 may include a RFID reader and/or a RFID tag (e.g., active and/or passive). In some embodiments, the parent key described herein with respect to the user/parental control access (e.g., the card shown and described with respect to FIG. 9B) includes a passive RFID tag. In some embodiments, the RFID tag(s) 148 can communicate with the parent key's passive RFID tag.

3. Inertial Measurement Unit (IMU) Sensor(s)

In some embodiments, the gaming controller 140 can include one or more inertial measurement unit (IMU) sensors 147. In some embodiments, the IMU sensor 147 (e.g., a MEMS 3D IMU or the like) can be included in the gaming controller 140 that may include one or more of: an accelerometer to measure translation and rate of translation, a gyroscope to measure rotation and rate of rotation, and/or a magnetometer to measure orientation relative to magnetic north. The sensor can collect data that can be used to determine physical movements and an orientation of the controller. In some embodiments, data collected from the IMU sensor 147 can also be used as inputs for gameplay, similar to the input sensors 146. For example, with the IMU sensor 146, support can be provided for games that can use motion control, games that can be played in a horizontal position (e.g., in any direction), or vertical. The IMU sensor 147 can also keep track of the orientation of the controller and facilitate updating a screen connected to the gaming controller 140 based on the orientation.

4. Input Sensor(s)

In some embodiments, the gaming controller 140 can include one or more input sensors 146, which can include controller buttons (e.g., 32 and 40), a disc wheel (e.g., 50), touch screen, or the like. Data regarding what input (e.g., tracked via the input sensors 146 corresponding to each form of input) is being used can be stored as player controller data 111. Such data can include whether a player is using the disc wheel, touchpad, and/or buttons to play a game, including when and to what proportion the player is using each input.

5. Audio Subsystem

In some embodiments, the gaming controller 140 can include one or more audio subsystems 149. In some embodiments, the audio subsystems 149 can be configured to transcode audio from media or games so that the audio can be output via a headphone (e.g., connected wirelessly or wired) or one or more speakers in the gaming controller. For example, the speakers can be used to emit sounds. In some embodiment, the speakers can be 16-25 mm in diameter and capable of 0.5-1 W of power. In some embodiments, the one or more speakers can be less than 16 mm or more than 25 mm in diameter. In some embodiments, the one or more speakers can be capable of less than 0.5 W or more than 1 W of power.

6. RF Component

In some embodiments, the gaming controller 140 can include one or more RF components 151. For example, the RF components can include RF transceivers (e.g., custom or standardized) that provide relatively low lag times since there is no protocol stack and/or many layers of software.

7. Data Store

In some embodiments, the gaming controller 140 can include a data store 150. In some embodiments, the data store can store information received from the gaming console 101 and/or the gaming server 120. In some embodiments, a gaming controller 140 can be associated with one or more players, and such data can be stored in the data store 150. For example, some players may have changes to the controller button functionality (e.g., a left-handed player may want to invert some controls as compared to a right-handed player) that may be stored in the data store 150.

In some embodiments, game application 114 data, player game status, and other game-related information can be stored on the gaming controller 140 in the data store 150 so that the gaming controller 140 can be transported and connected to new gaming consoles 101 and retain the game information and player information. In some embodiments, authentication keys can be stored in the data store 150 corresponding to a specific game or portion of a game that has been previously purchased. The authentication keys can be used by a gaming console 101 the controller is newly connected to, to provide access to the game or portion of the game (e.g., by having the gaming console 101 communicate the authentication key to a gaming server 120 for authentication, or having the gaming console 101 authenticate the key without communicating with a gaming server 120). In some embodiments, the authenticated game can be played on the gaming console by one or more players while the gaming controller with the authentication key is connected. This would facilitate convenient sharing of a game. In some embodiments, once the gaming controller with the authentication key is disconnected from the gaming console, access to the game can be revoked immediately or after a preconfigured amount of time (e.g., 6 hours, 12 hours, 24 hours, 3 days, 1 week, or never revoked). In some embodiments, once access to a game is revoked, then a discount may be provided to the owner of the gaming console to purchase the previously authenticated game at a price lower than advertised. In some embodiments, if the game is purchased by the owner of the gaming console, the owner of the controller with the authentication key can receive a referral bonus (e.g., credit for more games, discounts, benefits, or the like) of helping facilitate a new sale of a game.

C. Gaming Server(s)

The gaming server(s) 120 may include an additional game application 122, a remote game balancing system 124, an application data store 126, and a player profile data store 128. The gaming console 101 may communicate with gaming server(s) 120 over a network 130. In some embodiments, the gaming server(s) 120 can comprise multiple systems connected via a local area network or via the Internet. Also, in some embodiments the gaming server(s) 120, or portions thereof, can be located on the gaming controller(s) 140 and/or the gaming console(s) 101.

In some embodiments, the gaming server 120 can perform player or user authentication. For example, user authentication can include verifying an identity of an individual associated with a gaming controller and/or gaming console for purposes of enabling the use of system resources and purchasing of products (e.g., games, downloadable content, or the like). In some embodiments, user authentication can be a component of the parental control system 106.

In some embodiments, the gaming server 120 can perform device authentication. For example, device authentication cab include verifying the authenticity of a device (e.g., gaming controller and/or gaming console) attempting to communicate with the gaming servers 120, wherein the authenticity of the device can determine whether the device is a unique device and the connection between the device and the gaming server 120 is compliant with a terms of use or other technical requirements. For example, verifying the authenticity of a device is an important component of defending against attacks (e.g., DDOS attacks, fraudulent activity, or other illicit actions). Also, for example, verifying the authenticity of a device is an important component of being able to ban or restrict behavior of certain players under certain conditions.

In some embodiments, the gaming servers 120 can include analytics that analyzes data that passes through or is stored on the gaming servers 120. For example, the analytics can be used by the remote game balancing system 124 (or the game balancing system 102 on the gaming console 101) to determine adjustments to games to improve game balancing.

In some embodiments, brand-new exclusive titles can be downloadable via a network 130 and/or one or more gaming server(s) 120 from an online store. For example, an online store can be configured to provide the ability to purchase additional software or games. In some embodiments, multiplayer online gaming and structured multi-tiered tournament play can be provided. In some embodiments, a leaderboard system can include high scores by locations and calendar. In some embodiments, a trophy or achievement rewards system can be implemented to award unique accomplishments to each player.

1. Additional Game Application

In some embodiments, the gaming server 120 can include an additional game application 122. As described in more detail herein with respect to game application 114, in some embodiments, gaming server(s) 120 can include an additional game application 122 and/or the game application 114, either and both of which can stored and/or executed locally and/or in a distributed environment. In some embodiments, the gaming console 101 may enable multiple players, gaming controllers 140, or gaming consoles 101 to access a portion of the game application 114, additional game application 122, and/or a host application. For example, the additional game application 122 can be all of or a portion of an executable game playable on a gaming console 101 and/or gaming controller 140. In some embodiments, the additional game application 122 can be hosted on cloud services such as Amazon Web Services (AWS), Microsoft Azure, a combination of services, or the like.

2. Remote Game Balancing System

In some embodiments, the gaming server 120 can include a remote balancing system 124. As described in more detail herein with respect to the game balancing system 102 in the gaming console 101, the remote game balancing system 124 may include similar components and features as the game balancing system 102. For example, the remote game balancing system 124 may receive or access data from one or more gaming consoles 101 and/or one or more gaming controllers (e.g., player game data, game match data, player controller data, output from local AI balancing components, or the like) that can be used to develop models similar to, or the same as, the game balancing system 102. Although the game balancing system 102 can function as a standalone system, predictive models improve with more data available for generating models. The remote game balancing system 124 can determine predictive models, similar to the game balancing system 102, using artificial intelligence and machine learning for example (e.g., with a component similar or the same as the local AI balancing component 113 in the game balancing system 102 in the gaming console 101), and transmit results to the game balancing system 102 so that the game balancing system 102 can update its algorithms, if needed. In some embodiments, the game balancing system 102 may use algorithms and models provided by the remote game balancing system 124. For example, there may be benefits to having the modeling and algorithm determinations calculated in whole, or in part, remotely (e.g., on the remote game balancing system 124) in order to save energy or processing power locally on the gaming console 101. In some embodiments, for example where a gaming console 101 is not connected to a gaming server 120, then the game balancing system 102 would do all modeling and determinations without the use of a remote game balancing system 124. For instance, and in some embodiments, it may be more efficient to have determinations of skill level, or game skill clustering, performed remotely on the remote game balancing system 124 as opposed to the game balancing system 102. In some embodiments, both the remote game balancing system 124 and game balancing system 102 can perform different parts of analysis that may lead to the determination. In some embodiments, the gaming console 101 may perform any and all game balancing, modeling, or other related analytics or analysis. In some embodiments, any and all game balancing, modeling, or other related analytics or analysis can be performed by the remote game balancing system 124 on one or more gaming servers 120. For example, the game balancing system 102 may be located on the gaming server 120 (e.g., as remote game balancing system 124 or the like).

In some embodiments, and similar to the local AI balancing component 113 and game balancing system 102, the remote game balancing system 120 can also use one or more balancing models, generated using artificial intelligence (AI) or machine learning, to determine what features or aspects of a game to adjust or change, and how much to change the specific features or aspects of the game. The models can be based on performance data collected from many players using many gaming consoles 101 and associating the players to one or more groups based similarities in skill level based on statistical balancing models employed.

3. Application Data Store

In some embodiments, the gaming server 120 can include an application data store 126 that may comprise data related to one or more game applications. For example, the application data store can be configured to store game updates, game mechanics, information related to possible features that can be adjusted by a game balancing system, more game applications, local account data associated with an account maintained for one or more players, and/or other game-related or account-related data or any other information related to executing, rendering, and playing one or more games.

4. Player Profile Data Store

In some embodiments, the gaming server 120 can include a player profile data store 128 that may comprise data related to one or more players. For example, each player of a console will generate player profile data associated with gameplay, preferences, skill level, or any other monitored and stored information described herein. Such player profile data can be compiled into a profile stored in the player profile data store 128. This player profile data can be used by the remote game balancing system 124 and/or the game balancing system 102 of one or more gaming consoles 101 to determine game adjustments and skill level based on calculated predictive models. In some embodiments, the player profile data can be anonymized and/or transmitted to the remote game balancing system 124 and/or the game balancing system 102 for use in calculating a model and/or determining adjustments for one or more games.

D. Network(s)

One or more network(s) 130 may be used to facilitate communication between the gaming server 120, gaming console 101, and/or the gaming controllers 140. In some embodiments, the network(s) 130 can comprise local area networks, wide area networks, and/or the Internet. Although only one network 130 is illustrated, multiple networks may exist.

Flowcharts

Figure 7:
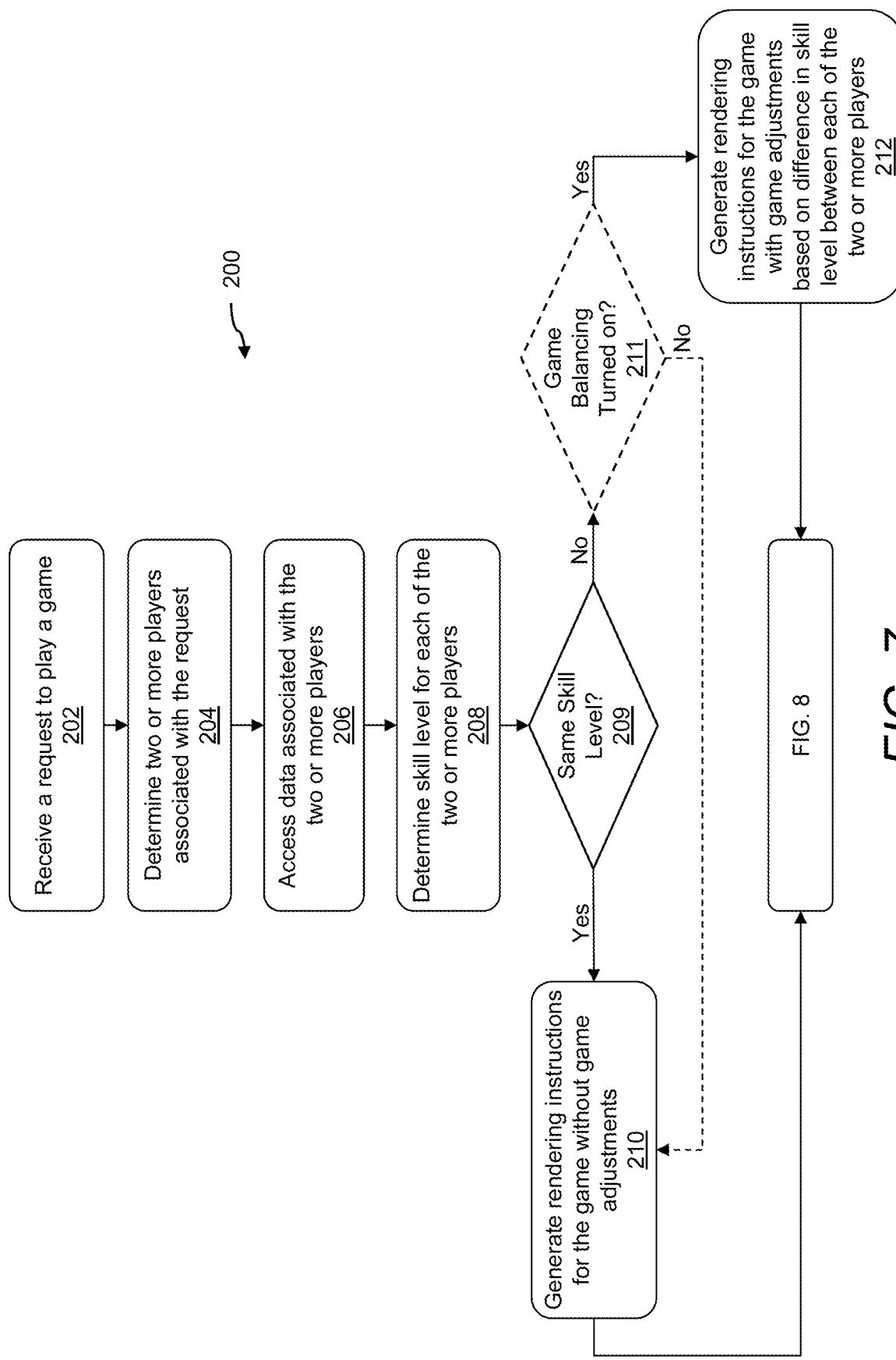
FIG. 7 shows an embodiment of a flow diagram of a method for determining relative skill level of two or more players of a game, according to one embodiment.
Figure 8:
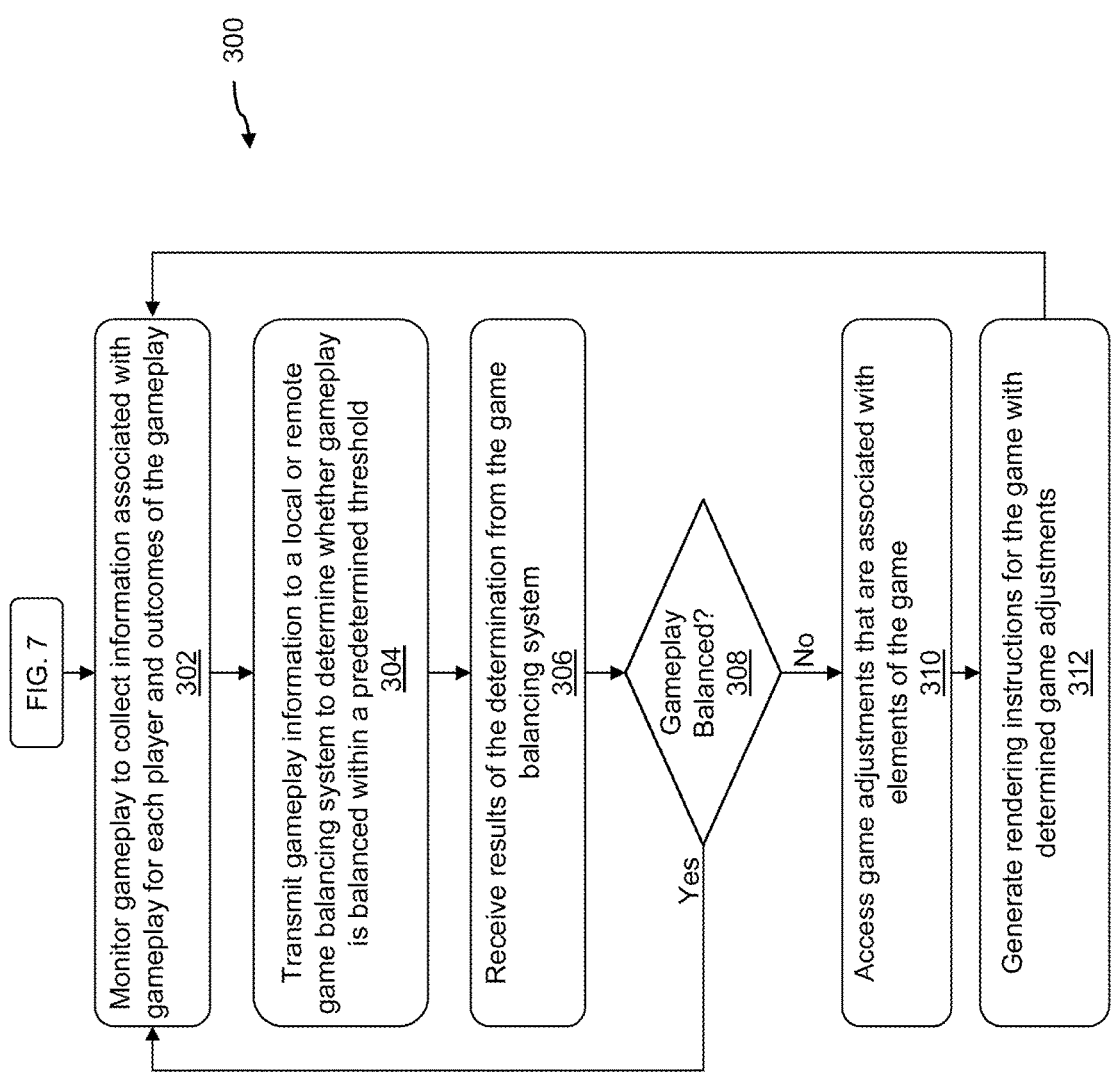
FIG. 8 shows an embodiment of a flow diagram of a method for updating data associated with game balancing, according to one embodiment.

FIGS. 7-8 show flow diagrams of methods for determining relative skill level of two or more players of a game and updating data associated with game balancing based on the determination, according to some embodiments. Although any number of systems, in whole or in part, can implement the methods and processes described, to simplify discussion, the methods and processes will be described with respect to particular systems. Further, although embodiments of the methods and processes may be performed with respect to variations of systems comprising various components, to simplify discussion, the methods and processes will be described with respect to the game balancing system 102, and also, in some embodiments, the remote game balancing system 120, gaming console 101, and/or gaming server 120.

Process for Determining a Relative Skill Level

FIG. 7 shows an embodiment 200 of a flow diagram of a method for determining relative skill level of two or more players of a game. In block 202, a gaming console (e.g., the gaming console 101 described with respect to FIG. 6) can receive a request to play a specific game (e.g., via receiving inputs from a paired gaming controller 140 as described in FIG. 6). The request can include the name of a game, how many players intend to play, and/or any custom modifications to the game (e.g., time limits, number of lives available, colors, names, game modes, or the like).

In block 204, the gaming console can determine that two or more players are associated with the request and determine who the players are. For example, the gaming console can determine that a particular player of the two or more players has previously played on the gaming console, or another gaming console. Also, the gaming console can determine that a particular player of the two or more players has not previously played the console, or any console. In some embodiments, the gaming console can communicate with one or more gaming servers (e.g., gaming server 120 as described in FIG. 6) to access information that may be used to make the determination of whether articular player of the two or more players has previously played on the gaming console, or another gaming console. For example, a portion of data associated with players can be provided to the gaming console for the determination to be made.

In block 206, if a player of the two or more players has played the gaming console, or any gaming console, before then the gaming console can access data (e.g., player profile data) associated with the player. Such data can be located on the gaming console locally, a gaming controller (e.g., the gaming controller 140 described in FIG. 6), or the gaming server. If a player of the two or more player has not played the gaming console, or any gaming console, before then the gaming console accesses generic or default data to be used in following blocks.

In block 208, the gaming console (e.g., by using a game balancing system such as 102 in FIG. 6) determines a skill level for each of the two or more players. The skill level can be based on the player profile, the game intended to be played, default data, or any other relevant data that can be used to determine skill levels.

In block 209, the gaming console can determine whether the two or more players have the same determined skill level from block 208.

If the two or more players do have the same determined skill level, then in block 210 the gaming console generates rendering instructions for the game without any game adjustments. In some embodiments, the flow can continue onto block 302 in FIG. 8.

If the two or more players do not have the same determined skill level, then the in block 211, and in some embodiments, the gaming console determines whether game balancing is turned on. For example, this block can be optional depending on whether the option is available in the gaming console settings. So, in some embodiments, a gaming console can include a setting that allows for a player to turn on (e.g., toggle on/off) a system-wide setting enabling/disabling game balancing for all games. In some embodiments, the player can enable/disable game balancing for some games or portions of games (e.g., with a blacklist or whitelist). In some embodiments, player performance data associated with gameplay with game balancing turned on may not be weighted as heavily or included at all, in skill level determinations for the player associated with the performance data. In some embodiments, player performance data associated with gameplay with game balancing turned off may not be weighted as heavily or included at all, in skill level determinations for the player associated with the performance data. In some embodiments, if game balancing is turned off, a player may be able to advance in skill level more quickly if the player performs better than predicted in matches. Also, in some embodiments, a player can turn on or off game balancing and also adjust the sensitivity of the game balancing as described in more detail herein.

In some embodiments, a range of game balancing can be set. For example, a player can set a game balancing sensitivity from a minor or low implementation of game balancing to a strong or extreme implementation of game balancing. A minor implementation can be a fraction of a determined adjustment to a feature of a game. For example, a game balancing system may determine a particular adjustment to make and, based on a low sensitivity setting, a reduced form of the adjustment can be made to the game. For example, if a Pong paddle should be 100 pixels long based on the determined adjustment instead of a normal length of 50 pixels, a low sensitivity setting may result in the paddle being adjusted to 75 pixels in length, or something less than 100 pixels but more than 50 pixels. In some embodiments, sensitivity can also be set to normal and in that case, the determined length of 100 pixels would be applied. Conversely, if a pong paddle should be adjusted to 30 pixels instead of 50 (e.g., if a player is really skilled as compared to the player's opponent), then a low sensitivity may result in an adjustment to a length of 40 pixels, or a length between 30 and 50 pixels. In some embodiments, sensitivity can also be set to normal and in that case, the determined length of 30 pixels would be applied.

A strong implementation of the game balancing can be a multiple of a determined adjustment to a feature of a game.

For example, using the same Pong example, if a normal length of the paddle is 50 pixels and the determined length should be 100 pixels, then a high sensitivity setting may result in the paddle length being adjusted to 125 pixels, or a length higher than 50 pixels. In some embodiments, sensitivity can also be set to normal and in that case, the determined length of 100 pixels would be applied. Conversely, if a pong paddle should be adjusted to 30 pixels instead of 50 (e.g., if a player is really skilled as compared to the player's opponent), then a high sensitivity may result in an adjustment to a length of 20 pixels, or a length smaller than 30 pixels. In some embodiments, sensitivity can also be set to normal and in that case, the determined length of 30 pixels would be applied.

If game balancing is determined to be turned on in block 211, or if a high sensitivity or low sensitivity setting of game balancing is turned on, then the flow moves to block 212. In block 212, the gaming console generates rendering instructions for the game with game adjustments based on output from a game balancing system, and also based on any sensitivity settings, if applicable. Also, the game adjustments may also be based on difference in skill level between each of the two or more players so that all players of the two or more players are balanced with each other. The rendering instructions are configured to be executed by a processor to present the game on a display screen for interaction by the players. In some embodiments, the flow can continue onto block 302 in FIG. 8.

Process for Updating Game-Balancing Data

FIG. 8 shows an embodiment 300 of a flow diagram of a method for updating data associated with game balancing. In block 302, a gaming console (e.g., the gaming console 101 described with respect to FIG. 6) can monitor gameplay of a particular game being played by two or more players to collect information associated with gameplay for each player and outcomes of the gameplay (e.g., who wins/loses, how the game progresses while it is being played, any relevant player game data, player controller data, game match data, or any other relevant data used for balancing).

In block 204, the gaming console transmits gameplay information to a game balancing system (e.g., the game balancing system 102 in FIG. 6) and/or a gaming server (e.g., the gaming server 120 in FIG. 6) to determine whether gameplay is balanced within a predetermined threshold. For example, in block 212 in FIG. 7, game adjustments can be determined for a particular game prior to any gameplay by the two or more players. However, while the two or more players are playing one or more games, new data is collected that may impact the model used to determine the game adjustments or balancing. This new data that is collected can be processed by the game balancing system and/or the gaming server to make any necessary updates to balancing models to determine whether gameplay is still balanced. In some embodiments, there can be a threshold value corresponding to how much the adjustments would be changed as compared to the previously applied model (e.g., the determined game adjustments in block 212 of FIG. 7). If the threshold value is within a specified range, as determined automatically or set up manually, then no adjustments to the game will be made. If the threshold value is not within the specified range, then the game balancing system and/or gaming server will output updated instructions and provide those to the gaming console in block 306.

In block 306, the gaming console (e.g., from a gaming server, game balancing system, or both) receives the output or results of what game adjustments to make to the game, if any. In block 308, the gaming console accesses (e.g., from a gaming server, game balancing system, or both) or determines whether gameplay is balanced based on the received output. If gameplay is still balanced, then the flow moves to block 302 and monitoring of gameplay continues. Otherwise, if gameplay is determined not to be balanced anymore, then the flow moves onto block 310.

In block 310, the gaming console accesses (e.g., from a gaming server, game balancing system, or both) or determines game adjustments that are associated with elements of the game being played based on the output received in block 306. The determination can also be based on any other criteria. For example, a sensitivity setting for game balancing may be activated and the gaming console may supplement the output received accordingly so that any game balancing is done with respect to such settings. In another example, a prompt can be presented to players of the game requesting authorization to incorporate the updated balancing adjustments.

In block 312, the gaming console generates rendering instructions for the game with the determined game adjustments from block 310, if any. The rendering instructions are configured to be executed by a processor to present the game on a display screen for interaction by the players.

Example Graphical User Interface

FIGS. 9A and 9B pertain to a parental control system (e.g., the user/parental control system 106 of FIG. 6). Specifically, FIG. 9A illustrates an embodiment of a graphical user interface depicting parental control settings, and FIG. 9B illustrates an embodiment of a key card. Although any number of graphical user interfaces can be implemented or used, in whole or in part, to simplify discussion, the interface generation and interaction methods and processes will be described with respect to particular systems. Further, although embodiments may be performed with respect to variations of systems comprising various components, to simplify discussion, the methods and processes will be described with respect to a gaming console, gaming controller, game balancing system, and any system or component described herein.

FIG. 9A illustrates an embodiment of a graphical user interface (GUI) 400 depicting user/parental control settings. In some embodiments, the GUI 400 can include options 404 for adjusting or viewing one or more of the following: the system 408, gameplay 410, healthy play limits 412, token system 414, password 416, remote access 418, and for a lost key 420. In some embodiments, GUI elements can also be used to indicate information to a player. For example, element 406 can be used to indicate the healthy play limits 412 are turned on. Also, for example, element 424 can be used to show remote access 418 is turned off or not set up. Also, for example, element 422 can be used to indicate a player's current selection, and in some embodiments, the text (e.g., "Token System") can be adjusted to indicate the selection in combination with element 422 or separately. Although FIGS. 9A and 9B relate to parental control settings, it should be appreciated that the settings can be useful to any player or user of the system.

In some embodiments, settings for an associated gaming console or system 408 can be included in the parental control setting 402 GUI 400. For example, a player can adjust features related to the gaming console. For instance, the player can set times that the gaming console can be played (e.g., 10:00 AM to 8:00 PM). Also, for example, the player can limit the types of game that can be played on the gaming console. Also, for example, the player can restrict access to downloadable content, including downloadable games. Also, for example, the player can restrict access to the system to only those with a password, specific gaming controller, or other whitelisted access authority. Any other system setting can be adjusted as well in some embodiments.

In some embodiments, settings for gameplay 410 on the associated gaming console can be included in the parental control setting 402 GUI 400. For example, a player can adjust features associated with gameplay for each game specifically, or all games played on the gaming console. For example, certain games may be restricted from play or limited to play with specific combination of gaming controllers (e.g., a child's controller can only access the game if a parent's controller is also playing the game). Also, for example, certain features from one or more games can be limited, blocked, or adjusted. In some embodiments, a player can block or limit certain features of all games. For example, selecting "no blood or killing" can result in some games taking out blood and other games that feature killing to be blocked from gameplay completely. Any other gameplay setting can be adjusted as well in some embodiments.

In some embodiments, settings for healthy play limits 412 on the associated gaming console can be included in the parental control setting 402 GUI 400. For example, a player can limit how long a player (e.g., a child) can play a specific game, all games, or even access the gaming console. In some embodiments, turning the setting on can set default healthy play limits based on a child's age. Any other healthy play limits with respect to gameplay can be adjusted as well in some embodiments.

In some embodiments, settings for a token system 414 on the associated gaming console can be included in the parental control setting 402 GUI 400. In some embodiments, virtual tokens may be available. Virtual tokens can be used to set a soft limit on gameplay that is duration based and provides a reasonable compromise between time limits and player experience. For example, each token is worth a fixed amount of play time. Tokens can be used as a reward system for doing real world activities such as chores, getting a good grade on a quiz, etc. Tokens can be used along with time-of-day limits or instead of time-of-day limits. They can be scheduled to be granted automatically at set intervals, and/or manually granted through parental controls (on the gaming console 101 via a graphical user interface, a mobile application, a browser, or the like). With respect to video game arcades where a token, like a quarter or some custom device was worth a variable amount of play time, depending on the game, the duration ended at a natural pausing point (e.g., when you lost your last life). In some embodiments, a similar concept is implemented here with soft time-limits that will not cut a player off abruptly right in the middle of an encounter for example, but may come into effect at more natural pause point (e.g., at check points in a platformer game, or between levels). In some embodiments, the gaming console 101, via the user/parental control system 106, can track a time limit remaining associated with the tokens and determine when to stop the gameplay that is convenient for the player. In some embodiments, gameplay can stop before or after the allotted time based on the tokens. For example, if a player has 10 minutes of gameplay remaining and the player reaches a checkpoint or beats a level after 9 minutes, the user/parental control system 106 can determine based on the player's skill level or game being played (e.g., typical rounds may last more than the remaining time of 1 minute based on the player and/or generally for the game being played) that the gaming console 101 should enforce the time limitation and stop gameplay at the 9 minute mark. In some embodiments, any under-time (e.g., time playing the game remaining on the token, or the 1 minute remaining in the prior example) can advantageously be carried over to the next play session as a credit, or additional play time. In another example, if a player has 10 minutes of gameplay remaining and the player does not reach a checkpoint or beat a level until 12 minutes pass, the user/parental control system 106 can determine that the gaming console 101 should enforce the time limitation and stop gameplay at the 12 minute mark. In some embodiments, any over-time (e.g., time playing the game passed the expiration of the token, or the 2 minutes extra spent playing in the prior example) can advantageously be carried over to the next play session as a debit, or less play time.

In some embodiments, settings for a password 414 to access the parental control settings 402 on the associated gaming console can be included in the parental control setting 402 GUI 400. For example, a password to access the parental control settings 402 GUI 400 can be set of turned off.

In some embodiments, settings for remote access 414 to access the parental control settings 402 remotely (e.g., via a computer browser or mobile phone/tablet, or the like) on the associated gaming console can be included in the parental control setting 402 GUI 400. For example, a player can set up remote access to access, view, and/or adjust any parental control settings over a network (e.g., a LAN or internet) using a mobile phone, computer, tablet, or the like.

In some embodiments, information regarding a lost key 414 to access the parental control settings 402 on the associated gaming console can be included in the parental control setting 402 GUI 400. For example, information on how to request a new key card 470 can be provided to a player. Also, for example, the ability to request a new key card 470 can be provided. More information regarding the key card 470 is included with respect to FIG. 9B.

FIG. 9B illustrates an embodiment of a key card 470. For example, the parental control setting menu 402 as described in FIG. 9A can be accessible with a physical key 470 so that unauthorized access (e.g., by a child) is limited, and also to be a convenient way of accessing such settings without remembering a password, or navigating a complex menu. For example, the physical device can include a microchip (e.g., RFID, NFC, or the like) that can interact with the gaming console or gaming controllers to open and access the parental control settings menu.

In some embodiments, the key card can include a slot 474 to insert a lanyard or other similar device. Also, in some embodiments, side 472 of the key card 470 can include an image of a key or indication that the key card 470 provides access to parental control settings.

In some embodiments, the gaming console 101 gives parents access to parental controls (e.g., via a graphical user interface 402, such as the one shown and described with respect to FIG. 9A) with a physical card 470 that ships with the game console. For example, the "parent key" 470 can be advertised as a feature, and in some embodiments, they key can be included inside a sealed envelope marked "FOR PARENTS ONLY." In some embodiments, the key can be a credit-card-sized card with a picture of a key on one side and a QR code on the other side. In some embodiments, the parent key can have a cut-out slot near one end for attaching to a keyring or lanyard. A note in the envelope instructs the parent to tap the key on the gaming console's RFID reader to invoke the parental controls menu on the TV, which they can then navigate with a gaming controller. This straightforward, intuitive physical device removes many if not all the hurdles mentioned above to accessing parental controls.

In some embodiments, embedded computer accessible information in a RFID, magnetic strip, or the like can be included in the parent key 470 and can be part of a distinct set of parent key IDs that is recognizable by the gaming console, for example by one or more RFID tag(s). In some embodiments, upon first use on the gaming console, the parent key becomes paired to the gaming console, and thereafter the parent key can access user/parental control settings 402 for that gaming console. In some embodiments, it is possible to replace the key if lost or damaged (e.g., via 420 in FIG. 9A). In an embodiment, a gaming console receives instruction from a gaming server to pair to a new key (which is issued when a replacement key is, for example, mailed out).

In some embodiments, parents may also administer user/parental controls from their mobile phone by using the QR code on the parent key 470 (e.g., using a browser, with a mobile application, or the like). Provided the gaming console is connected to the internet, changes to user/parental controls can be pushed to the gaming console, or accessed by the gaming console, and then applied by the gaming console. Such an embodiment is advantageous so that parents can manage the settings from any location and conveniently while the gaming console 101 is being used, for example. In some embodiments, the parent may also setup a login credential with an email and a password that will allow them to access their parental controls panel from any web browser, so they can administer settings from a PC or mobile phone browser without the parent key.

In some embodiments, there is no menu item for accessing parental control settings 402 in the gaming console's settings menu. This may have the effect of hiding such controls from children playing the gaming console and may limit or prevent the children from trying to hack into the user/parental control settings 402. In some embodiments, a parent may set a password (e.g., 416 in FIG. 9A), from within the user/parental control settings 402, for additional security. In some embodiments, a parent key 470 may include a QR code, embedded computer accessible information such as RFID, magnetic strip, combinations of the same or the like.

Example Hardware Configuration of Player System

Figure 10:
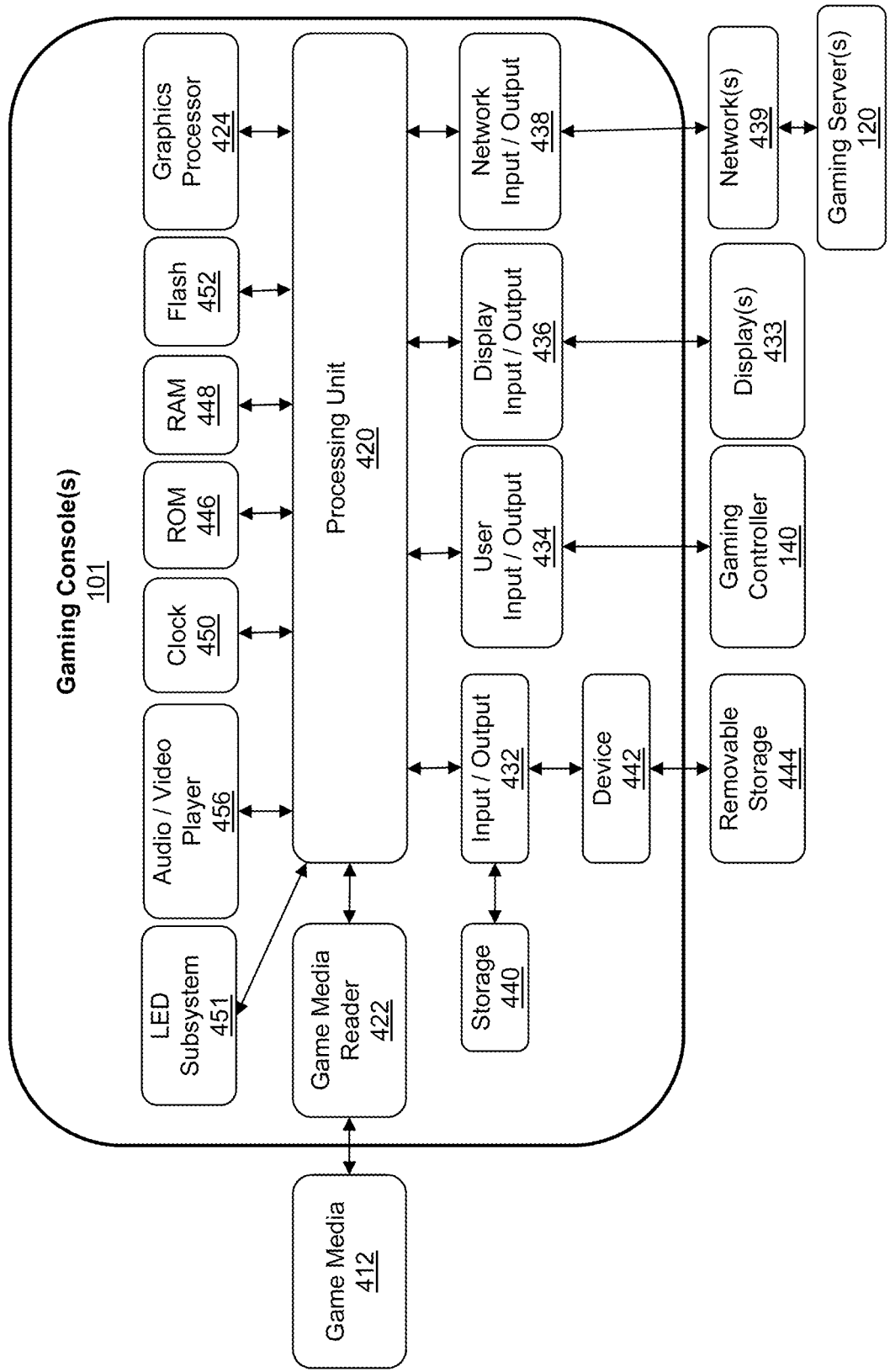
FIG. 10 illustrates an embodiment of a gaming console.

FIG. 10 illustrates an embodiment 1000 of a gaming console (e.g., 101). Other variations of the gaming console 101 may be substituted for the examples explicitly presented herein, such as removing or adding components to the gaming console 101. The gaming console 101 may include a dedicated game device, a gaming controller (e.g. 140), a smart phone, a tablet, a personal computer, a desktop, a laptop, a smart television, a car console display, and the like.

As shown in system configuration 1000, the gaming console 101 includes a processing unit 420 that interacts with other components of the gaming console 101 and also components external to the gaming console 101. The gaming console 101 also includes a power source (e.g., internal or external). A game media reader 422 may be included that can communicate with game media 412. Game media reader 422 may be an optical disc reader capable of reading optical discs, such as CD-ROM or DVDs or memory card, or any other type of reader that can receive and read data from game media 412. In some embodiments, the game media reader 422 may be optional or omitted. For example, game content or applications may be accessed over a network via the network input/output 438 rendering the game media reader 422 and/or the game media 412 optional.

The gaming console 101 may include a separate graphics processor 424. In some cases, the graphics processor 424 may be built into the processing unit 420, such as with an APU. In some such cases, the graphics processor 424 may share Random Access Memory (RAM) with the processing unit 420. Alternatively, or in addition, the gaming console 101 may include a discrete graphics processor 424 that is separate from the processing unit 420. In some such cases, the graphics processor 424 may have separate RAM from the processing unit 420. Further, in some cases, the graphics processor 424 may work in conjunction with one or more additional graphics processors and/or with an embedded or non-discrete graphics processing unit, which may be embedded into a motherboard and which is sometimes referred to as an on-board graphics chip or device.

The gaming console 101 also includes various components for enabling input/output, such as an input/output 432, a user input/output 434, a display input/output 436, and a network input/output 438. As previously described, the input/output components may, in some cases, including touch-enabled devices. The input/output 432 interacts with storage 440 and, through a device 42, removable storage media 44 in order to provide storage for computing device 800. Processing unit 420 can communicate through input/output 432 to store data, such as game state data and any shared data files. In addition to storage 440 and removable storage 444, the gaming console 101 is also shown including Read-Only Memory (ROM) 446 and Random access memory (RAM) 448. RAM 448 may be used for data that is accessed frequently, such as when a game is being played. The gaming console 101 may also include a LED subsystem 451 that includes LED lights controlled by the processing unit 420. The LED lights can include RGB coloring and can be associated with aspects of the game media 412 or data related to input/output 432.

User input/output 434 is used to send and receive commands between processing unit 420 and player systems, such as game controllers (e.g., 140). In some embodiments, the user input/output 434 can include touchscreen inputs. As previously described, the touchscreen can be a capacitive touchscreen, a resistive touchscreen, or other type of touchscreen technology that is configured to receive user input through tactile inputs from the user or player. Display input/output 436 provides input/output functions that are used to display images from the game being played. Network input/output 438 is used for input/output functions for a network. Network input/output 438 may be used during execution of a game, such as when a game, or portion of a game, is being played online or being accessed online.

Display output signals may be produced by the display input/output 436 and can include signals for displaying visual content produced by the gaming console 101 on a display device, such as graphics, user interfaces, video, and/or other visual content. The gaming console 101 may comprise one or more integrated displays configured to receive display output signals produced by the display input/output 436, which may be output for display to a user or player. According to some embodiments, display output signals produced by the display input/output 436 may also be output to one or more display devices external to the gaming console 101.

The gaming console 101 can also include other features that may be used with a game, such as a clock 450, flash memory 452, and other components. An audio/video player 456 might also be used to play a video sequence, such as a movie. It should be understood that other components may be provided in the gaming console 101 and that a person skilled in the art will appreciate other variations of the gaming console 101.

Program code can be stored in ROM 446, RAM 448, or storage 440 (which might comprise hard disk, other magnetic storage, optical storage, solid state drives, and/or other non-volatile storage, or a combination or variation of these). At least part of the program code can be stored in ROM 446 that is programmable (ROM, PROM, EPROM, EEPROM, and so forth), in storage 440, and/or on removable media such as game media 412 (which can be a CD-ROM, cartridge, memory chip or the like, or obtained over a network or other electronic channel as needed). In general, program code can be found embodied in a tangible non-transitory signal-bearing medium.

Random access memory (RAM) 448 (and possibly other storage) is usable to store variables and other game and processor data as needed. RAM is used and holds data that is generated during the play of the game and portions thereof might also be reserved for frame buffers, game state and/or other data needed or usable for interpreting user or player input and generating game displays. Generally, RAM 448 is volatile storage and data stored within RAM 448 may be lost when the gaming console 101 is turned off or loses power.

As gaming console 101 reads game media 412 and provides a game, information may be read from game media 412 and stored in a memory device, such as RAM 448. Additionally, data from storage 440, ROM 446, servers (e.g., gaming server(s) 120) accessed via one or more network(s) 439, or removable storage 446 may be read and loaded into RAM 448. Although data is described as being found in RAM 448, it will be understood that data does not have to be stored in RAM 448 and may be stored in other memory accessible to processing unit 420 or distributed among several media, such as game media 412 and storage 440.

Additional Points

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user or player input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure. The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage. Although the foregoing invention has been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. Accordingly, the present invention is not intended to be limited by the reaction of the preferred embodiments, but is to be defined by reference to claims.

Additionally, all publications, patents, and patent applications mentioned in this specification are herein incorporated by reference to the same extent as if each individual publication, patent, or patent application was specifically and individually indicated to be incorporated by reference.

What is claimed is:

1. A gaming controller comprising:
    a housing formed from plastic or acrylic that houses electronics;
    an LED control engine configured to control one or more LED lights;
    a display screen having a touch sensor;
    a network interface configured to communicate with one or more gaming servers or one or more devices configured to operate as one or more gaming consoles;
    buttons configured to receive a physical press that actuates a sensor comprised within the housing; and
    a circuit board comprising a plurality of electrical contacts;
    a disc wheel configured to be pressed and rotated around a central axis substantially perpendicular to a face of the disc wheel, wherein the central axis intersects a point at least substantially proximate to a center of the face of the disc wheel, and wherein the face, of the disc wheel, is itself physically rotatable about the central axis such that a given point on the face of the disc wheel and proximate to a boundary of the disc wheel is movable to each of a plurality of points that form a circumference around the central axis and on the face of the disc wheel, the disc wheel comprising:
        a first side configured to receive pressure; and
        a second side that is coupled to a compressible and conductive ring such that when the first side received the pressure, the ring contacts one or more of the plurality of electrical contacts to provide one or more signals; and
    one or more computer processors, wherein the one or more computer processors are collectively configured to detect contact received by the plurality of electrical contacts, determine a magnitude of force associated with a pressing of a direction on the disc wheel, and transcode the one or more signals into a plurality of one or more instructions that are configured to affect a graphical user interface of a game, wherein the magnitude of force is determined based on the detected contact, and wherein the one or more signals are transcoded based on at least one of the detected contact or the determined magnitude of force;
    wherein the gaming controller and a first of the one or more devices are associated with a first user, the first user having a first game library that includes the game, wherein the game being accessible via the first device is represented via an authentication key, wherein the authentication key is stored on the gaming controller;
    wherein a second of the one or more devices is associated with a second user, the second user having a second game library that does not include the game, wherein the gaming controller is operatively connectable to the second device to cause, based on the authentication key, the game to become executable on the second device despite the game not being included in the second game library, whereafter the game is executed on the second device.

2. The gaming controller of claim 1, wherein the gaming controller is configured to be chargeable via docking the gaming controller onto a given device of the one or more devices.

3. The gaming controller of claim 1, thereby effecting sharing, with the second user, access to the game, wherein the authentication key is authenticated by at least one of the second device or a gaming server;
    wherein the gaming controller is disconnectable from the second device to cause the game to become unplayable on the second device either immediately or after a predefined period of time has elapsed since the gaming controller was disconnected.

4. The gaming controller of claim 3, wherein the game becoming unplayable on the second device following the gaming controller being disconnected from the second device causes a first incentive to purchase the game to be provided via the second device, wherein the first incentive comprises a first discount.

5. The gaming controller of claim 4, wherein purchasing the game via the second device using the first incentive causes a second incentive to purchase one or more games, other than the game, to be provided via the first device, wherein the first incentive comprises a second discount.

6. The gaming controller of claim 5, wherein the gaming controller is disconnectable from the second device to cause the game to become unplayable on the second device only after the predefined period of time has elapsed since the gaming controller was disconnected.

7. The gaming controller of claim 6, wherein the magnitude of force affects the graphical user interface of the game.

8. The gaming controller of claim 7, wherein based on the authentication key, the game is downloaded onto the second device, installed on the second device, and played on the second device, despite the game not being included in the second game library, wherein the game is executed locally on the second device.

9. A method of implementing a gaming controller, the method comprising:
- detecting contact received by a plurality of electrical contacts of a circuit board of a gaming controller, the gaming controller comprising (i) a housing formed from plastic or acrylic that houses electronics; (ii) an LED control engine configured to control one or more LED lights; (iii) a display screen having a touch sensor; (iv) a network interface configured to communicate with one or more devices configured to operate as one or more gaming consoles, wherein the gaming controller is associated with a first of the one or more gaming consoles; (v) buttons configured to receive a physical press that actuates a sensor comprised within the housing; and (vi) the circuit board, which comprises the plurality of electrical contacts; (vii) a disc wheel configured to be pressed and rotated around a central axis substantially perpendicular to a face of the disc wheel, wherein the central axis intersects a point at least substantially proximate to a center of the face of the disc wheel, and wherein the face, of the disc wheel, is itself physically rotatable about the central axis such that a given point on the face of the disc wheel and proximate to a boundary of the disc wheel is movable to each of a plurality of points that form a circumference around the central axis and on the face of the disc wheel, the disc wheel comprising (A) a first side configured to receive pressure and (B) a second side that is coupled to a compressible and conductive ring such that when the first side received the pressure, the ring contacts one or more of the plurality of electrical contacts to provide one or more signals; and (viii) one or more computer processors;
- determining, based on the detected contact, a magnitude of force associated with a pressing of a direction on the disc wheel;
- transcoding, by collective operation of the one or more computer processors and based on at least one of the detected contact or the determined magnitude of force, the one or more signals into one or more instructions;
- sending the instructions to a given device of the one or more devices to affect a graphical user interface of a game executing on the given device;
- connecting operatively to a second of the one or more gaming consoles, wherein the gaming controller and a first of the one or more devices are associated with a first user, the first user having a first game library that includes the game, wherein the game being accessible via the first device is represented via an authentication key, wherein the authentication key is stored on the gaming controller, wherein the second of the one or more devices is associated with a second user, the second user having a second game library that does not include the game; and
- providing the authentication key to cause the game to become executable on the second device despite the game not being included in the second game library, whereafter the game is executed on the second device.

10. The method of claim 9, wherein the gaming controller is configured to be chargeable via docking the gaming controller onto a given device of the one or more devices.

11. The method of claim 9, wherein the magnitude of force affects the graphical user interface of the game.

12. The method of claim 9, wherein the authentication key is authenticated by at least one of the second device or a gaming server.

13. The method of claim 9, wherein the gaming controller is disconnectable from the second device to cause the game to become unplayable on the second device.

14. The method of claim 9, wherein based on the authentication key, the game is downloaded onto the second device, installed on the second device, and played on the second device, despite the game not being included in the second game library, wherein the game is executed locally on the second device.

15. A non-transitory computer-readable medium containing a program executable to perform an operation to implement a gaming controller, the operation comprising:
- detecting contact received by a plurality of electrical contacts of a circuit board of a gaming controller, the gaming controller comprising (i) a housing formed from plastic or acrylic that houses electronics; (ii) an LED control engine configured to control one or more LED lights; (iii) a display screen having a touch sensor; (iv) a network interface configured to communicate with one or more devices configured to operate as one or more gaming consoles; (v) buttons configured to receive a physical press that actuates a sensor comprised within the housing; and (vi) the circuit board, which comprises the plurality of electrical contacts; (vii) a disc wheel configured to be pressed and rotated around a central axis substantially perpendicular to a face of the disc wheel, wherein the central axis intersects a point at least substantially proximate to a center of the face of the disc wheel, and wherein the face, of the disc wheel, is itself physically rotatable about the central axis such that a given point on the face of the disc wheel and proximate to a boundary of the disc wheel is movable to each of a plurality of points that form a circumference around the central axis and on the face of the disc wheel, the disc wheel comprising (A) a first side configured to receive pressure and (B) a second side that is coupled to a compressible and conductive ring such that when the first side received the pressure, the ring contacts one or more of the plurality of electrical contacts to provide one or more signals; and (viii) one or more computer processors;
- determining, based on the detected contact, a magnitude of force associated with a pressing of a direction on the disc wheel;
- transcoding, by collective operation of the one or more computer processors when executing the program and based on at least one of the detected contact or the determined magnitude of force, the one or more signals into one or more instructions;
- sending the instructions to a given device of the one or more devices to affect a graphical user interface of a game executing on the given device;
- connecting operatively to a second of the one or more gaming consoles, wherein the gaming controller and a first of the one or more devices are associated with a first user, the first user having a first game library that includes the game, wherein the game being accessible via the first device is represented via an authentication key, wherein the authentication key is stored on the gaming controller, wherein the second of the one or more devices is associated with a second user, the second user having a second game library that does not include the game; and providing the authentication key to cause the game to become executable on the second device despite the game not being included in the second game library, whereafter the game is executed on the second device.

16. The non-transitory computer-readable medium of claim 15, wherein the gaming controller is configured to be chargeable via docking the gaming controller onto a given device of the one or more devices.

17. The non-transitory computer-readable medium of claim 15, wherein the magnitude of force affects the graphical user interface of the game.

18. The non-transitory computer-readable medium of claim 15, wherein the authentication key is authenticated by at least one of the second device or a gaming server.

19. The non-transitory computer-readable medium of claim 15, wherein the gaming controller is disconnectable from the second device to cause the game to become unplayable on the second device.

20. The non-transitory computer-readable medium of claim 15, wherein based on the authentication key, the game is downloaded onto the second device, installed on the second device, and played on the second device, despite the game not being included in the second game library, wherein the game is executed locally on the second device.

* * * * *